(12) United States Patent
Lee et al.

(10) Patent No.: US 12,541,094 B2
(45) Date of Patent: Feb. 3, 2026

(54) SPATIAL LIGHT MODULATORS, METHODS OF DRIVING AND MANUFACTURING THE SAME, AND APPARATUSES INCLUDING THE SPATIAL LIGHT MODULATORS

(71) Applicant: SAMSUNG ELECTRONICS CO., LTD., Suwon-si (KR)

(72) Inventors: Minkyung Lee, Suwon-si (KR); Sunil Kim, Osan-si (KR); Byunggil Jeong, Seoul (KR); Junghyun Park, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 599 days.

(21) Appl. No.: 17/987,282

(22) Filed: Nov. 15, 2022

(65) Prior Publication Data

US 2023/0117216 A1    Apr. 20, 2023

Related U.S. Application Data

(63) Continuation-in-part of application No. 17/706,100, filed on Mar. 28, 2022.

(30) Foreign Application Priority Data

Oct. 19, 2021    (KR) .......................... 10-2021-0139692

(51) Int. Cl.
| | | |
|---|---|---|
| G02B 26/10 | (2006.01) | |
| G02B 26/08 | (2006.01) | |
| G02B 5/18 | (2006.01) | |

(52) U.S. Cl.
CPC ....... *G02B 26/106* (2013.01); *G02B 26/0808* (2013.01); *G02B 5/1861* (2013.01)

(58) Field of Classification Search
CPC ............. G02B 26/106; G02B 26/0808; G02B 5/1861; G02B 1/002; G02F 2203/12
See application file for complete search history.

(56) References Cited

U.S. PATENT DOCUMENTS

| | | |
|---|---|---|
| 2018/0196137 A1 | 7/2018 | Lee et al. |
| 2021/0208256 A1* | 7/2021 | Kim ........................ G02F 1/292 |
| | (Continued) | |

FOREIGN PATENT DOCUMENTS

| | | |
|---|---|---|
| JP | 2001-267639 A | 9/2001 |
| JP | 2004-71609 A | 3/2004 |
| | (Continued) | |

*Primary Examiner* — James C. Jones
(74) *Attorney, Agent, or Firm* — Sughrue Mion, PLLC

(57) ABSTRACT

Provided are spatial light modulators, methods of driving and manufacturing the same, and apparatuses including the spatial light modulators. The spatial light modulator according to an example embodiment includes a substrate, a distributed Bragg reflector (DBR) layer stacked on one surface of the substrate, a cavity layer on the DBR layer, a pixel layer on the cavity layer and including a plurality of pixels, and a heat blocking member between the plurality of pixels to block heat transfer between the plurality of pixels, wherein a material layer having a lower thermal conductivity than the lowermost layer of the DBR layer is provided between the substrate and the DBR layer, and each of the plurality of pixels includes a plurality of active metapatterns. In one example, the material layer, the DBR layer, and the cavity layer are each divided corresponding to the plurality of pixels, and the heat blocking member is provided between the divided material layers, between the divided DBR layers, and between the divided cavity layers.

31 Claims, 54 Drawing Sheets

(56) References Cited

U.S. PATENT DOCUMENTS

| | | |
|---|---|---|
| 2022/0013905 A1 | 1/2022 | Park et al. |
| 2022/0050354 A1 | 2/2022 | Park et al. |
| 2022/0137402 A1 | 5/2022 | Park et al. |
| 2022/0171027 A1 | 6/2022 | Kim et al. |
| 2022/0197105 A1 | 6/2022 | Park et al. |
| 2023/0117032 A1 | 4/2023 | Kim et al. |

FOREIGN PATENT DOCUMENTS

| | | |
|---|---|---|
| JP | 2020-166113 A | 10/2020 |
| KR | 10-2018-0082305 A | 7/2018 |
| KR | 10-2020-71909 A | 6/2020 |
| KR | 10-2021-0088047 A | 7/2021 |
| KR | 10-2022-0007004 A | 1/2022 |
| KR | 10-2022-0007006 A | 1/2022 |

* cited by examiner

SPATIAL LIGHT MODULATORS, METHODS OF DRIVING AND MANUFACTURING THE SAME, AND APPARATUSES INCLUDING THE SPATIAL LIGHT MODULATORS

CROSS-REFERENCE TO RELATED APPLICATION

This application is a Continuation-In-Part Application of U.S. patent application Ser. No. 17/706,100, filed Mar. 28, 2022, which is based on and claims priority under 35 U.S.C. § 119 to Korean Patent Application No. 10-2021-0139692, filed on Oct. 19, 2021 in the Korean Intellectual Property Office, the disclosures of which are incorporated by reference herein in their entireties.

BACKGROUND

1. Field

The present disclosure relates to optical scanners for irradiating incident light in a given direction, and more particularly, to spatial light modulators, methods of driving and manufacturing the same, and apparatuses including the spatial light modulators.

2. Description of the Related Art

A spatial light modulator (SLM) may adjust an emission angle of incident light, and thus, may be used as an optical scanner. Recently, a spatial light modulator using an active meta-device has been introduced.

A spatial light modulator using an active meta-device includes a meta-surface, a distributed Bragg reflector (DBR) which serves as a mirror, and a cavity.

The meta-surface of the spatial light modulator may include a plurality of high contrast gratings (HCGs). Because both the HCG and DBR have a high reflectivity with respect to incident light, vertical incident light may be amplified in the cavity and vertically emitted.

SUMMARY

Provided are spatial light modulators capable of preventing thermal cross-talk between driving pixels or heat interference between adjacent driving pixels.

Provided are methods of driving and manufacturing the spatial light modulators.

Provided are electronic apparatuses including the spatial light modulators.

Additional aspects will be set forth in part in the description which follows and, in part, will be apparent from the description, or may be learned by practice of the presented embodiments of the disclosure.

According to an aspect of an embodiment, a spatial light modulator includes a substrate, a distributed Bragg reflector (DBR) layer stacked on one side of the substrate, a cavity layer on the DBR layer, a pixel layer on the cavity layer, the pixel layer including a plurality of pixels, and a heat blocking member between the plurality of pixels to block heat transfer between the plurality of pixels, wherein a material layer having a lower thermal conductivity than the lowermost layer of the DBR layer is provided between the substrate and the DBR layer, and each of the plurality of pixels includes a plurality of active meta-patterns.

In one example, the material layer, the DBR layer, and the cavity layer may be each divided corresponding to the plurality of pixels, and the heat blocking member may be provided between the divided material layers, between the divided DBR layers and between the divided cavity layers.

In one example, the DBR layer may include a plurality of first layers each having a certain thermal conductivity and a plurality of second layers each having a thermal conductivity greater than the certain thermal conductivity of the first layer, wherein the plurality of first and second layers are repeatedly alternately stacked, and the lowermost first layer from among the plurality of first layers may have a thickness greater than a thickness of each of the remaining first layers.

In one example, the cavity layer may be divided in correspondence with the plurality of pixels, and some of layers constituting the DBR layer may also be divided in correspondence with the plurality of pixels, and the heat blocking member may be provided between the divided cavity layers and between all the divided layers of the DBR layer in a horizontal direction parallel to an upper surface of the substrate. In one example, the DBR layer may include a plurality of first and second layers having thermal conductivities different from each other and being repeatedly and alternately stacked in the vertical direction, among the plurality of first and second layers, layers having a high thermal conductivity may be all divided, and layers having a low thermal conductivity may all be divided except for the lowermost layer. In one example, the heat blocking member and the substrate may be spaced apart, and the material layer and an undivided layer having a low thermal conductivity of the DBR layer may be sequentially stacked between the substrate and the heat blocking member. In one example, among the layers having a low thermal conductivity, the lowermost layer may have a thickness greater than a thickness of each of the remaining layers.

In one example, only the DBR layer may be divided in correspondence to the plurality of pixels, and the heat blocking member may be provided only between the divided DBR layers. In one example, the DBR layer may include a plurality of first layers having a certain thermal conductivity and a plurality of second layers having a thermal conductivity greater than the certain thermal conductivity of the first layer, wherein the plurality of the first and second layers are repeatedly alternately stacked, and among the plurality of first layers, the lowermost layer has a thickness greater than a thickness of each of the remaining layers. In one example, the spatial light modulator may further include one meta-pattern on the cavity layer between the plurality of pixels.

In one example, the heat blocking member may include a trench.

In one example, the heat blocking member may include a material having a thermal conductivity less than a thermal conductivity of each of the substrate, the DBR layer, and the cavity layer.

In one example, the heat blocking member may be spaced apart from the plurality of pixels.

In one example, the plurality of pixels may include a plurality of driving pixels and a plurality of non-driving pixels, and the driving pixel and the non-driving pixel may be aligned to be driven by binary driving during driving.

In one example, the plurality of active meta-patterns may each include an active high contrast grating (HCG).

In one example, the plurality of pixels may be spaced apart from each other, and a distance between the plurality of pixels may be greater than a width of one meta-pattern.

According to an aspect of an embodiment, a method of driving a spatial light modulator, in the method of driving the spatial light modulator, the spatial light modulator includes a spatial light modulator described above, wherein the plurality of pixels may include a plurality of driving pixels, and a plurality of non-driving pixels, and the driving pixel and the non-driving pixel are driven by binary driving.

In one example, the driving pixel and the non-driving pixel may be spaced apart from each other, and a current may be applied to all of the plurality of active meta-patterns included in the driving pixel. In one example, the driving pixel and the non-driving pixel may be spaced apart from each other, the driving pixel may include a plurality of active meta-patterns, and a current may be applied only to some of the plurality of active meta-patterns included in the driving pixel. In one example, one active meta-pattern may further be provided between the driving pixel and the non-driving pixel, and a current may be applied to all of the plurality of active meta-patterns included in the driving pixel. In one example, one active meta-pattern may be further provided between the driving pixel and the non-driving pixel, and a current may be applied only to some of the plurality of active meta-patterns included in the driving pixel.

According to an aspect of an embodiment, a method of manufacturing a spatial light modulator, the method includes, after sequentially forming a low thermal conductivity layer, a DBR layer, and a cavity layer on a substrate, forming a pixel layer including a plurality of pixels on the cavity layer, and forming a trench in a stack including the low thermal conductive layer, the cavity layer, and the DBR layer between the plurality of pixels, wherein the thermal conductivity of the low thermal conductivity layer is lower than that of the lowermost layer of the DBR layer.

In one example, the forming of the trench in the stack may include sequentially etching the cavity layer, the DBR layer, and the low thermal conductivity layer until the substrate is exposed.

In one example, the forming of the trench in the stack may include sequentially etching the cavity layer and the DBR layer, wherein only a portion of the DBR layer is etched. In one example, the DBR layer may have a layer structure in which first and second layers having different thermal conductivities are repeatedly alternately stacked, wherein the etching of a part of the DBR layer may include etching the remaining layer structure except for the lowermost first layer.

In one example, the forming of the trench in the stack may include, after forming the DBR layer, etching a region of the DBR layer corresponding to an area between the plurality of pixels until the low thermal conductivity layer is exposed, wherein the cavity layer may be formed on the DBR layer to cover a space formed by the etching. In one example, the plurality of pixels may each include a plurality of active HCGs, and in the forming of the pixel layer, one active HCG may also be formed on the cavity layer between the plurality of pixels. In one example, the forming of the DBR layer may include forming a first layer directly on the low thermal conductivity layer, forming a second layer on the first layer, and repeatedly alternately stacking the first and second layers on the second layer, wherein among the first layers, the first layer directly formed on the low thermal conductivity layer is formed to have a thickness greater than that of the remaining first layers.

In one example, the method may further include, after forming the trench, filling the trench with a material having a thermal conductivity less than a thermal conductivity of each of the substrate, the DBR layer, and the cavity layer.

In an example, the forming of the trench in the stack may include sequentially etching the cavity layer and the DBR layer until the low thermal conductivity layer is exposed.

According to an aspect of an embodiment, an apparatus includes a spatial light modulator configured to irradiate incident light in a given direction, wherein the spatial light modulator may include the spatial light modulator described above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
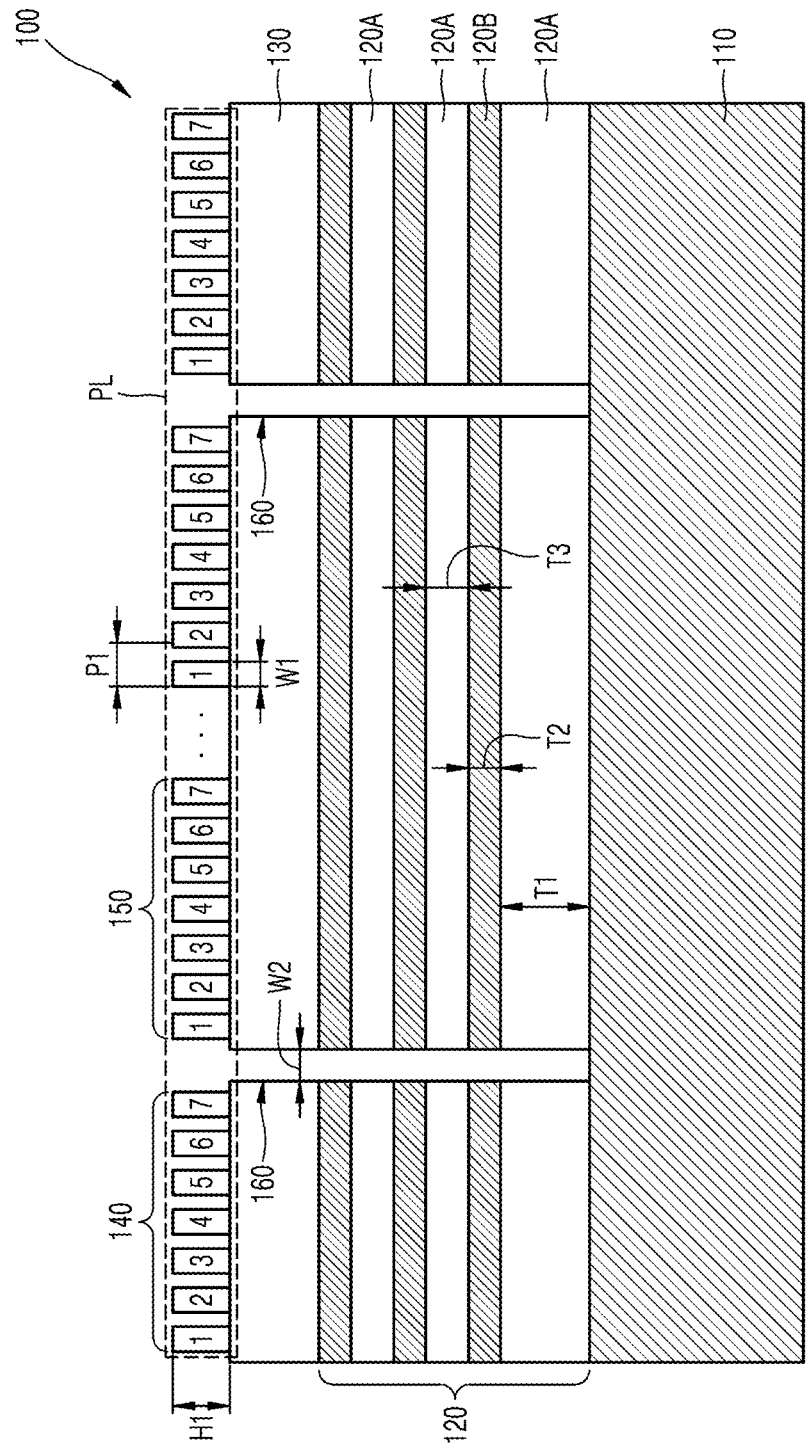
FIG. 1 is a cross-sectional view illustrating a first spatial light modulator according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an apparatus including a spatial optical modulator according to an embodiment and methods of driving and manufacturing the spatial light modulator will be described in detail with reference to the accompanying drawings. In the drawings, thicknesses of layers or regions may be somewhat exaggerated for the clarity of the specification. Meanwhile, the following embodiments described below are merely illustrative, and various modifications may be possible from the embodiments of the present disclosure. Also, when an element or layer is referred to as being "on" or "above" another element or layer, the element or layer may be directly on another element or layer or intervening elements or layers. In the drawings, like reference numerals refer to like elements throughout.

FIG. 1 is a cross-sectional view illustrating a first spatial light modulator 100 according to an example embodiment.

Referring to FIG. 1, the first spatial light modulator 100 includes a substrate 110, and a Distributed Bragg Reflector (DBR) layer 120, a cavity layer 130, and a pixel layer PL sequentially stacked on one surface of the substrate 110. In one example, the one surface of the substrate 110 may be an upper surface of the substrate 110, but may be a lower surface or a side surface according to a viewpoint. The first spatial light modulator 100 also includes a plurality of first trenches 160 penetrating through the DBR layer 120 and the cavity layer 130. The first spatial light modulator 100 may further include a different member besides the members described above.

In one example, the substrate 110 may be a semiconductor substrate, for example, a silicon substrate, and but is not limited thereto. The thickness of the substrate 110 may be determined in consideration of several factors, for example, a form factor and/or heat dissipation when the first spatial light modulator 100 is applied to a product.

In one example, the DBR layer 120 includes a plurality of first layers 120A and second layers 120B that are repeatedly and alternately stacked in a direction perpendicular to the one surface of the substrate 110 and have different thermal conductivities and refractive indices from one another. The first and second layers 120A and 120B may all have different thermal conductivities and refractive indices from one another. The thermal conductivity of the first layer 120A may be less than that of the second layer 120B. In one example, the first layer 120A may include a silicon oxide layer, but is not limited thereto. In one example, the second layer 120B may include a semiconductor layer, for example, a silicon (Si) layer, but is not limited thereto. In the DBR layer 120, a thickness of the lowermost first layer 120A that is in direct contact with the one surface of the substrate 110 may be different from the thickness of the other first layers 120A of the DBR layer 120. In one example, a thickness T1 of the lowermost first layer 120A may be greater than a thickness T3 of the other first layers 120A. The thickness T3 of the other first layers 120A except for the lowermost first layer 120A may be the same or substantially the same as each other. In one example, the thickness T3 of other first layers 120A except for the lowermost first layer 120A satisfies the following Equation 1.

$$T3=\lambda/(4\times n1) \quad \text{<Equation 1>}$$

In Equation 1, λ represents a wavelength of light (e.g., an infrared band) incident on the first spatial light modulator 100, and n1 represents the refractive index of the first layer 120A. Equation 1 may be applied to other spatial light modulators described below.

In one example, when a wavelength λ of light incident on the first spatial light modulator 100 is 1550 nm, and the refractive index n1 of the first layer 120A is 1.46, the thickness T3 of the first layer 120A other than the lowermost first layer 120A is about 265 nm according to Equation 1.

In one example, the thickness T1 of the lowermost first layer 120A may be about 2 to 20 times the thickness T3 of the other first layers 120A, for example, may be 2 to 10 times, or may be to some extent 5 times.

The thickness T2 of the second layer 120B may be less than that of the first layer 120A. The thickness T2 of the second layer 120B satisfies the following Equation 2.

$$T2=\lambda/(4\times n2) \quad \text{<Equation 2>}$$

In Equation 2, λ represents a wavelength of light incident on the first spatial light modulator 100, and n2 represents a refractive index of the second layer 120B. Equation 2 may be applied to other spatial light modulators described below.

In one example, when a wavelength λ of light incident on the first spatial light modulator 100 is 1550 nm, and a refractive index n2 of the second layer 120B is 3.28, the thickness T2 of the second layer 120B is about 118 nm according to Equation 2.

According to FIG. 1, the first and second layers 120A and 120B in the DBR layer 120 are repeatedly stacked three times, but the first and second layers 120A and 120B may be alternately stacked three times or less or three times or more. In the DBR layer 120, the uppermost layer is a second layer 120B and is directly contacted with the cavity layer 130.

The cavity layer 130 that is provided between the DBR layer 120 and the pixel layer PL and resonates and amplifies incident light may be a single layer. The cavity layer 130 may include a material layer having low thermal conductivity. For example, the thermal conductivity of the cavity layer 130 may be less than the thermal conductivity of the second layer 120B of the DBR layer 120. In one example, the cavity layer 130 may include a silicon oxide layer, but is not limited thereto. The thickness of the cavity layer 130 may vary depending on a wavelength of incident light. In one example, the cavity layer 130 may have a thickness (λ/3) corresponding to ⅓ of the wavelength of the incident light, but is not limited thereto. For example, the thickness of the cavity layer 130 may be less or greater than λ/3. As an example, when a wavelength A of incident light is 1550 nm, the cavity layer 130 may be designed so that optimum resonance occurs in a thickness range from about 500 nm to about 600 nm.

The pixel layer PL includes a plurality of high contrast gratings (HCGs). The shape and dimension of the plurality of HCGs may be the same or substantially the same as each other. A width W1 and height H1 of each HCG may be less than a wavelength of incident light. The height H1 of each HCG may be designed to have a high reflectance with respect to incident light, for example, it may be designed to have a reflectance of 70% or more. The plurality of HCGs may be arranged one-dimensionally (1D). Also, in the plurality of HCGs, the arrangement period P1 of each HCG may be shorter than a wavelength of incident light. In this regard, the pixel layer PL may be referred to as an active meta-surface or an active meta-surface layer, and each HCG may be referred to as an active meta-pattern or an active meta-diffraction pattern. A material of each HCG may include, but is not limited to, crystalline silicon.

For convenience of description, the plurality of HCGs of the pixel layer PL are divided into a plurality of first pixels 140 and a plurality of second pixels 150. That is, it is assumed that the pixel layer PL includes a plurality of first pixels 140 and a plurality of second pixels 150. The first pixel 140 and the second pixel 150 are spaced apart from each other.

In one example, each of the plurality of first pixels 140 may include first to seventh HCGs 1 to 7, but is not limited thereto. The first pixel 140 may include 7 or less or 7 or more HCGs. In one example, each of the plurality of second pixels 150 may include the first to seventh HCGs 1 to 7, but is not limited thereto. The second pixel 150 may include 7 or less or 7 or more HCGs. An interval between the HCGs 1-7 included in the first and second pixels 140 and 150 may be equal to or substantially equal to each other. The interval between the HCGs 1-7 included in the first and second pixels 140 and 150 is less than an interval between the first and second pixels 140 and 150.

Meanwhile, although not shown, upper and lower portions of each of the HCGs 1 to 7 included in the first and second pixels 140 and 150 may be doped regions. In one example, the doped regions may be regions doped with an n-type or p-type dopant. Accordingly, a current may flow through each of the HCGs 1 to 7.

When a current is applied to each of the HCGs 1 to 7, joule heat is generated due to an internal resistance of each of the HCGs 1 to 7, and thus, the temperature of the corresponding HCG increases. Due to the temperature change, the refractive index of each of the HCGs 1 to 7 and the reflectance of incident light may be sequentially changed.

Using this principle, a modulation unit may be formed by using the plurality of HCGs 1 to 7 as one pixel 140 (or 150). A current may be applied to some pixels (e.g., 150) according to a specific current application pattern, and as a result, an angle of emitting light (primary reflected light) may be adjusted. Therefore, beam scanning is possible by changing the current application pattern.

The trench 160 is positioned between the first pixel 140 and the second pixel 150. An HCG is not present on the cavity layer 130 just above the trench 160. The trench 160 is formed through the cavity 130 and the DBR layer 120.

Because FIG. 1 is a cross-sectional view, the trench 160 penetrates through a stack structure including the cavity 130 and the DBR layer 120, so it may be expressed as a through hole, but because the trench 160 is formed between the plurality of pixels 140 and 150, the cavity layer 130 and the DBR layer 120 may be divided to correspond to the plurality of pixels 140 and 150. That is, because the trench 160 is provided, the cavity layer 130 formed under the first pixel 140 and the second pixel 150 is not connected to each other and is in a disconnected state, and the DBR layer 120 is also in the same disconnected state. In this way, heat generated in the driving pixel (e.g., 150) may be blocked from being transferred to the non-driving pixel (e.g., 140).

As illustrated in an example embodiment below, a depth of the trench 160 may be adjusted, and thus, a range of layers disconnected by the trench 160 or a thickness disconnected within a layer may vary.

The trench 160 is in contact with the upper surface of the substrate 110. The upper surface of the substrate 110 exposed through the trench 160 becomes a bottom of the trench 160. A width W2 of the trench 160 may be less than a period P1 of the HCG. The width W2 of the trench 160 may be the same as or different from the width W1 of the HCG. The trench 160 may be filled with air or other material, or may maintain a vacuum state that is not filled with any material.

The DBR layer 120 and the cavity layer 130 may be divided to correspond to the respective pixels 140 and 150 by the trench 160. That is, the DBR layer 120 and the cavity layer 130 may be divided into the same number as the number of the plurality of first and second pixels 140 and 150 by the trench 160. Accordingly, the plurality of pixels 140 and 150 and the stacked DBR layer 120 and the cavity layer 130 may correspond one-to-one. In other words, one pixel 140 or 150 exists on one divided cavity layer 130.

As described above, because the DBR layer 120 and the cavity layer 130 are physically divided to correspond one-to-one with the plurality of pixels 140 and 150 due to the trench 160, the transfer of heat generated in a driving pixel (e.g., 150) to an adjacent non-driving pixel (e.g., 140) may be minimized or blocked. In this regard, the trench 160 may be an example of a heat blocking member or heat blocking means that blocks heat transfer between the pixels 140 and 150. When the trench 160 is filled with a material, the material may be a material having a less thermal conductivity than the cavity layer 130, the DBR layer 120, and the substrate 110. Accordingly, the material filling the trench 160 may also be regarded as an example of the heat blocking member. These contents may also be applied to trenches to be described later.

Due to the trench 160, independence of a driving pixel as well as independence of a non-driving pixel may be increased. In addition, a temperature difference between the driving pixel and the non-driving pixel is greater than that of a spatial light modulator of the related art, and thus, emitting light may be focused at a desired location. In addition, because the intensity of a second or higher order beam or the 0th order beam may be reduced, an output and efficiency of the spatial light modulator may be increased. In other words, the accuracy and efficiency of optical scan of the spatial light modulator may be increased.

Figure 2:
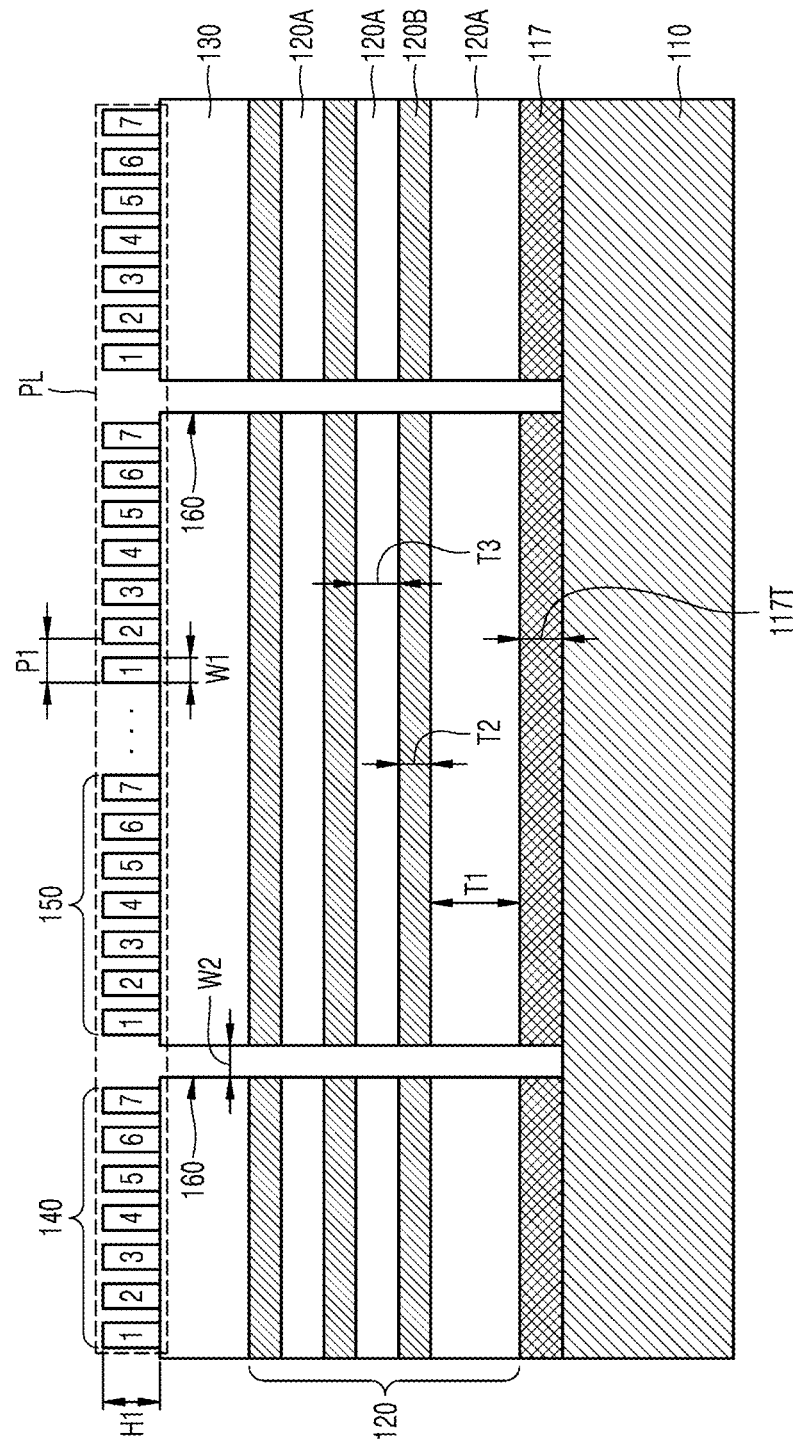
FIG. 2 is a cross-sectional view illustrating a modified example of the first spatial light modulator of FIG. 1.

In one example, in the first spatial light modulator 100, as shown in FIG. 2, a low thermal conductivity layer 117 having a low thermal conductivity may further be provided between the substrate 110 and the DBR layer 120 around the trench 160, in other words, between the substrate 110 and the lowermost first layer 120A of the DBR layer 120. In one example, the low thermal conductivity layer 117 may completely fill between the substrate 110 and the lowermost first layer 120A around the trench 160, and the low thermal conductivity layer 117 may be in direct contact with the substrate 110 and the lowermost first layer 120A. In other words, the low thermal conductivity layer 117 is further provided between the lowermost first layer 120A of the DBR layer 120 and the substrate 110, and the trench 160 may be provided in the form of penetrating the low thermal conductivity layer 117.

In one example, a thickness 117T of the low thermal conductivity layer 117 may be less than a thickness T1 of the lowermost first layer 120A, but is not limited thereto. In one example, the thickness 117T of the low thermal conductivity layer 117 may be the same as or substantially the same as the thickness T3 of the remaining first layers 120A of the DBR layer 120, but may not be the case. In one example, the thickness 117T of the low thermal conductivity layer 117 may be substantially the same as or different from the thickness T2 of the second layer 120B of the DBR layer 120. In one example, the low thermal conductivity layer 117 may be a material layer having relatively lower thermal conductivity than adjacent material layers or may include such a material layer. For example, a thermal conductivity of the low thermal conductivity layer 117 may be less than the thermal conductivity of the lowermost first layer 120A of the DBR layer 120. In one example, the low thermal conductivity layer 117 may include a material having a lower thermal conductivity than silicon oxide (e.g., $SiO_2$), for example, $MoS_2$, $Sb_2S_3$, $Sb_2Se_3$, polyimide, or polyamide, but is not limited thereto. In one example, $MoS_2$ may have directionality.

Because the low thermal conductivity layer 117 is further provided, the thermal blocking efficiency between the driving pixel and the non-driving pixel may be increased.

Figure 3:
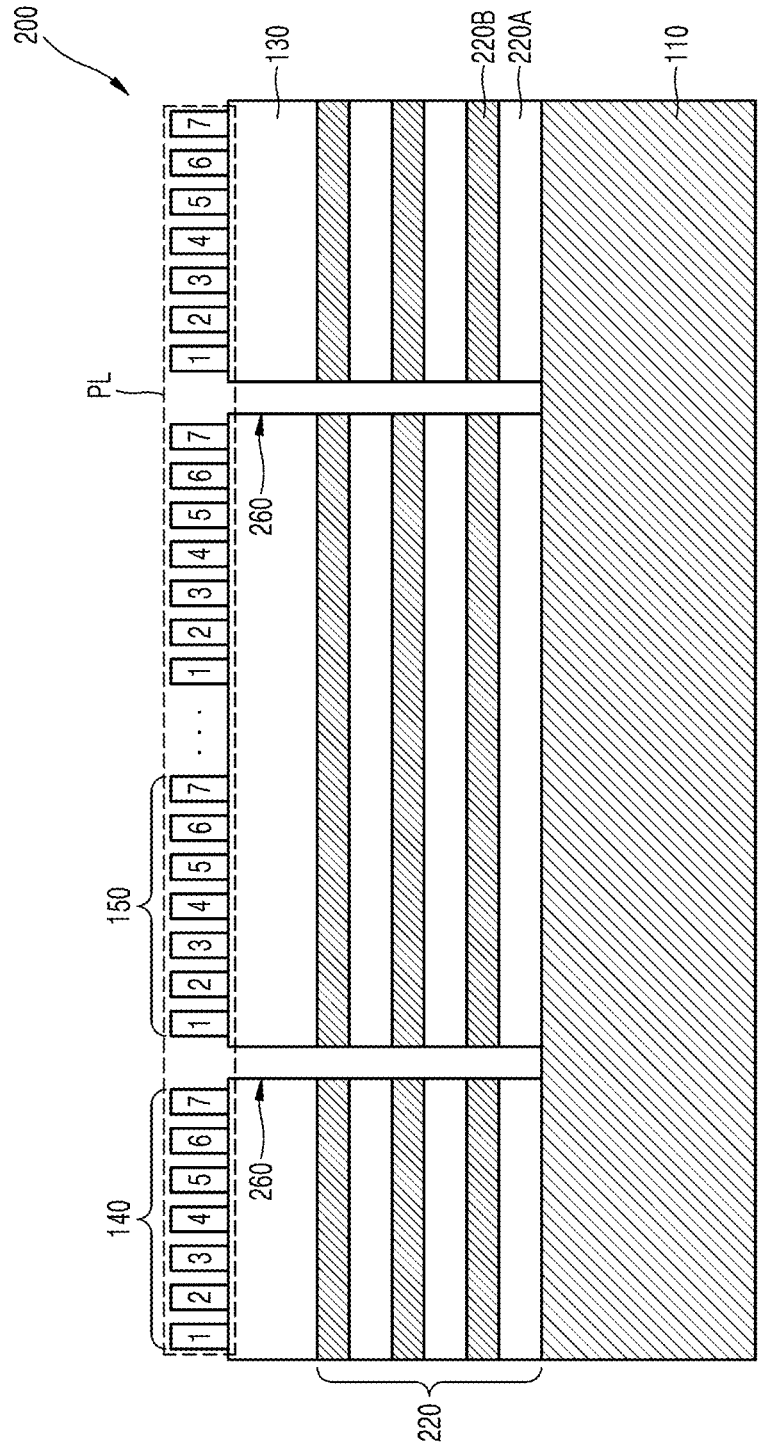
FIG. 3 is a cross-sectional view illustrating a second spatial light modulator according to an example embodiment.

FIG. 3 shows a second spatial light modulator 200 according to an example embodiment. Only parts different from the first spatial light modulator 100 will be described. Like reference numerals indicate like members, and the description thereof will be omitted. The same will be applied to the description of all drawings below.

Referring to FIG. 3, thicknesses of a plurality of first layers 220A included in a DBR layer 220 of the second spatial light modulator 200 may all be the same or substantially the same and all thicknesses of the second layer 220B may be the same or substantially the same. A material of the first layer 220A may be the same as the material of the first layer 120A of FIG. 1, but is not limited thereto. A material of the second layer 220B may be the same as that of the second layer 120B of FIG. 1, but is not limited thereto. Other than that, the configuration of the second spatial light modulator 200 may be the same as or substantially the same as that of the first spatial light modulator 100.

Figure 4:
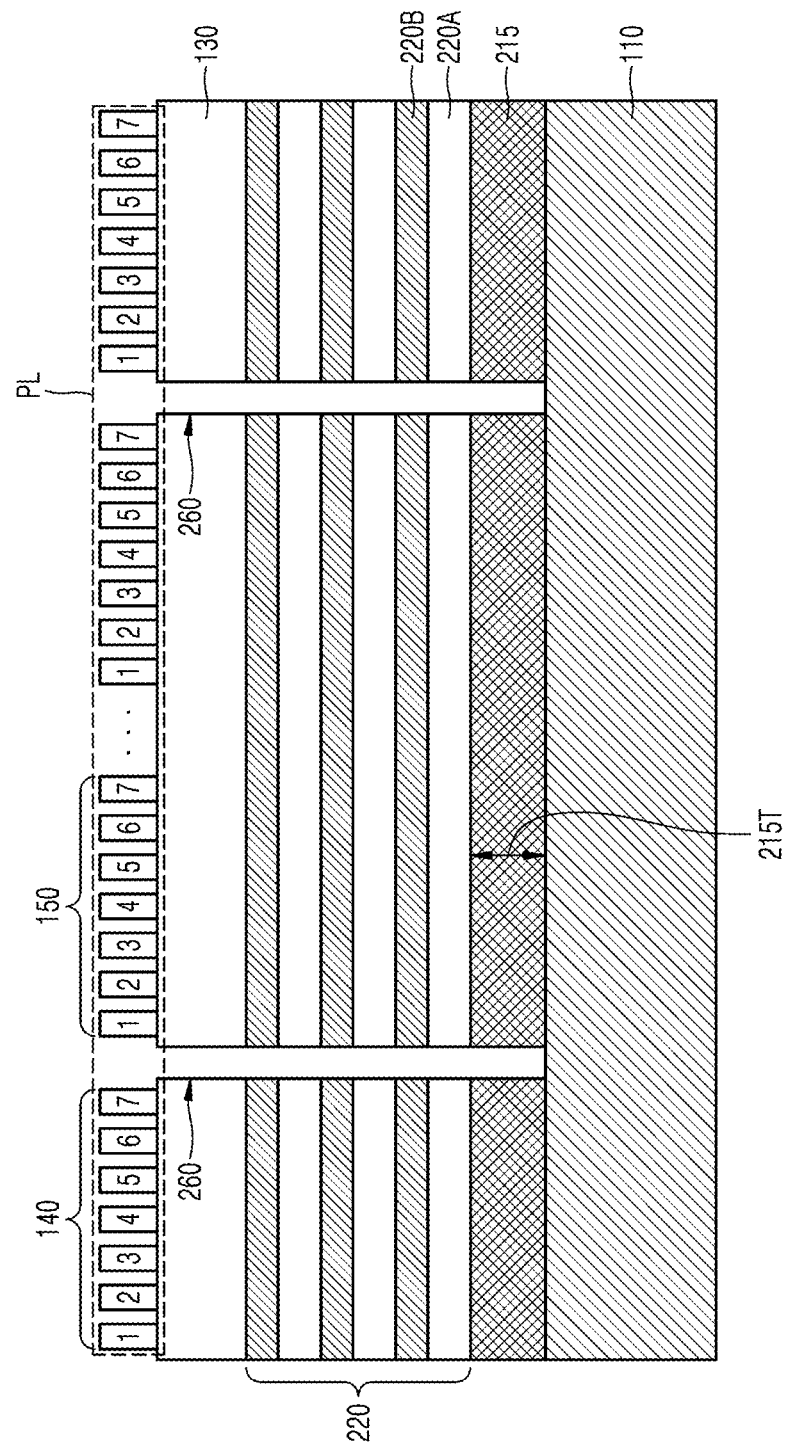
FIGS. 4 and 5 are cross-sectional views illustrating a modified example of the second spatial light modulator of FIG. 3.

In one example, as shown in FIG. 4, a low thermal conductivity layer 215 may further be provided between the DBR layer 220 and the substrate 110 in the second spatial light modulator 200, and a trench 260 may be provided in the form of penetrating the low heat conductive layer 215. In one example, the thickness 215T of the low thermal conductivity layer 215 may be greater than the thickness of the first layer 220A of the DBR layer 220 and may be greater than the thickness of the second layer 220B, but is not limited thereto.

In one example, the material and thermal conductivity properties of the low thermal conductivity layer 215 may be the same as those of the low thermal conductivity layer 117 described with reference to FIG. 2, but may not be the same. For example, the material of the low thermal conductivity layer 215 and the material of the low thermal conductivity layer 117 of FIG. 2 may be different from each other.

Figure 5:
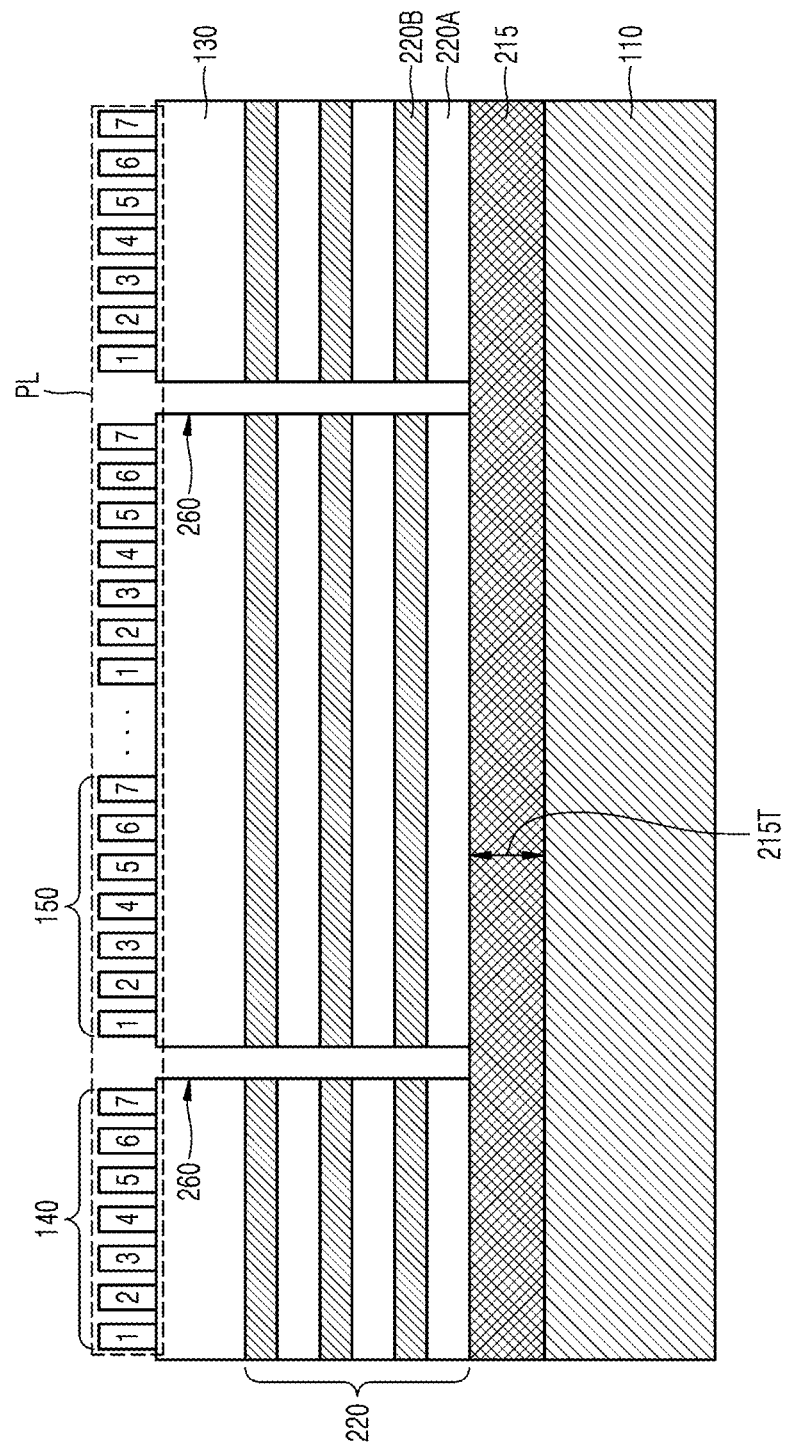

In FIG. 4, the trench 260 may not penetrate the low thermal conductivity layer 215 and FIG. 5 shows an example of this case.

Referring to FIG. 5, the trench 260 is provided to penetrate only the cavity layer 130 and the DBR layer 220, and an upper surface of the low thermal conductivity layer 215 is exposed through the trench 260. In FIG. 5, the upper surface of the low thermal conductivity layer 215 is a bottom surface of the trench 260.

Figure 6:
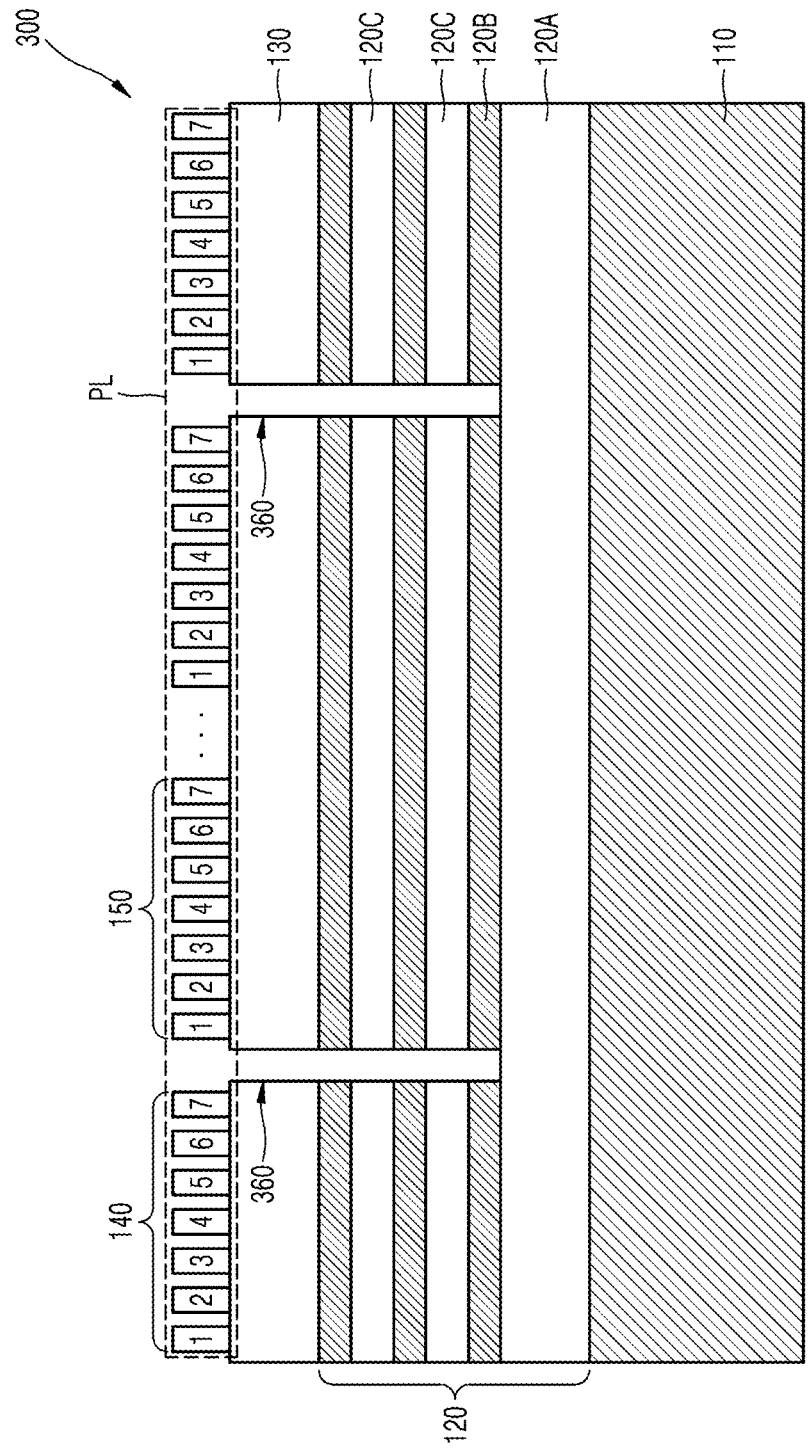
FIG. 6 is a cross-sectional view illustrating a third spatial light modulator according to an example embodiment.

FIG. 6 shows a third spatial light modulator 300 according to an example embodiment. Only parts different from the first spatial light modulator 100 will be described.

Referring to FIG. 6, the third spatial light modulator 300 includes a trench 360. The position, width, etc. of the trench 360 may be the same as or substantially the same as that of the trench 160 of the first spatial light modulator 100, but the trench 360 does not penetrate through the lowermost layer 120A of the DBR layer 120. The trench 360 penetrates through the cavity layer 130, and only penetrates through the remaining layers except for the lowermost layer 120A of the DBR layer 120. The trench 360 penetrates through all of the second layer 120B having relatively high thermal conductivity in the DBR layer 120. A surface of the lowermost layer 120A of the DBR layer 120 exposed through the trench 360 may be a bottom of the trench 360.

Figure 7:
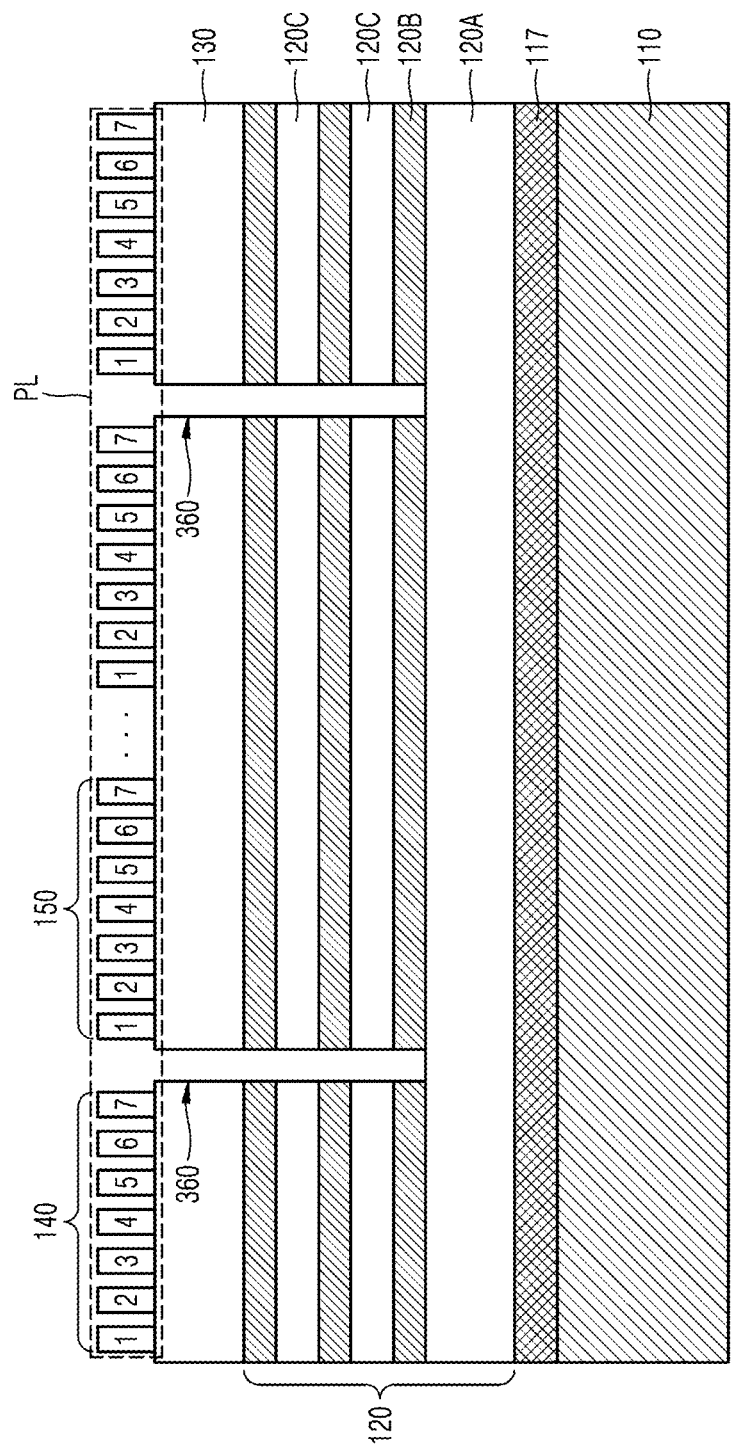
FIG. 7 is a cross-sectional view illustrating a modified example of the third spatial light modulator of FIG. 6.

In one example, as shown in FIG. 7, the low thermal conductivity layer 117 may further be provided between the substrate 110 and the lowermost first layer 120A of the DBR layer 120 of the third spatial light modulator 300. The thickness of the low thermal conductivity layer 117 may be less than that of the lowermost first layer 120A of the DBR layer 120.

Figure 8:
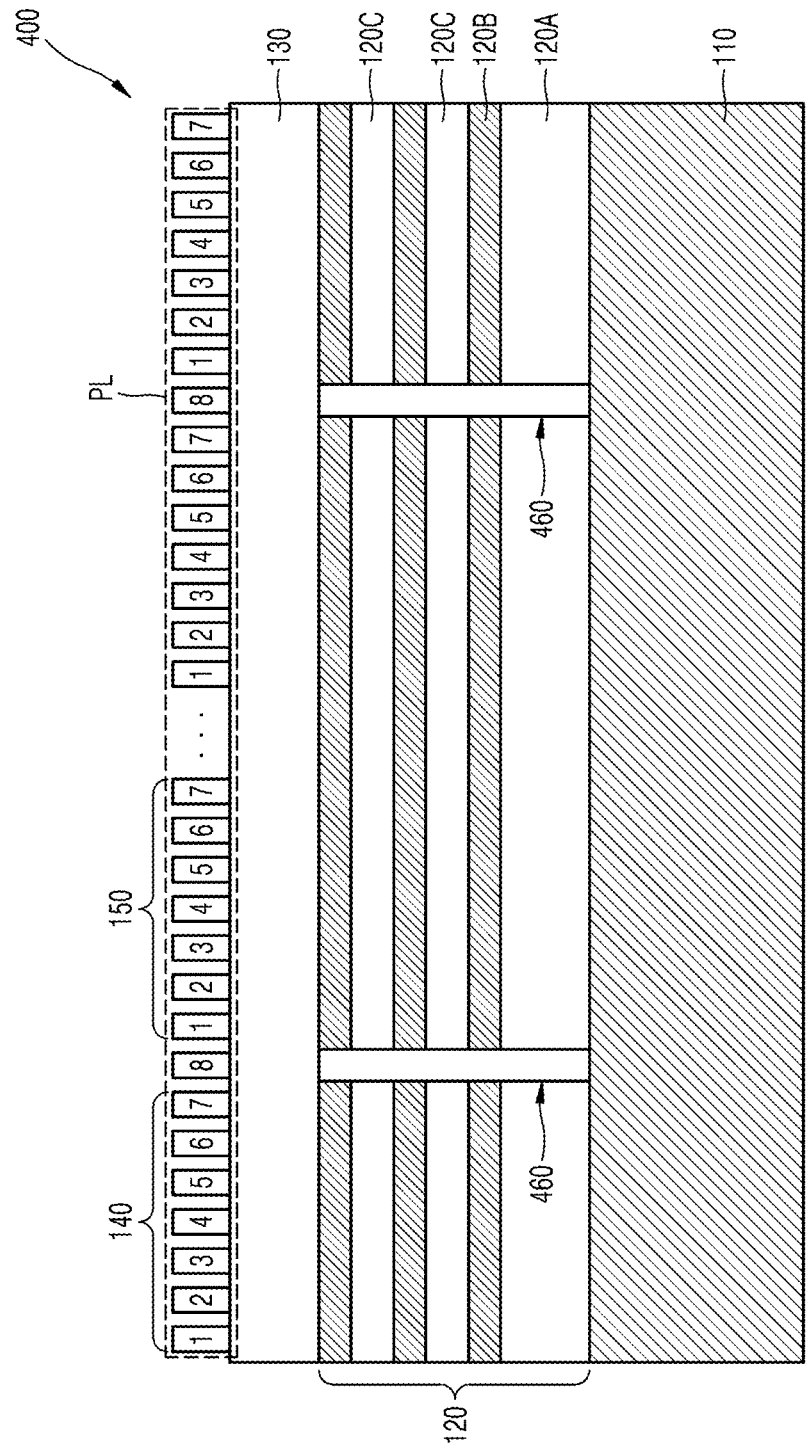
FIG. 8 is a cross-sectional view illustrating a fourth spatial light modulator according to an example embodiment.

FIG. 8 shows a fourth spatial light modulator 400 according to an example embodiment. Only parts different from the first spatial light modulator 100 will be described.

Referring to FIG. 8, the fourth spatial light modulator 400 includes a trench 460 that penetrates through the DBR layer 120 and does not penetrates through the cavity layer 130. That is, the trench 460 exists between the substrate 110 and the cavity layer 130. An entrance of the trench 460 is covered by the cavity layer 130, and the trench 460 may be viewed as a void formed in a stack structure including sequentially stacked the substrate 110, the DBR layer 120, and the cavity layer 130.

A position of the trench 460 in a horizontal direction parallel to the length of the substrate 110 may be the same as or substantially the same as that of the trench 160 of the first spatial light modulator 100. An eighth HCG 8 is present on a region of the cavity layer 130 corresponding to the trench 460, that is, between the first and second pixels 140 and 150. In the pixel layer PL1 formed on the cavity layer 130, the eighth HCG 8 may be included in the first pixel 140 or the second pixel 150. In an example, the eighth HCG 8 may be provided as a dummy pattern to which no current is applied.

Figure 9:
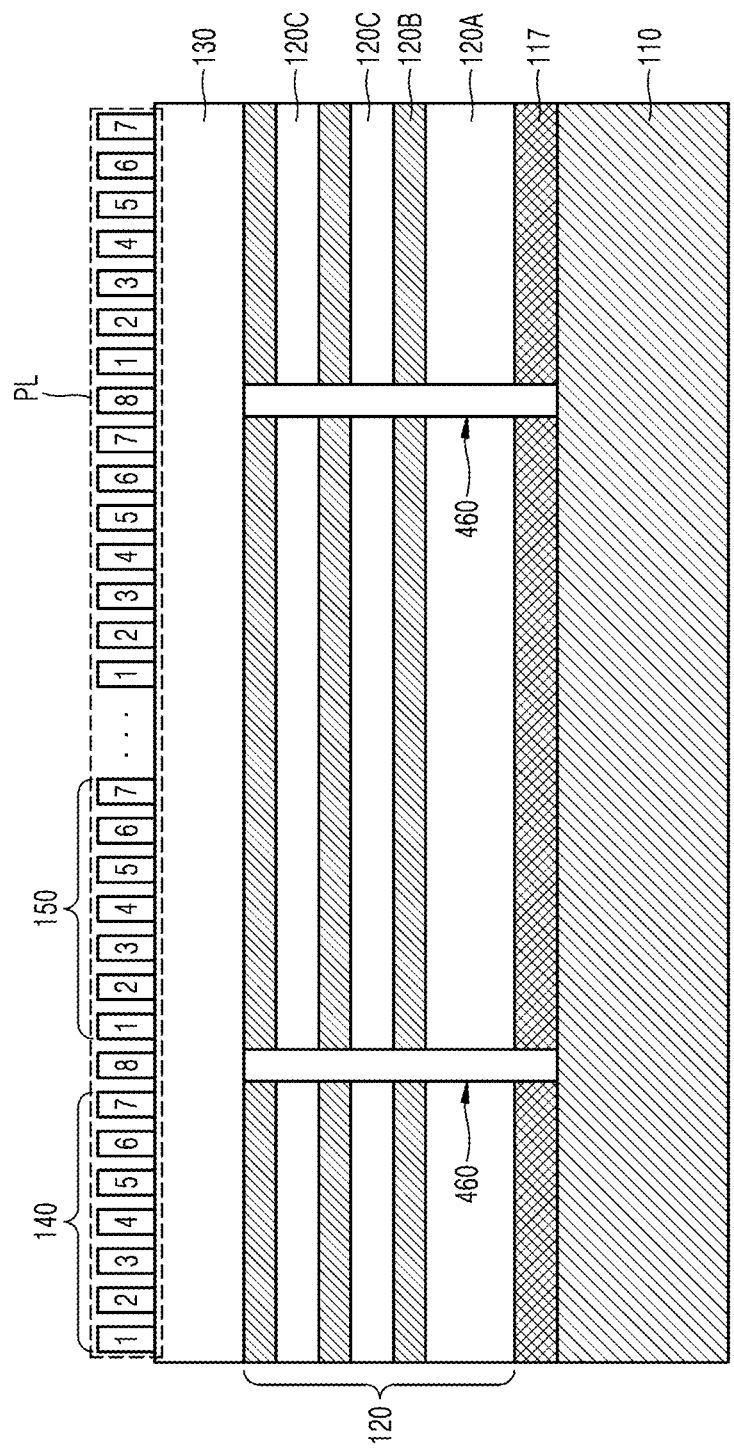
FIG. 9 is a cross-sectional view illustrating a modified example of the fourth spatial light modulator of FIG. 8.

In one example, as shown in FIG. 9, the low thermal conductivity layer 117 may further be provided between the substrate 110 and the DBR layer 120 of the fourth spatial light modulator 400. In this case, the trench 460 may be provided to penetrate up to the low thermal conductivity layer 117. That is, the trench 460 may penetrate the low thermal conductivity.

Figure 10:
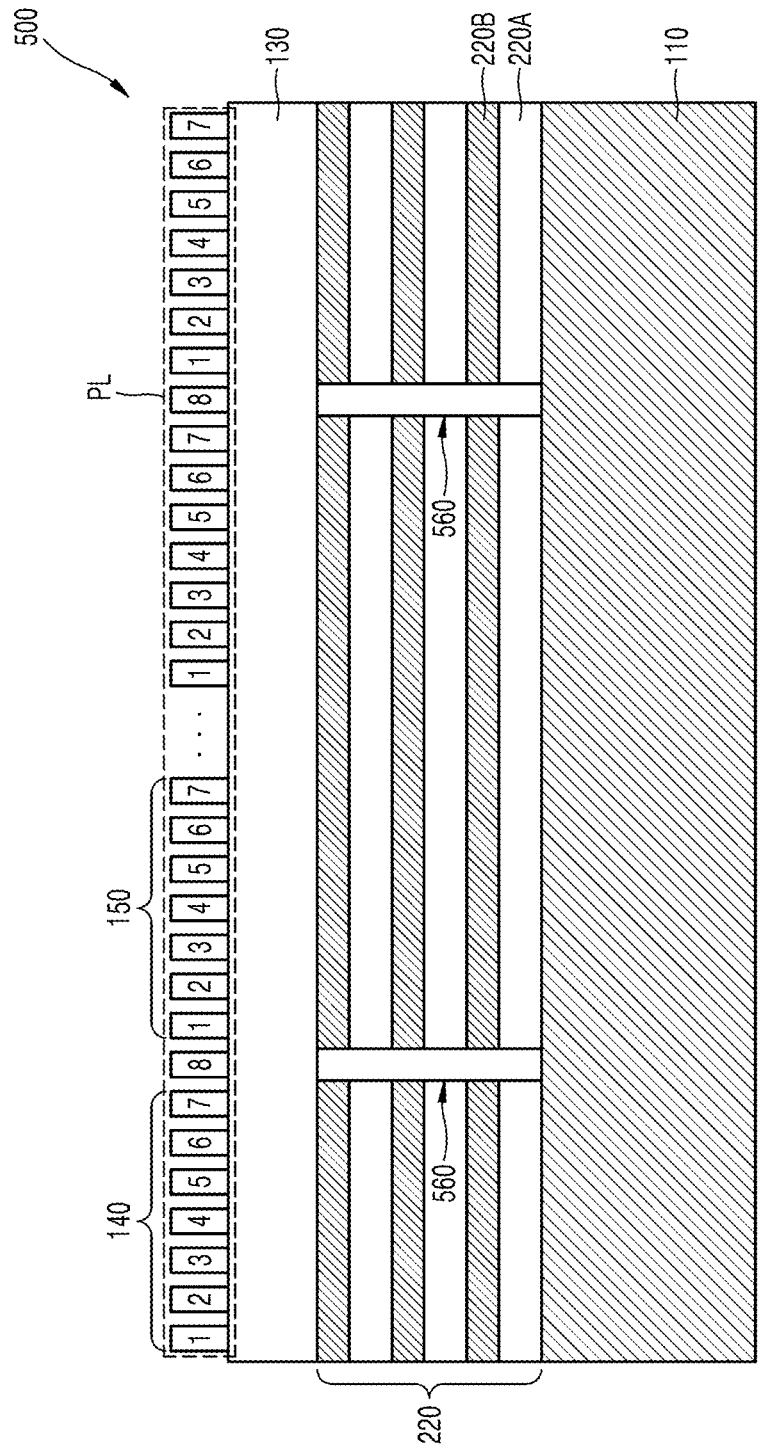
FIG. 10 is a cross-sectional view illustrating a fifth spatial light modulator according to an example embodiment.

FIG. 10 shows a fifth spatial light modulator 500 according to an example embodiment. Only parts different from the fourth spatial light modulator 400 of FIG. 8 will be described.

Referring to FIG. 10, the DBR layer 220 of the fifth spatial light modulator 500 includes a plurality of first layers 220A and a plurality of second layers 220B. The thicknesses of the plurality of first layers 220A may be the same or substantially the same as each other. In addition, the fifth spatial light modulator 500 includes a trench 560 penetrating through only the DBR layer 220. Besides above, the rest of the configuration of the fifth spatial light modulator 500 may be the same as or substantially the same as that of the fourth spatial light modulator 400.

Figure 11:
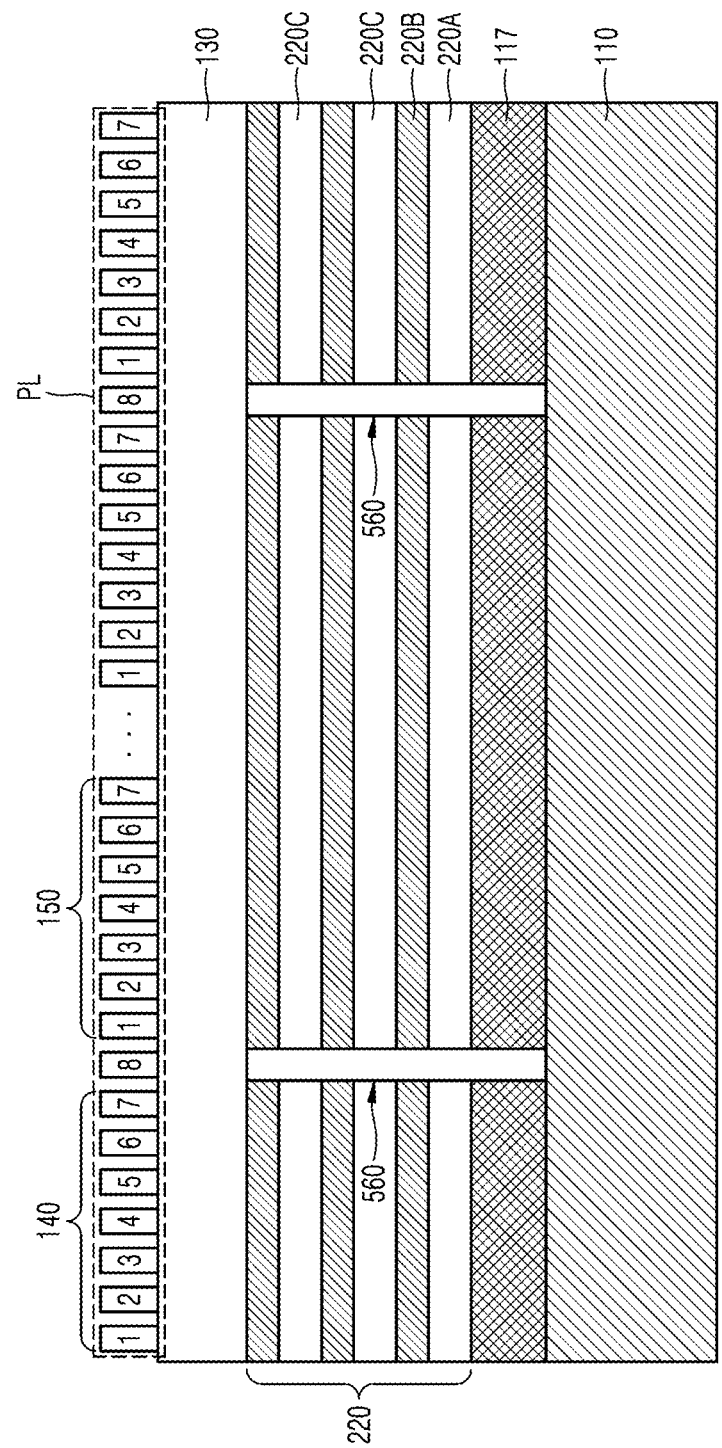
FIGS. 11 and 12 are cross-sectional views illustrating a modified example of the fifth spatial light modulator of FIG. 10.

In one example, as shown in FIG. 11, the low thermal conductivity layer 117 may further be provided between the substrate 110 and the DBR layer 220 in the fifth spatial light modulator 500. In this case, the trench 560 may be provided to penetrate up to the low thermal conductivity layer 117. That is, the trench 560 may be penetrate the low thermal conductivity layer 117.

Figure 12:
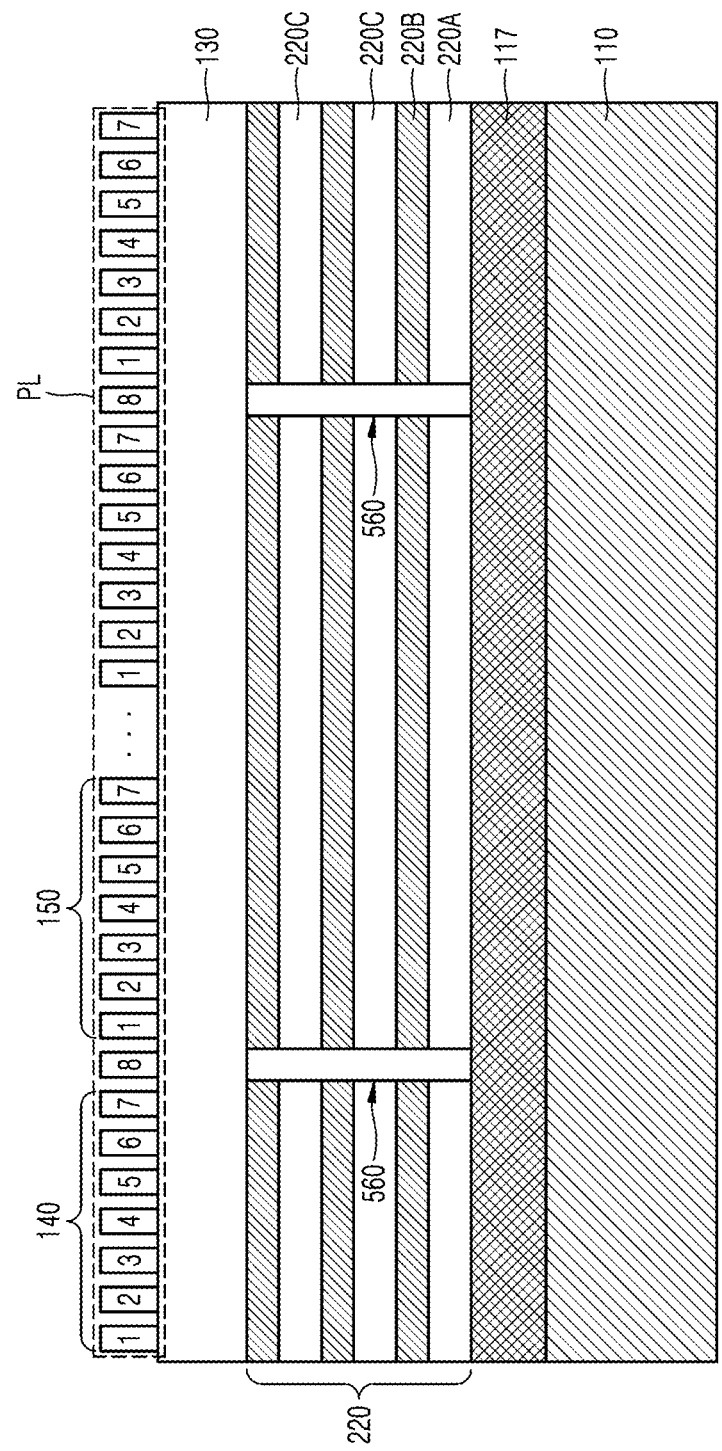

In one example, in FIG. 11, the trench 560 may be present only in the DBR layer 220, and the low thermal conductivity layer 117 may be not divided by the trench 560 and may be formed to cover an entire upper surface of the substrate 110 as a continuous single layer. FIG. 12 shows an example of this case. In FIG. 12, an upper surface of the low thermal conductivity layer 117 is exposed through the trench 560, and the upper surface of the low thermal conductivity layer 117 may be a bottom surface of the trench 560. As a result, both the DBR layer 220 and the trench 560 are on the low thermal conductivity layer 117.

Next, a method of driving (operating) the spatial light modulator according to the example embodiments described above will be described.

Figure 13:
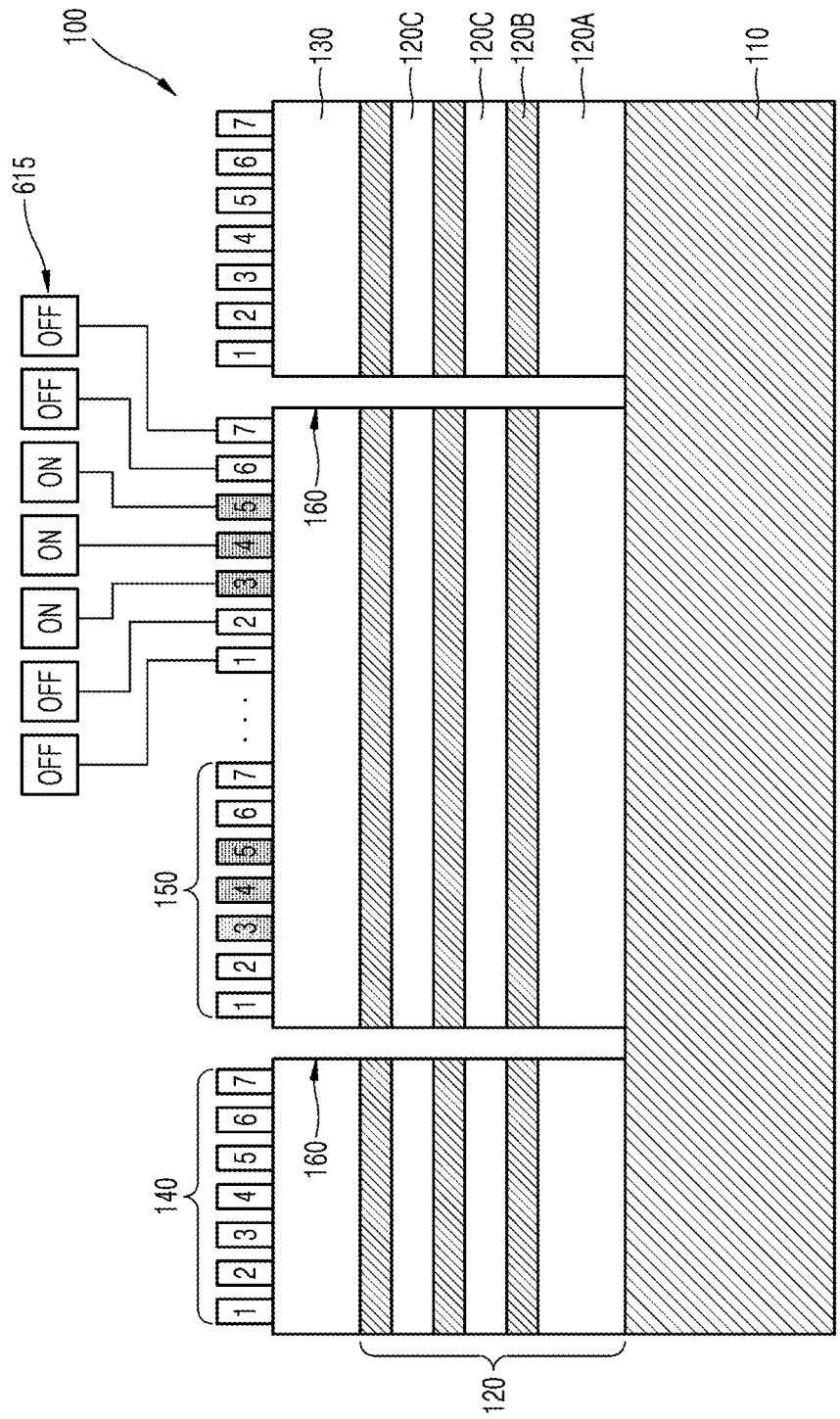
FIG. 13 is a cross-sectional view illustrating a first driving method of a spatial light modulator according to an example embodiment.

FIG. 13 shows a first driving method of a spatial light modulator according to an example embodiment. The first driving method may be a driving method for the first spatial light modulator 100.

In the first driving method of FIG. 13, the first pixel 140 is regarded as a non-driving pixel, and the second pixel 150 is regarded as a driving pixel. The same will be applied to the following driving methods.

Referring to FIG. 13, a current is applied only to some HCGs of the first to seventh HCG 1 to 7 included in the second pixel 150 and does not apply a current to the remaining HCGs. For example, a current is applied only to the third to fifth HCGs 3, 4, and 5, and no current is applied to the first and second HCGs 1 and 2 and the sixth and seventh HCGs 6 and 7 arranged at edges. In one example, a current of about 7 mA may be applied to the third to fifth HCGs 3, 4, and 5, but is not limited thereto.

The application of the current may be controlled by a current controller 615 connected to each of the first to seventh HCGs 1 to 7 included in the second pixel 150. For example, the current controller 615 connected to the third to fifth HCGs 1 to 7 may be an ON state, and the current controller 615 connected to the first and second HCGs 1 and 2 and the sixth and seventh HCGs 6 and 7 may be an OFF state. Although the current controller 615 may be individually connected to all of the first and second pixels 140 and 150, for convenience of illustration, it is depicted that the current controller 615 is connected to only one driving pixel.

In this way, in the HCGs 1 to 7 included in the driving pixel 150, no current is applied to the outer HCGs, but only the HCGs in an inner region is applied, and in addition, because the trench 160 exists between the driving pixel 150 and the non-driving pixel 140, the transfer of heat generated in the driving pixel 150 to the adjacent non-driving pixel 140 may be minimized or blocked.

Figure 14:
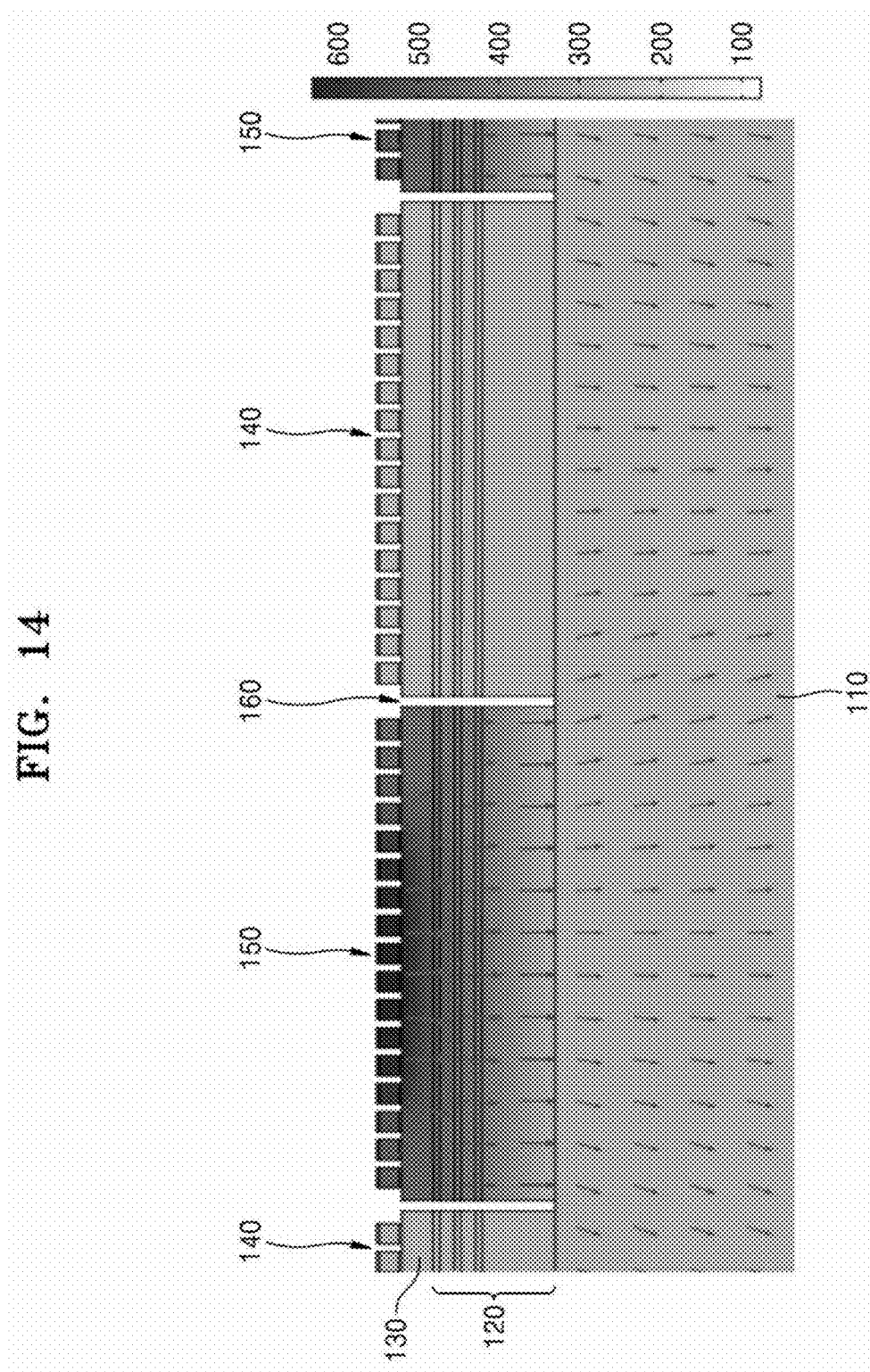
FIG. 14 is a cross-sectional view illustrating simulation results for the transmission of heat generated in a driving pixel of the spatial light modulator according to the first driving method of FIG. 13.

This fact may be confirmed from simulation results for heat generation and transfer according to the driving of the first spatial light modulator 100 shown in FIG. 14.

In the case of the first spatial light modulator 100 used to obtain the simulation results of FIG. 14, each pixel includes 18 HCGs, one HCG at the edge is removed, and a trench 160 is formed in the place from which the one HCG is removed. As a result, each pixel was set to include 17 HCGs. Each HCG was set to be crystalline silicon HCG. In addition, the width W1 and height H1 of each HCG were set to 450 nm, the period P1 was set to 560 nm, the cavity layer 130 was a $SiO_2$ layer and the thickness of the cavity layer 130 was set to 573 nm. In addition, the DBR layer 120 was set such that the first layer 120A and the second layer 120B were alternately stacked three times, the second layer 120B was a 118 nm thick silicon layer and the first layer 120A was a 265 nm thick $SiO_2$ layer, and the thickness T1 of the lowermost first layer 120A was 5 times the thickness T3 of the first layer 120A that is not present at the bottom. The substrate 110 was a silicon substrate. In addition, a current was applied to the plurality of first and second pixels 140 and 150 in a binary driving method. For example, the plurality of first and second pixels 140 and 150 are aligned in one direction (1D alignment), and are alternately and repeatedly aligned. In this arrangement, by selecting the first pixel 140 as a non-driving pixel and the second pixel 150 as a driving pixel, the pixel layer PL is driven in which on/off is alternately repeated.

Also, in relation to the application of current to the second pixel 150, in the 17 HCGs included in the second pixel 150, no current was applied to some HCGs adjacent to the first pixel 140, and a current was applied only to the remaining HCGs. For example, in the 17 HCGs set to be included in the second pixel 150, it was set that a current is not applied to the four HCGs adjacent to the first pixel 140 on a left side of the second pixel 150 and the three HCGs adjacent to the first pixel 140 on a right side of the second pixel 150, but a current is applied to only remaining 10 HCGs.

Referring to FIG. 14, it may be confirmed that the driving pixel 150 maintains a relatively high temperature and the non-driving pixel 140 maintains a relatively low temperature. It may be seen that, as indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140 due to the trench 160.

The result of FIG. 14 suggests that there is no heat leakage from the driving pixel 150. In FIG. 14, the length of the arrows represents a logarithm value of an amount of heat flow.

Figure 15:
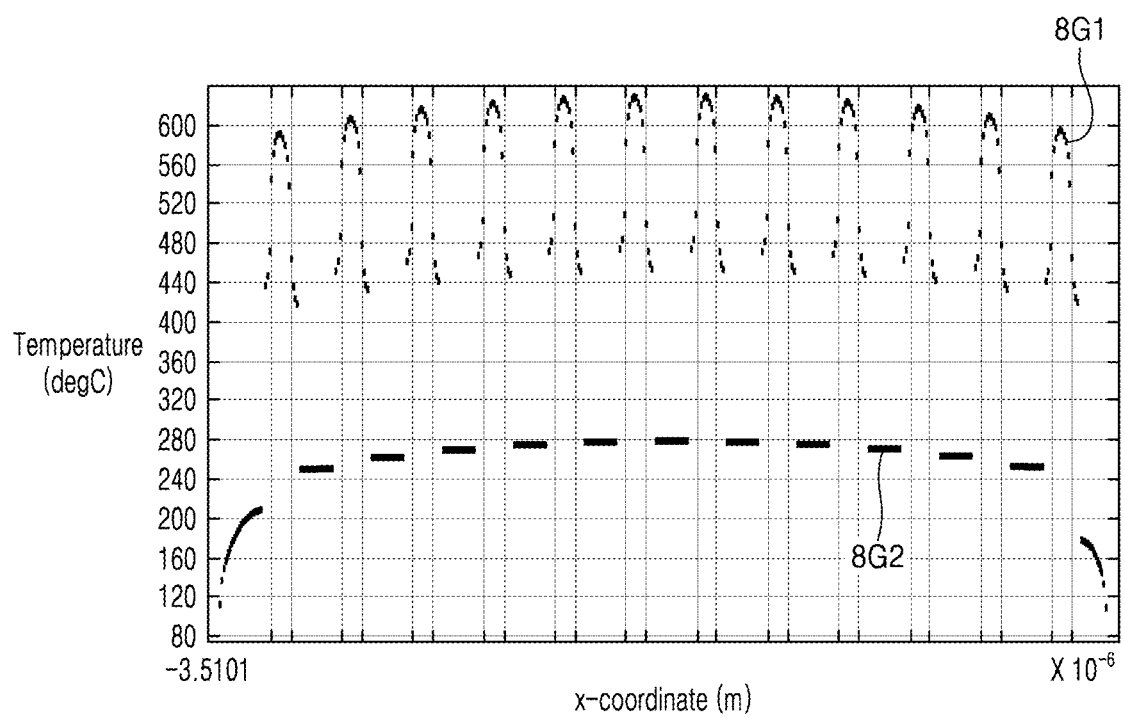
FIG. 15 is a graph showing a temperature distribution of a driving pixel and a non-driving pixel of the spatial light modulator according to the first driving method of FIG. 13.

FIG. 15 shows a temperature distribution of a driving pixel and a non-driving pixel in the first driving method. In FIG. 15, the horizontal axis indicates position, and the vertical axis indicates temperature. In FIG. 15, a plurality of first graphs 8G1 indicate a temperature distribution for the driving pixel 150, and a second graph 8G2 indicates a temperature distribution for the non-driving pixel 140, respectively. Each of the plurality of first graphs 8G1 represents one driving pixel, and each of points constituting one graph 8G1 represents an HCG included in one driving pixel. In addition, each node constituting the second graph 8G2 represents one non-driving pixel.

Referring to the first and second graphs 8G1 and 8G2 of FIG. 15, driving pixels are distributed at a range from about 420° C. to about 630° C., and non-driving pixels are distributed at about 280° C. or less. Accordingly, a maximum temperature difference between the adjacent driving pixels and the non-driving pixel is about 350° C.

Figure 16:
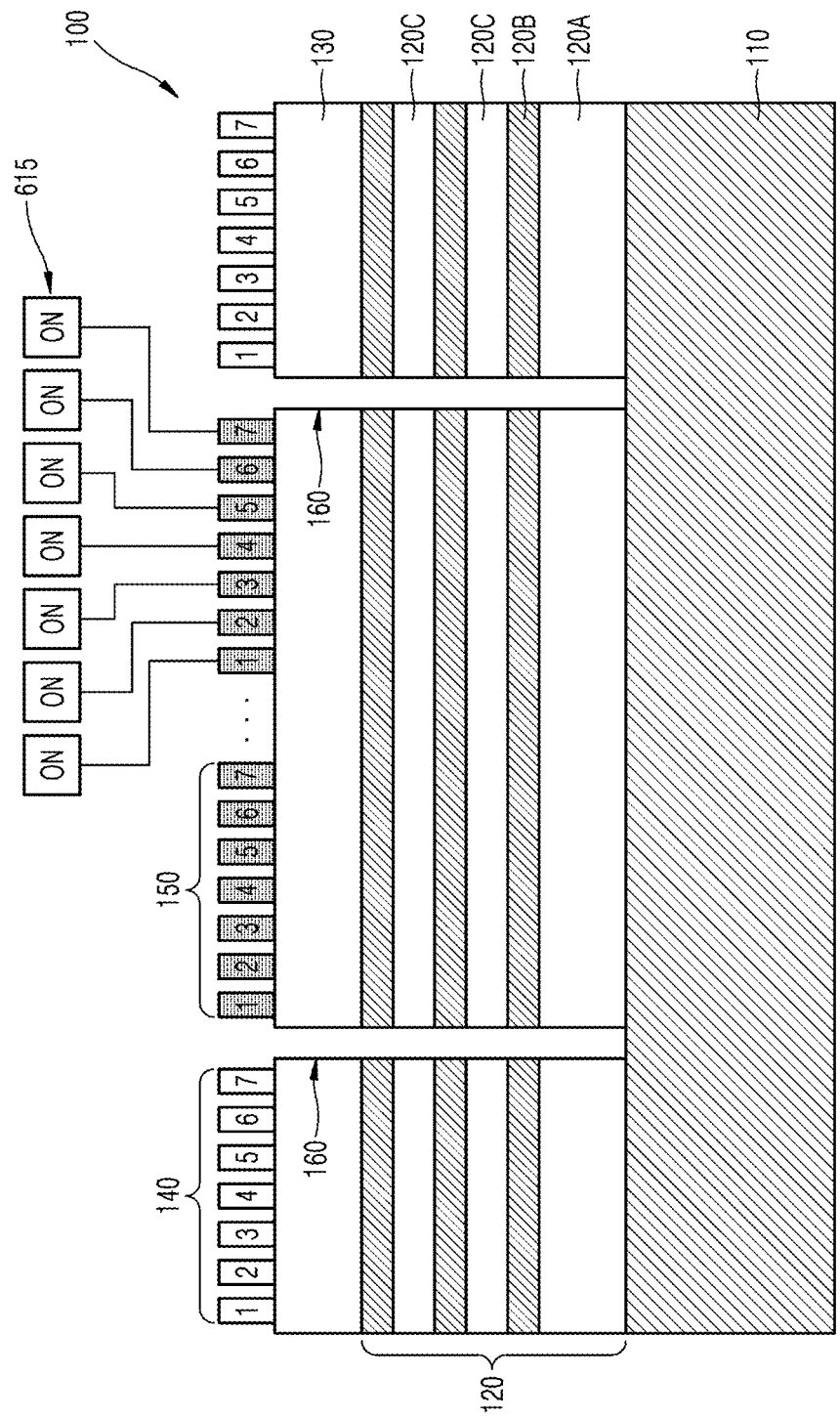
FIG. 16 is a cross-sectional view illustrating a second driving method of a spatial light modulator according to an embodiment.

FIG. 16 shows a second driving method of a spatial light modulator according to an example embodiment. In one example, the second driving method may be explained using the first spatial light modulator 100, and only parts different from the first driving method will be described.

Referring to FIG. 16, in the second driving method, a current is applied to all of the first to seventh HCGs 1 to 7 included in the second pixel 150 which is a driving pixel. At this time, all of the current controllers 615 are in a turned-on state. A current is applied to all of the HCGs 1 to 7 included in the second pixel 150, and in this case, a temperature distribution of the second pixel 150 may be uniform as a whole.

Even when a current is applied to the second pixel 150, that is, all the HCGs 1 to 7 included in the driving pixel 150, due to the trench 160 formed between the driving pixel 150 and the non-driving pixel 140, heat transfer from the driving pixel 150 to the non-driving pixel 140 may be minimized or blocked.

This fact may be confirmed from simulation results for heat generation and transfer according to the driving of the first spatial light modulator 100 shown in FIG. 10.

The settings for the first spatial light modulator 100 used to obtain the simulation results of FIG. 17 may be the same as those settings described with reference to FIG. 14.

Figure 17:
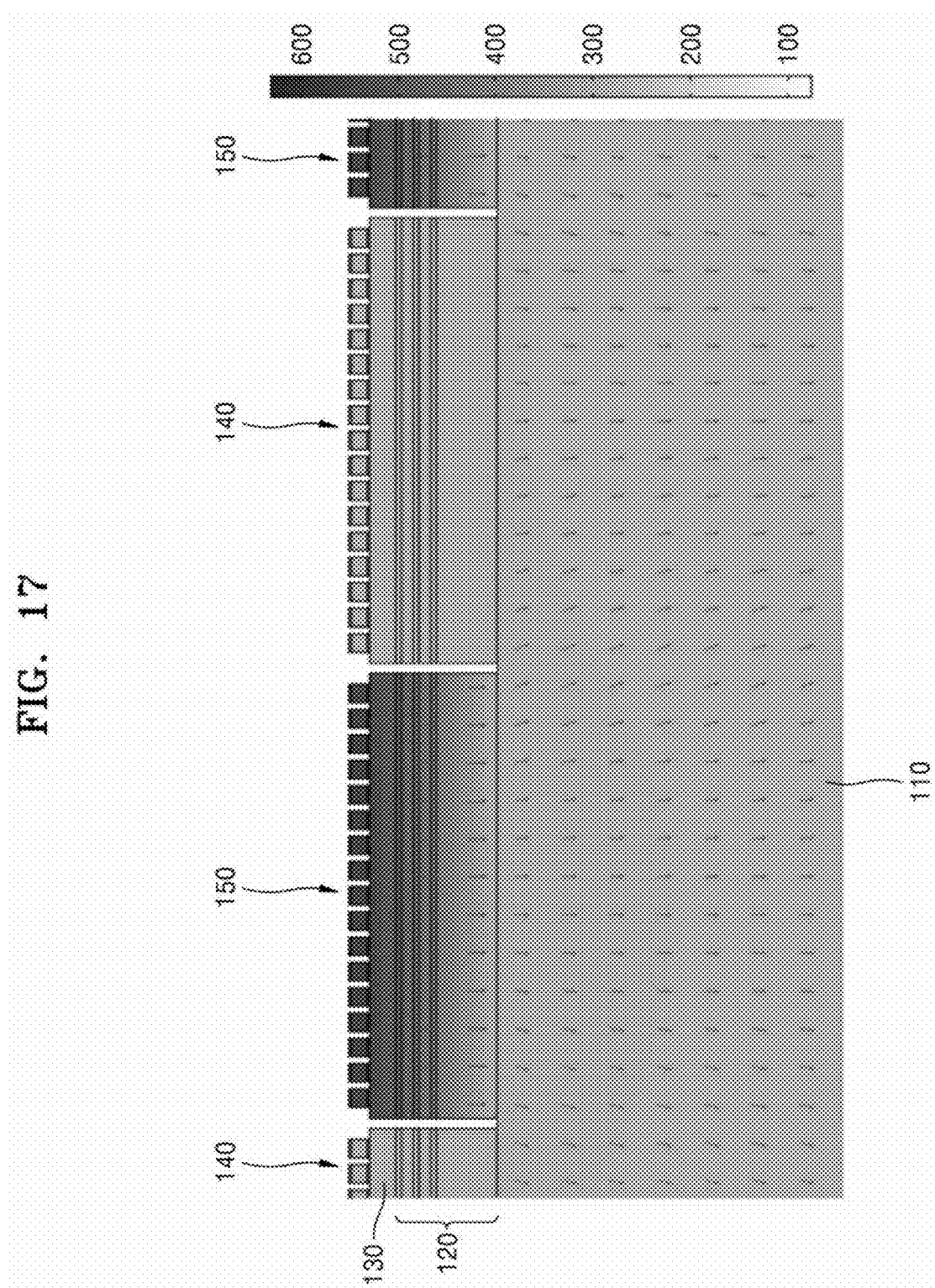
FIG. 17 is a cross-sectional view illustrating simulation results for the transmission of heat generated in a driving pixel of the spatial light modulator according to the second driving method of FIG. 16.

Referring to FIG. 17, it may be confirmed that the driving pixel 150 maintains a relatively high temperature and the non-driving pixel 140 maintains a relatively low temperature. It may be seen that, as indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

This result of FIG. 17 suggests that there is substantially no heat leakage from the driving pixel 150.

Figure 18:
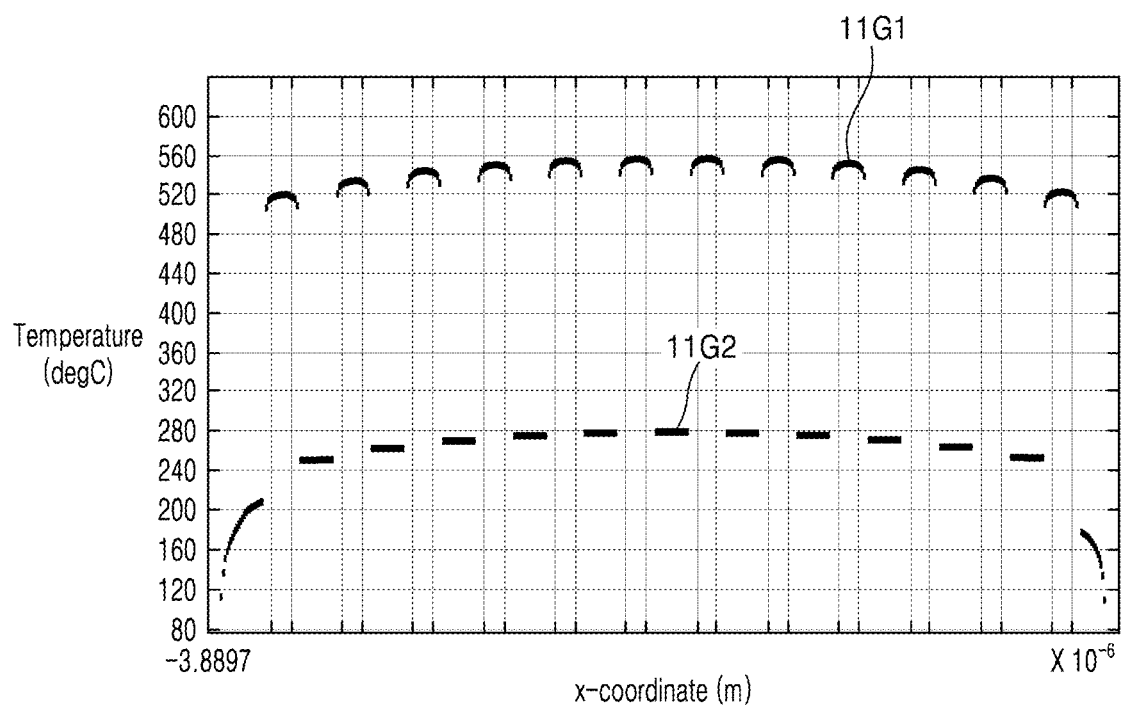
FIG. 18 is a graph showing a temperature distribution of a driving pixel and a non-driving pixel of the spatial light modulator according to the second driving method of FIG. 16.

FIG. 18 shows a temperature distribution of a driving pixel and a non-driving pixel in the second driving method.

In FIG. 18, the horizontal axis indicates position, and the vertical axis indicates temperature.

In FIG. 18, a first graph 11G1 shows a temperature distribution for the driving pixel, and a second graph 11G2 shows a temperature distribution for the non-driving pixel, respectively. Each of convex nodes constituting the first graph 11G1 represents one driving pixel. In addition, each node constituting the second graph 11G2 represents one non-driving pixel.

Comparing the first graph 11G1 of FIG. 18 and the first graph 8G1 of FIG. 15, in the case of the second driving method, a temperature difference between the HCGs included in each driving pixel is not large, and accordingly, in the second driving method, it may be seen that a temperature distribution of each driving pixel is uniform as a whole.

Referring to the first and second graphs 11G1 and 11G2 of FIG. 18, the driving pixels are distributed at a temperature range of about 510° C. to about 558° C., and the non-driving pixels are distributed at 280° C. or less. Accordingly, a maximum temperature difference between the adjacent driving pixel and the non-driving pixel is about 278° C.

The first and second driving methods described above may be equally applied to the driving of other spatial light modulators other than the first spatial light modulator 100.

Figure 19:
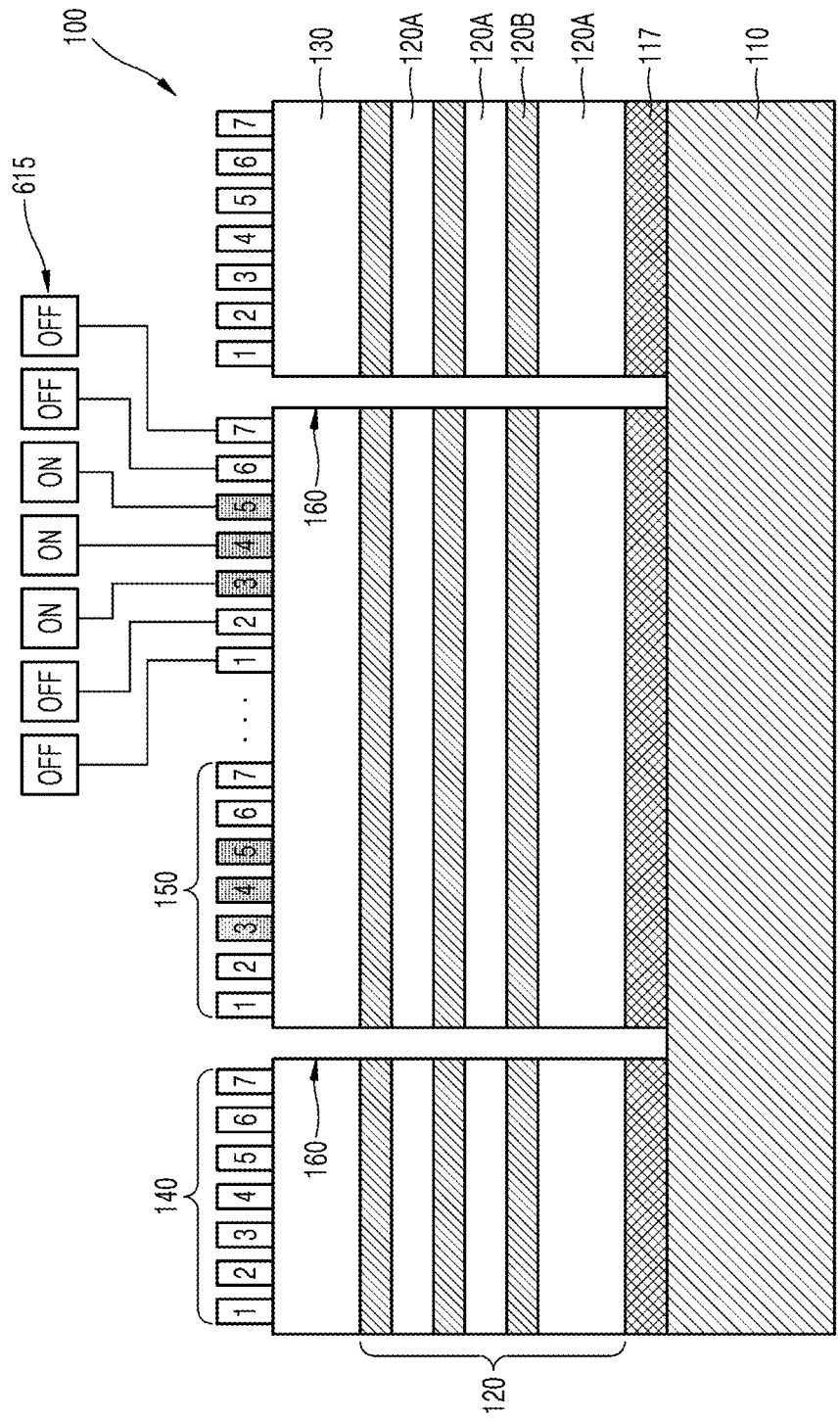
FIG. 19 is a cross-sectional view illustrating a case in which the first driving method is applied to the spatial light modulator of FIG. 2.

As an example, FIG. 19 shows a case in which the first driving method is applied to the spatial light modulator illustrated in FIG. 2.

Referring to FIG. 19, in the HCGs 1 to 7 included in the driving pixel 150, no current is applied to the HCG at an edge, but a current is applied only to the HCG in an inner region. In addition, the trench 160 is present between the driving pixel 150 and the non-driving pixel 140. Accordingly, it is possible to minimize or block heat generated from the driving pixel 150 from being transferred to the adjacent non-driving pixel 140.

Figure 20:
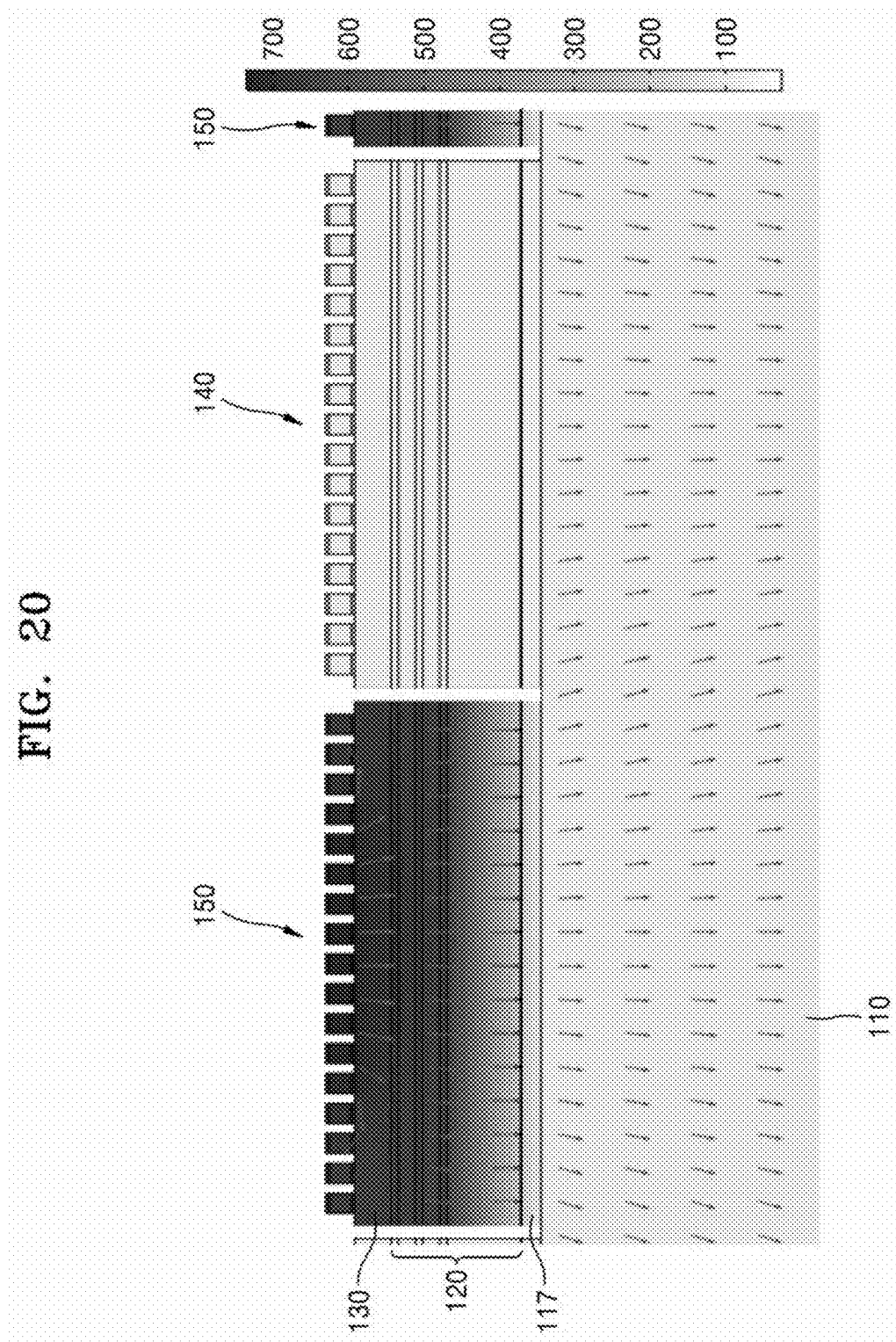
FIG. 20 is a cross-sectional view illustrating a simulation result for the transmission of heat generated in a driving pixel when the spatial light modulator of FIG. 2 is driven by the first driving method.

This fact may be seen through a simulation of heat generation and transfer when the spatial light modulator illustrated in FIG. 2 is driven according to the first driving method. FIG. 20 shows the simulation results.

In setting for the spatial light modulator illustrated in FIG. 2, used to obtain the simulation result of FIG. 20, the low thermal conductivity layer 117 was set as a $MoS_2$ layer, the thermal conductivity of the low thermal conductivity layer 117 was set as 0.16 W/(m·K), and the thickness of the low thermal conductivity layer 117 was set to be the same as the thickness of the remaining first layer 120A except for the lowermost first layer 120A of the DBR layer 120. Other settings were the same as the settings described with reference to FIG. 14.

Referring to FIG. 20, it may be seen that the driving pixel 150 maintains a relatively high temperature and the non-driving pixel 140 maintains a relatively low temperature. Joule heat generated in the driving pixel 150 may move to a lower end of the driving pixel 150 and be transferred to the substrate 110 through the low thermal conductivity layer 117 as indicated by the arrows, but comparing the color, that is, the color representing the temperature of the substrate 110 with a region above the low thermal conductivity layer 117, the temperature of the substrate 110 is much lower than the temperature of the region above the low thermal conductivity layer 117. This suggests that, due to the provision of the low thermal conductivity layer 117, heat transferred from the driving pixel 150 to the substrate 110 is reduced compared to when the low thermal conductivity layer 117 is not provided. In other words, because the low thermal conductivity layer 117 is provided, the thermal blocking effect between the driving pixel 150 and the substrate 110 may be increased.

In addition to the existence of the trench 160 between the driving pixel 150 and the non-driving pixel 140, the low thermal conductivity layer 117 is also present below the non-driving pixel 140. Thus, the heat transfer from the driving pixel 150 to the non-driving pixel 140 may further be reduced, and this fact may be known through color comparison between the driving pixel 150 and the non-driving pixel 140.

As a result, the thermal blocking effect between the driving pixel 150 and the non-driving pixel 140 may further be increased due to the existence of the low thermal conductivity layer 117.

The result of FIG. 20 suggests that there is substantial no heat leakage from the driving pixel 150.

In FIG. 20, a length of arrows represents a log value of a size of heat flow.

Figure 21:
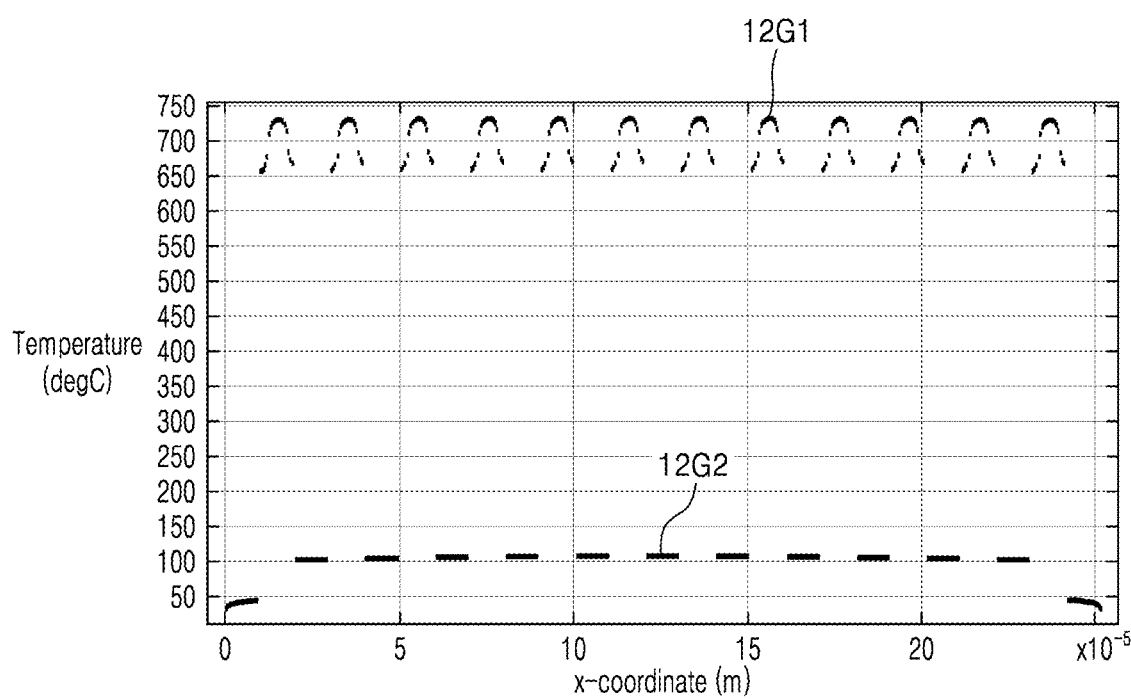
FIG. 21 is a graph illustrating temperature distributions of a driving pixel and a non-driving pixel when the spatial light modulator of FIG. 2 is driven by the first driving method.

FIG. 21 shows a temperature distribution of the driving pixel 150 and the non-driving pixel 140 in the simulation of FIG. 20. In FIG. 21, the horizontal axis indicates position, and the vertical axis indicates temperature.

In FIG. 21, a plurality of first graphs 12G1 indicate a temperature distribution for the driving pixel 150, and a second graph 12G2 indicates a temperature distribution for the non-driving pixel 140, respectively. Each of the plurality of first graphs 12G1 represents a temperature distribution for one driving pixel, and points forming one first graph 12G1 each represent HCG included in one driving pixel. Each node constituting the second graph 12G2 represents one non-driving pixel, and points constituting each node represent HCG included in the non-driving pixel.

Referring to the first and second graphs 12G1 and 12G2 of FIG. 21, the temperature of the driving pixels is greater than 650° C. and less than 750° C., and the temperatures of the driving pixels in this temperature range are substantially the same. In other words, the maximum temperatures of the driving pixels in this temperature range are substantially equal to each other, and the minimum temperatures are also substantially equal to each other. An average temperature of the driving pixels is about 734° C., and an average temperature of the non-driving pixels is about 106° C. Accordingly, a temperature difference between the adjacent driving pixel and the non-driving pixel is about 628° C.

Figure 22:
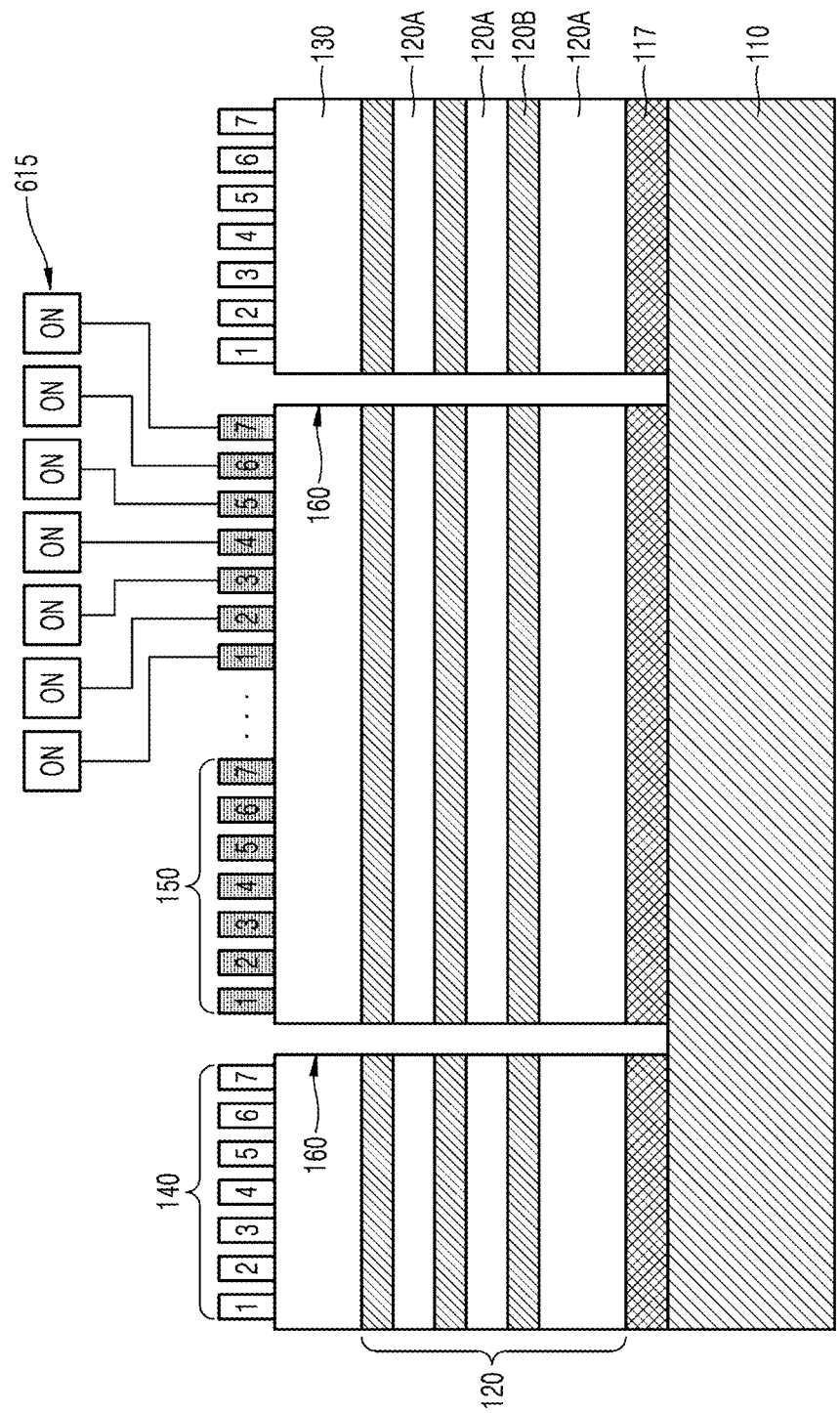
FIG. 22 is a cross-sectional view illustrating a case in which the second driving method is applied to the spatial light modulator of FIG. 2.

FIG. 22 shows a case in which the second driving method is applied to the spatial light modulator illustrated in FIG. 2. A simulation result for heat generation and transfer in the driving pixel in this case may be the same as or substantially the same as the case in which the first driving method is applied to the spatial light modulator illustrated in FIG. 2.

Figure 23:
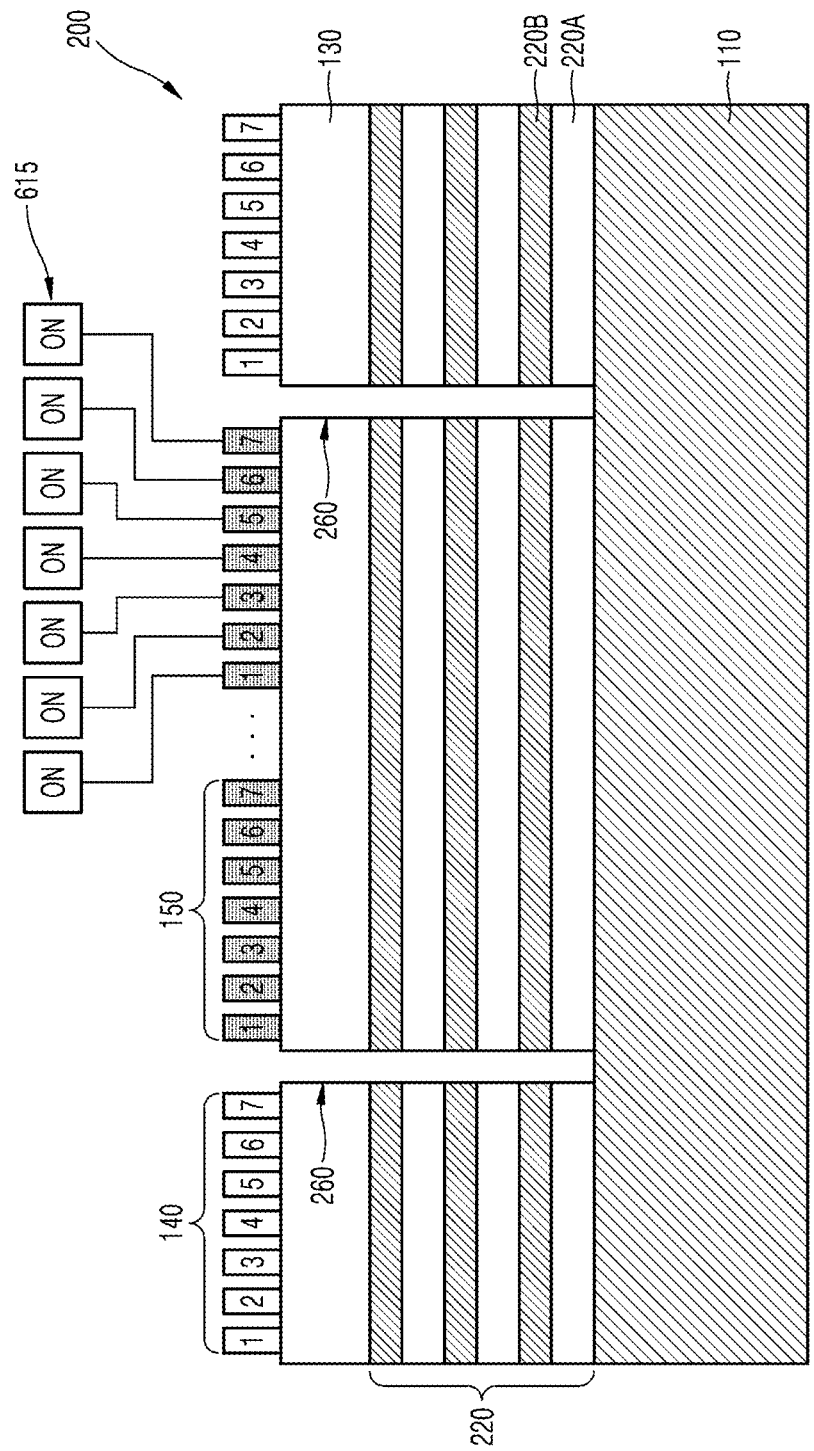
FIG. 23 is a cross-sectional view illustrating a case in which a second driving method is applied to a second spatial light modulator according to an embodiment.

FIG. 23 shows a case in which the second driving method is applied to the second spatial light modulator 200.

Also, in this case, heat transfer from the driving pixel 150 to the non-driving pixel 140 may be minimized or blocked due to the trench 160 formed between the driving pixel 150 and the non-driving pixel 140.

Figure 24:
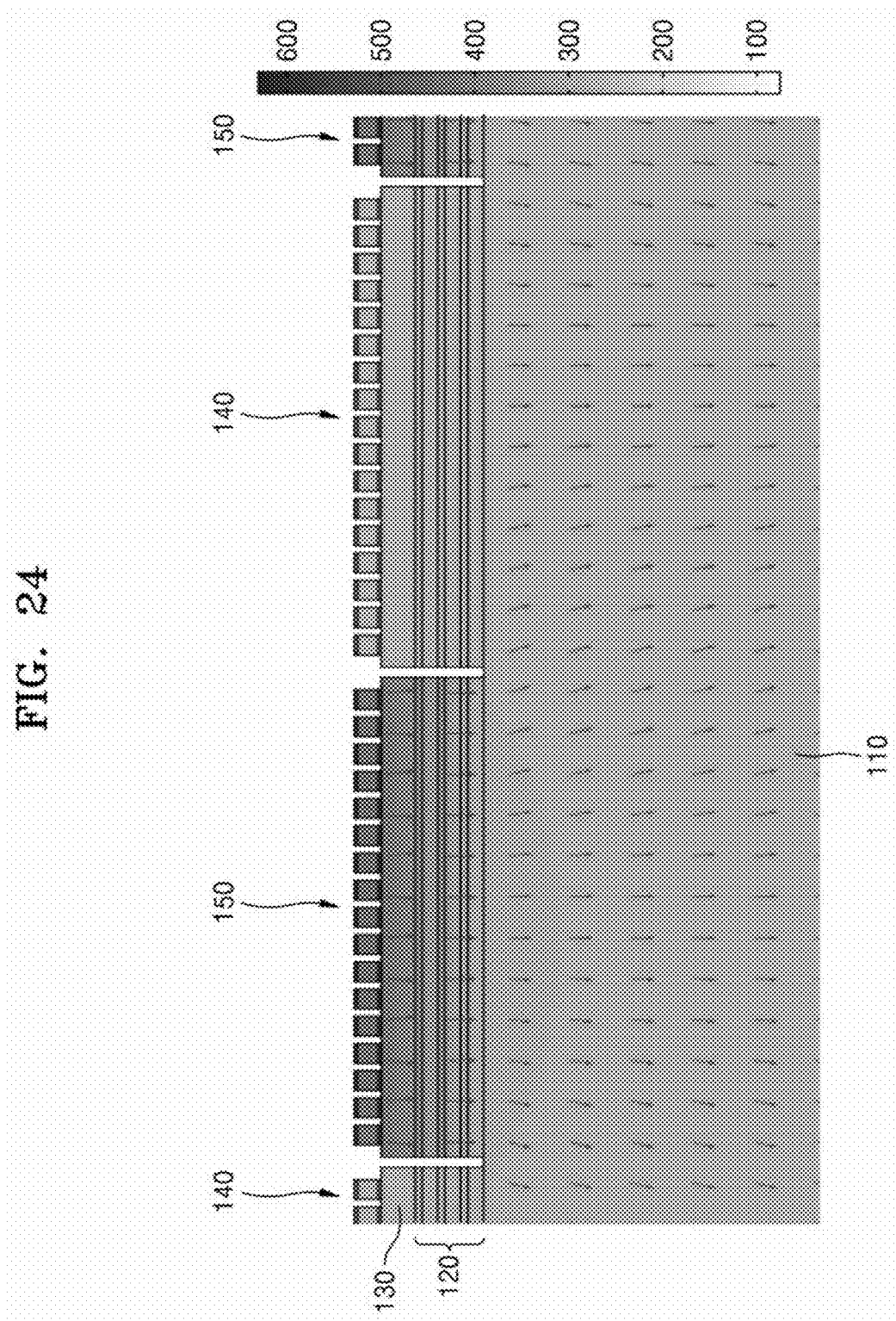
FIG. 24 is a cross-sectional view illustrating simulation results for the transmission of heat generated in a driving pixel of a spatial light modulator in the case of FIG. 23.

This fact may be confirmed from simulation results for heat generation and transfer according to the driving of the second spatial light modulator 200 driven by the second driving method shown in FIG. 24.

The settings for the second spatial light modulator 200 used to obtain the simulation results of FIG. 24 may be the same as those settings described with reference to FIG. 14 except that the thickness of all of the first layers 220A included in the DBR layer 220 of the second spatial light modulator 200 is the same or substantially the same.

Referring to FIG. 24, it may be confirmed that the driving pixel 150 maintains a relatively high temperature and the non-driving pixel 140 maintains a relatively low temperature. It may be seen that, as indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

This result of FIG. 24 suggests that there is no heat leakage from the driving pixel 150.

Figure 25:
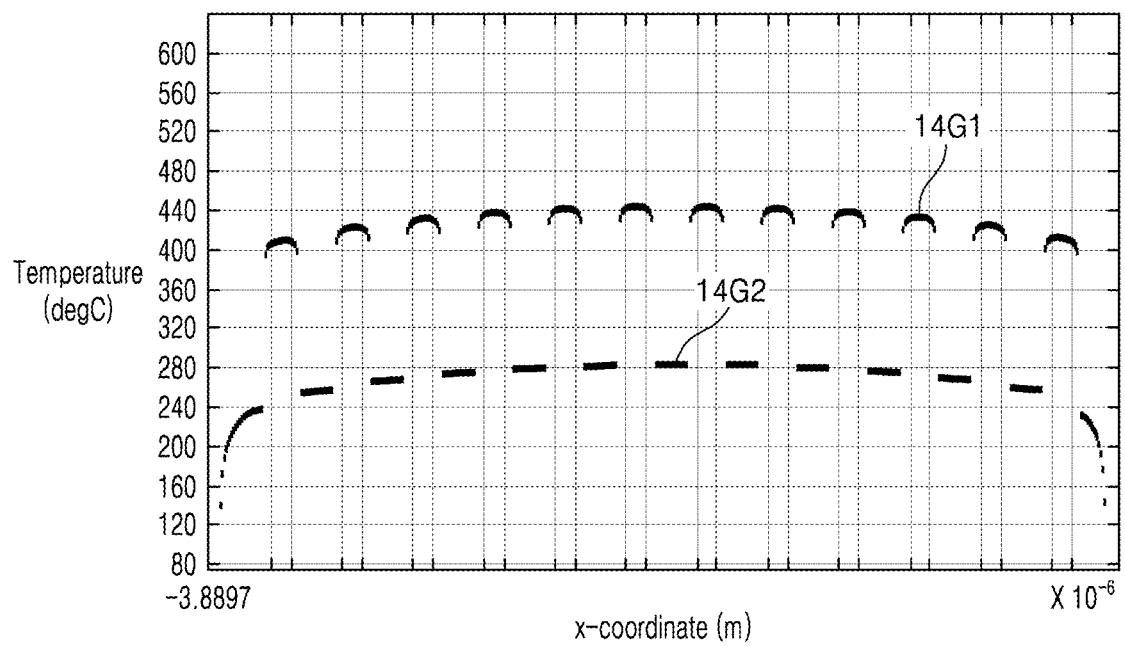
FIG. 25 is a graph showing a temperature distribution of a driving pixel and a non-driving pixel of the spatial light modulator in the case of FIG. 23.

FIG. 25 shows a temperature distribution of a driving pixel and a non-driving pixel in the second spatial light modulator 200 driven by the second driving method.

In FIG. 25, the horizontal axis indicates position, and the vertical axis indicates temperature.

In FIG. 25, a first graph 14G1 shows a temperature distribution for the driving pixel, and a second graph 14G2 indicates a temperature distribution for the non-driving pixel, respectively. Each of convex nodes constituting the first graph 14G1 represents one driving pixel. In addition, each node constituting the second graph 14G2 represents one non-driving pixel.

The shape of each node of the first graph 14G1 of FIG. 25 is similar to the shape of each node of the first graph 11G1 of FIG. 18. This suggests that a temperature difference between the HCGs included in each driving pixel is not large and the temperature distribution of each driving pixel is uniform as a whole.

Referring to the first and second graphs 14G1 and 14G2 of FIG. 25, a temperature difference between the adjacent driving pixel and the non-driving pixel is about 165° C.

When the second spatial light modulator 200 is driven according to the second driving method, a process is relatively easy, and a uniform temperature distribution may be obtained in the driving pixel 150.

Figure 26:
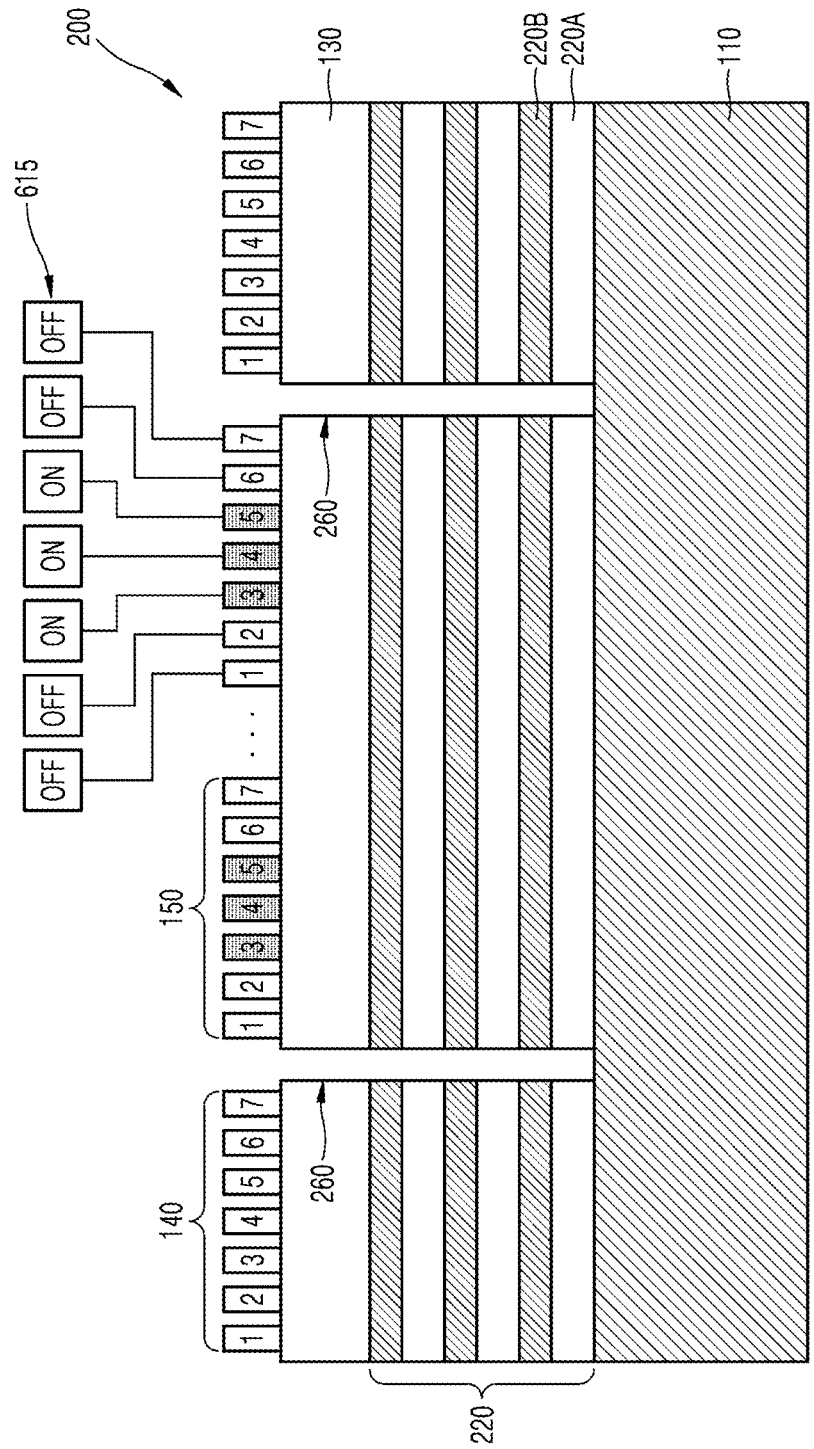
FIG. 26 is a cross-sectional view showing a case in which a first driving method is applied to a second spatial light modulator according to an example embodiment.

FIG. 26 shows a case in which the first driving method is applied to the second spatial light modulator 200. Also, in this case, heat transfer from the driving pixel 150 to the non-driving pixel 140 may be minimized or blocked due to the trench 160 formed between the driving pixel 150 and the non-driving pixel 140.

Figure 27:
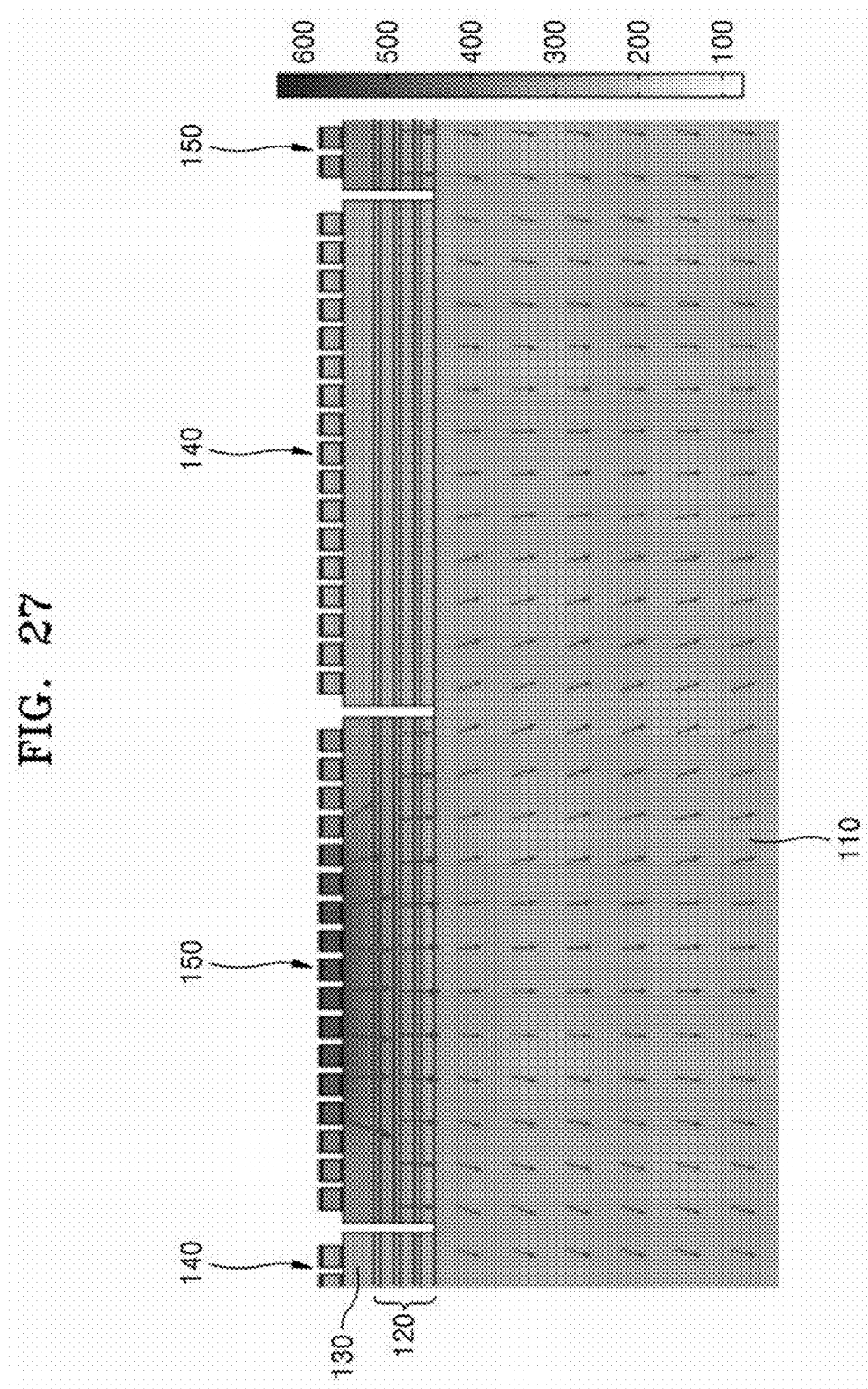
FIG. 27 is a cross-sectional view showing simulation results for the transmission of heat generated in a driving pixel of the spatial light modulator in the case of FIG. 26.

This fact may be confirmed from simulation results of heat generation and transfer according to the driving of the second spatial light modulator 200 driven by the first driving method shown in FIG. 27.

The settings for the second spatial light modulator 200 used to obtain the simulation results of FIG. 27 may be the same as those settings described with reference to FIG. 14 except that the thickness of all of the first layers 220A included in the DBR layer 220 of the second spatial light modulator 200 is the same or substantially the same.

Referring to FIG. 27, it may be confirmed that the temperature is the highest in a central region of the driving pixel 150, the temperature decreases toward the edges, and the non-driving pixel 140 maintains a relatively low temperature. It may be seen that, as indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

This result of FIG. 27 suggests that there is no heat leakage from the driving pixel 150.

Figure 28:
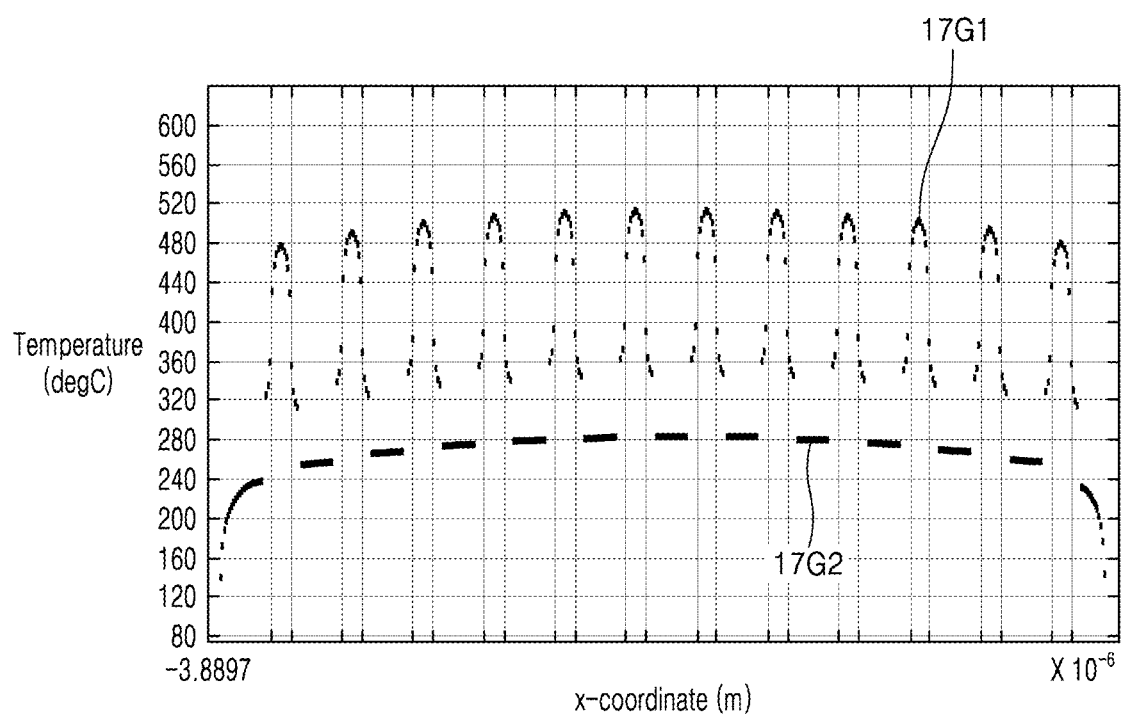
FIG. 28 is a graph showing a temperature distribution of a driving pixel and a non-driving pixel of the spatial light modulator in the case of FIG. 26.

FIG. 28 shows a temperature distribution of a driving pixel and a non-driving pixel in the second spatial light modulator 200 driven by the first driving method.

In FIG. 28, the horizontal axis indicates position, and the vertical axis indicates temperature.

In FIG. 28, a first graph 17G1 indicates a temperature distribution for the driving pixel, and a second graph 17G2 indicates a temperature distribution for the non-driving pixel, respectively.

Each of the plurality of first graphs 17G1 represents one driving pixel, and points constituting the one graph 17G1 each indicate an HCG included in the one driving pixel. In addition, each node constituting the second graph 17G2 represents one non-driving pixel.

Referring to the first and second graphs 17G1 and 17G2 of FIG. 28, a temperature difference between adjacent driving pixel and the non-driving pixel is about 228° C.

When the second spatial light modulator 200 is driven according to the first driving method, a process is relatively easy, and a relatively high temperature difference may be obtained between the driving pixel 150 and the non-driving pixel 140 compared to a case in which the second spatial light modulator 200 is driven by the second driving method.

Figure 29:
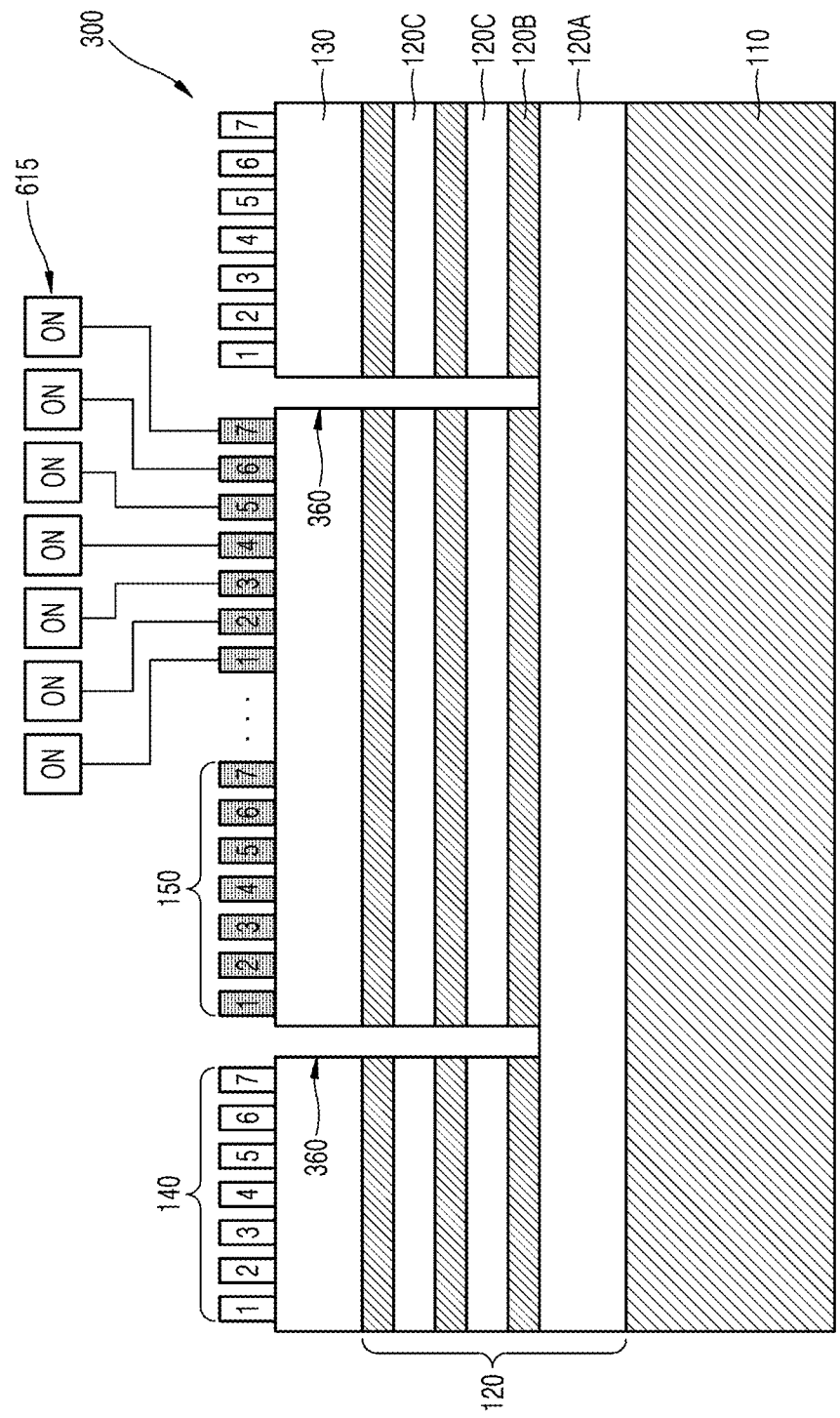
FIG. 29 is a cross-sectional view showing a case in which a second driving method is applied to a third spatial light modulator according to an example embodiment.

FIG. 29 shows a case in which the second driving method is applied to the third spatial light modulator 300.

In the case when the second driving method is applied to the third spatial light modulator 300, heat transfer from the driving pixel 150 to the non-driving pixel 140 may be minimized or blocked due to the trench 160 formed between the driving pixel 150 and the non-driving pixel 140.

Figure 30:
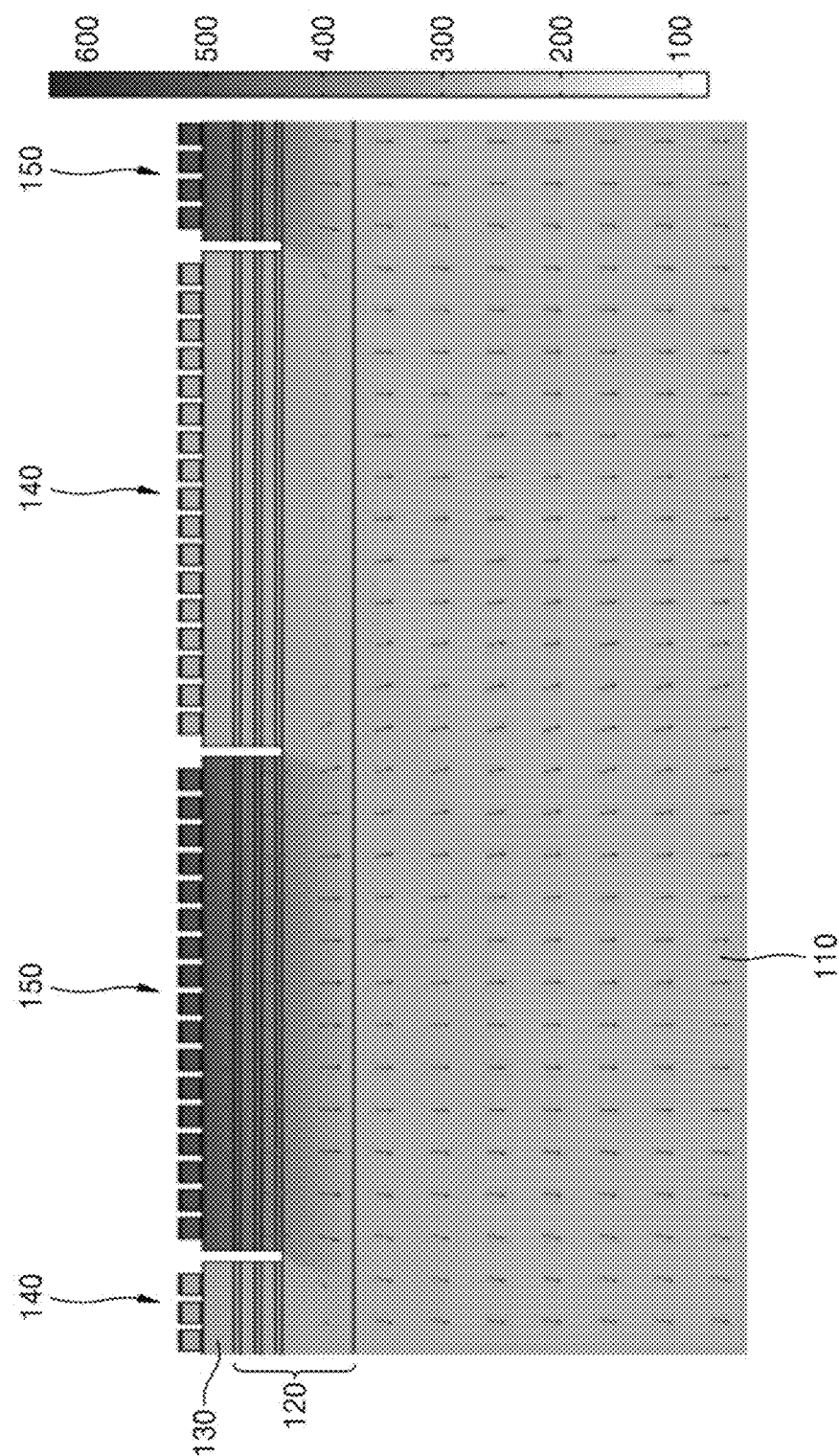
FIG. 30 is a cross-sectional view illustrating simulation results for the transmission of heat generated in a driving pixel of a spatial light modulator in the case of FIG. 29.

This fact may be confirmed from simulation results of heat generation and transfer according to the driving of the third spatial light modulator 300 shown in FIG. 30.

The settings for the third spatial light modulator 300 used to obtain the simulation results of FIG. 30 may be the same as those settings described with reference to FIG. 14 except that the trench 360 does not penetrate through the lowermost first layer 120A of the DBR layer 120.

Referring to FIG. 30, it may be confirmed that the driving pixel 150 maintains a relatively high temperature and the non-driving pixel 140 maintains a relatively low temperature. It may be seen that, as indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

This result of FIG. 30 suggests that there is no heat leakage from the driving pixel 150.

Figure 31:
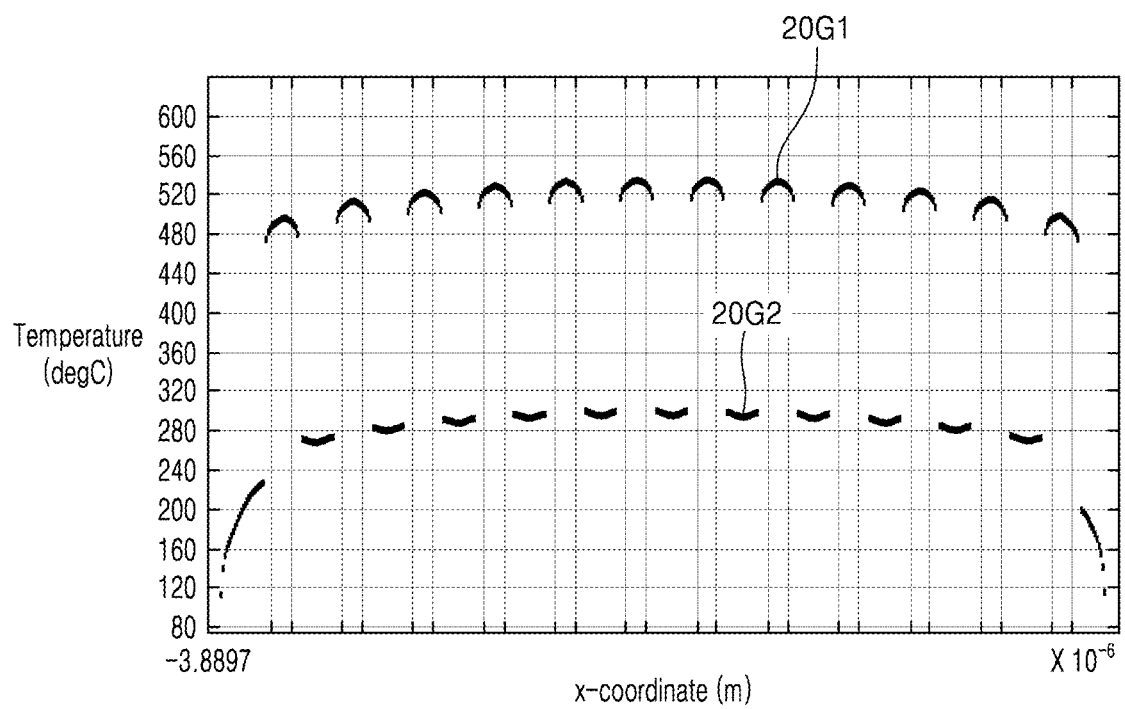
FIG. 31 is a graph showing a temperature distribution of a driving pixel and a non-driving pixel of the spatial light modulator in the case of FIG. 29.

FIG. 31 shows a temperature distribution of a driving pixel and a non-driving pixel when the third spatial light modulator 300 is driven by the second driving method.

In FIG. 31, the horizontal axis indicates position, and the vertical axis indicates temperature.

In FIG. 31, a first graph 20G1 shows a temperature distribution for the driving pixel, and a second graph 20G2 shows a temperature distribution for the non-driving pixel, respectively. Each convex node constituting the first graph 20G1 represents one driving pixel. In addition, each node constituting the second graph 20G2 represents one non-driving pixel.

The shape of each node that is slightly convex above the first graph 20G1 of FIG. 31 is similar to the shape of each node of the first graph 11G1 of FIG. 18 or the first graph 14G1 of FIG. 25. This suggests that, even when the third spatial light modulator 300 is driven by the second driving method, the temperature difference between the HCGs included in each driving pixel is not large and the temperature distribution of each driving pixel is uniform as a whole.

Referring to the first and second graphs 20G1 and 20G2 of FIG. 31, the temperature difference between the adjacent driving pixel and the non-driving pixel is about 238° C. When the third spatial light modulator 300 is driven by the second driving method, a process is relatively easy and a uniform temperature distribution may be obtained in the driving pixel 150.

Figure 32:
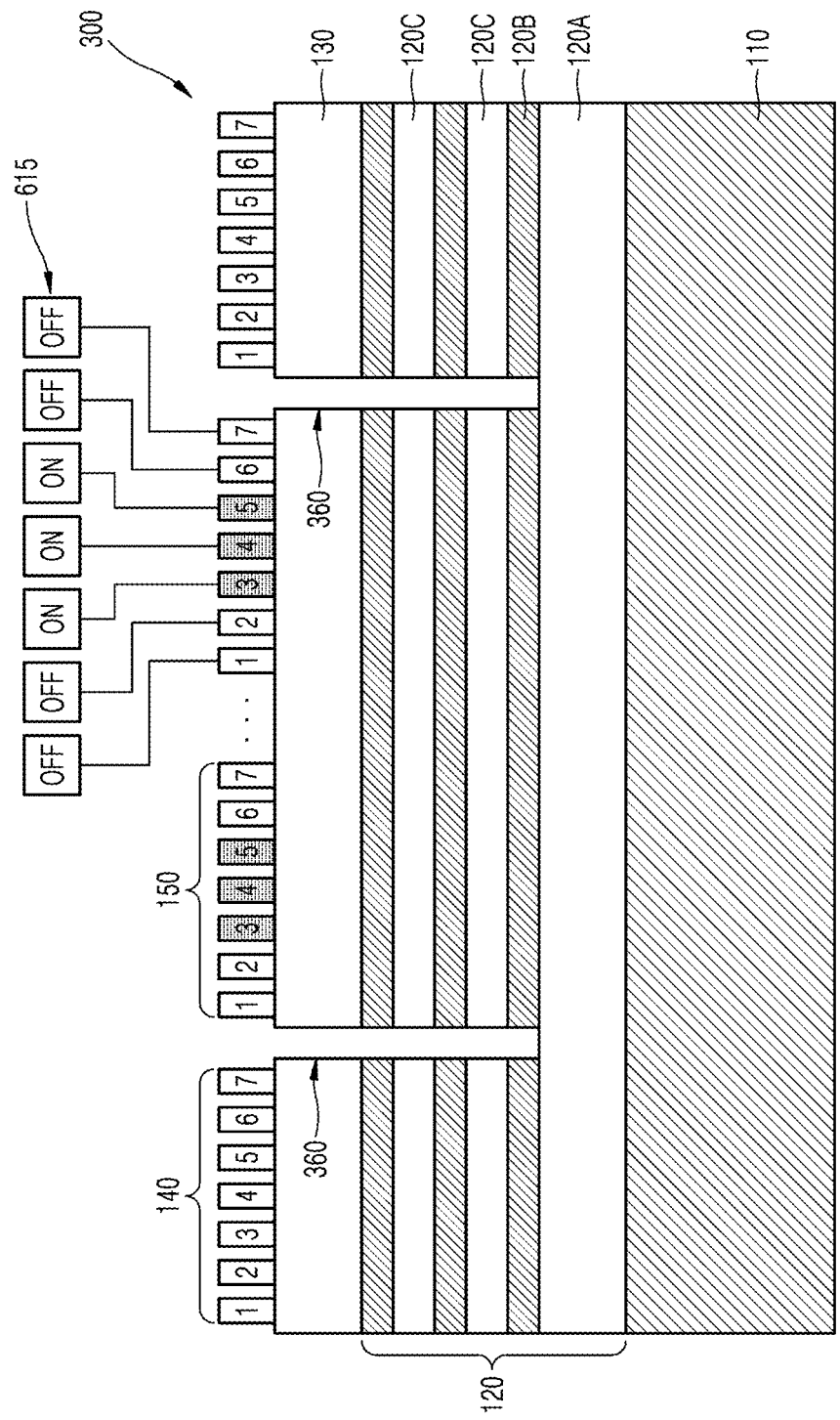
FIG. 32 is a cross-sectional view showing a case in which a first driving method is applied to a third spatial light modulator according to an example embodiment.

FIG. 32 shows a case in which the first driving method is applied to the third spatial light modulator 300. Also, in this case, due to the trench 160 formed between the driving pixel 150 and the non-driving pixel 140 and because no current is applied to the HCGs 1, 2, 6, and 7 adjacent to the non-driving pixel 140 of the driving pixel 150, the transfer of heat from the driving pixel 150 to the non-driving pixel 140 may be minimized or blocked.

Figure 33:
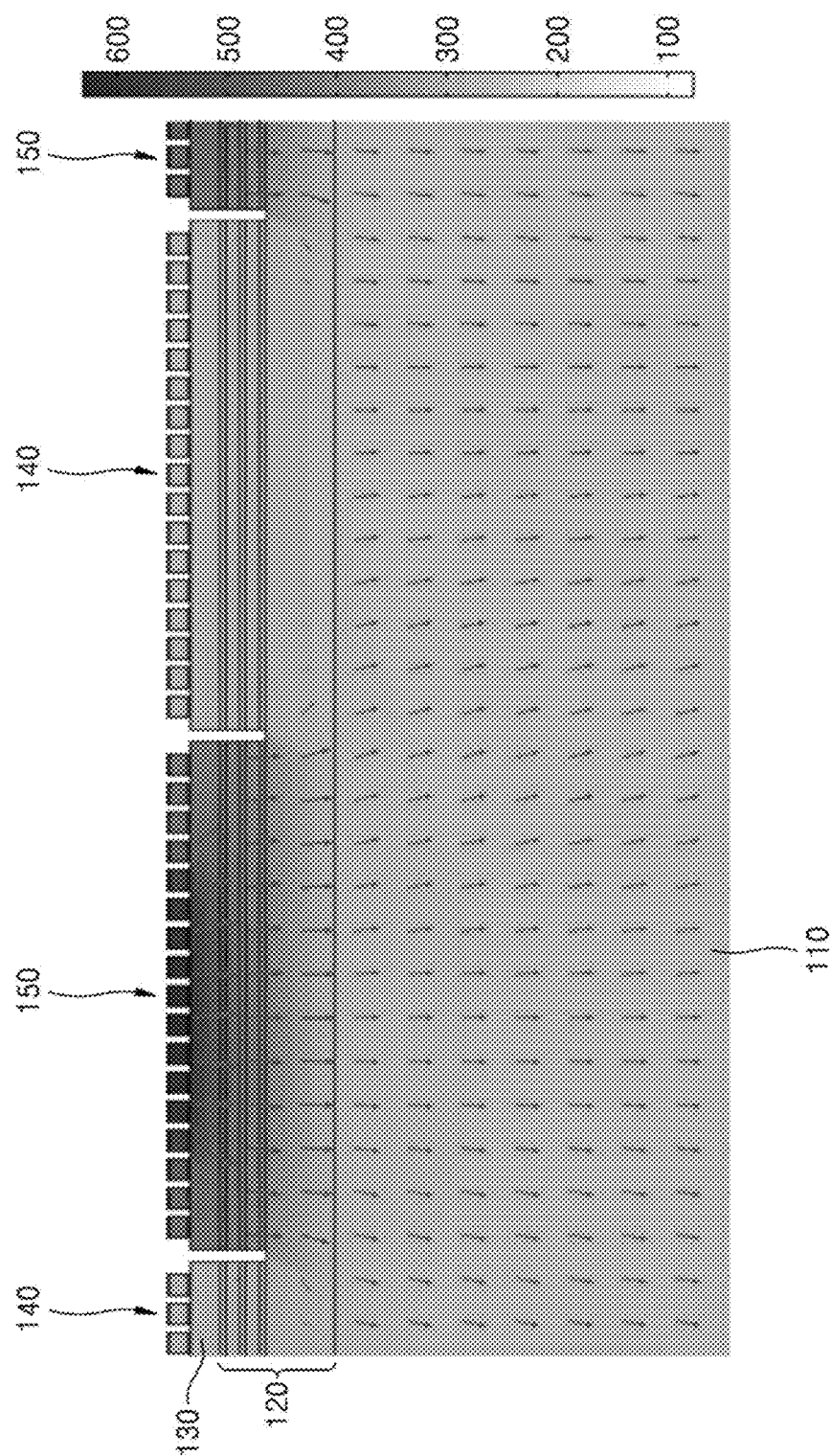
FIG. 33 is a cross-sectional view illustrating simulation results for the transmission of heat generated in a driving pixel of a spatial light modulator in the case of FIG. 32.

This fact may be confirmed from simulation results of heat generation and transfer according to the driving of the third spatial light modulator 300 by the first driving method shown in FIG. 33.

The settings for the third spatial light modulator 300 used to obtain the simulation results of FIG. 33 may be the same as the settings for the simulation in which the third spatial light modulator 300 is driven by the second driving method.

Referring to FIG. 33, it may be seen that the temperature is the highest in the central region of the driving pixel 150, the temperature decreases toward the edges, and the non-driving pixel 140 maintains a relatively low temperature. It may be seen that, as indicated by arrows, Joule heat generated in the driving pixel 150 moves to a lower end of the corresponding driving pixel 150 and is transferred to a lower end of the substrate 110 through the substrate 110, and is not transmitted to the non-driving pixel 140.

As a result, FIG. 33 suggests that, even when the third spatial light modulator 300 is driven by the first driving method, there is no heat leakage from the driving pixel 150.

Figure 34:
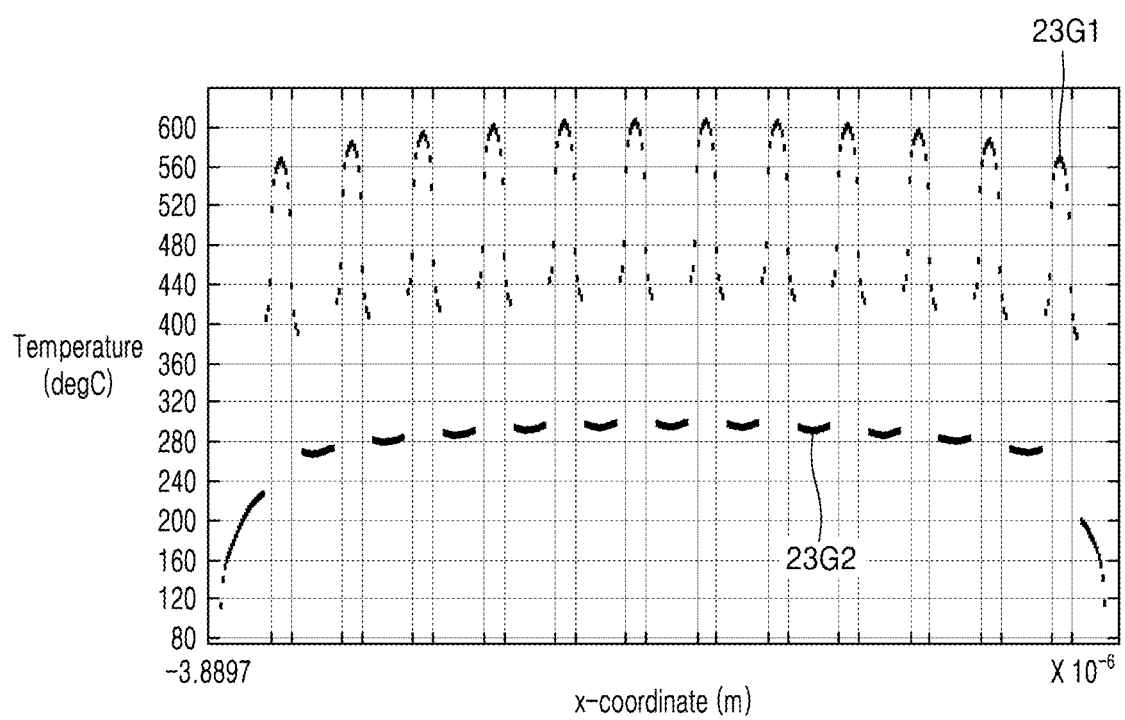
FIG. 34 is a graph showing a temperature distribution of a driving pixel and a non-driving pixel of the spatial light modulator in the case of FIG. 32.

FIG. 34 shows a temperature distribution of a driving pixel and a non-driving pixel when the third spatial light modulator 300 is driven by the first driving method.

In FIG. 34, the horizontal axis indicates position, and the vertical axis indicates temperature.

In FIG. 34, first graphs 23G1 show temperature distributions for driving pixels, and a second graph 23G2 shows a temperature distribution for a non-driving pixel, respectively.

Each of the plurality of first graphs 23G1 represents one driving pixel, and points constituting the one graph 23G1 each indicate an HCG included in one driving pixel. In addition, each node constituting the second graph 23G2 represents one non-driving pixel.

Referring to the first and second graphs 23G1 and 23G2 of FIG. 34, a maximum temperature difference between the adjacent driving pixel and the non-driving pixel is about 310° C. When the third spatial light modulator 300 is driven by the first driving method, the process is relatively easy, and a greater temperature difference may be obtained compared to the case when the second spatial light modulator 200 is driven by the first driving method and the case when the third spatial light modulator 300 is driven by the second driving method.

Figure 35:
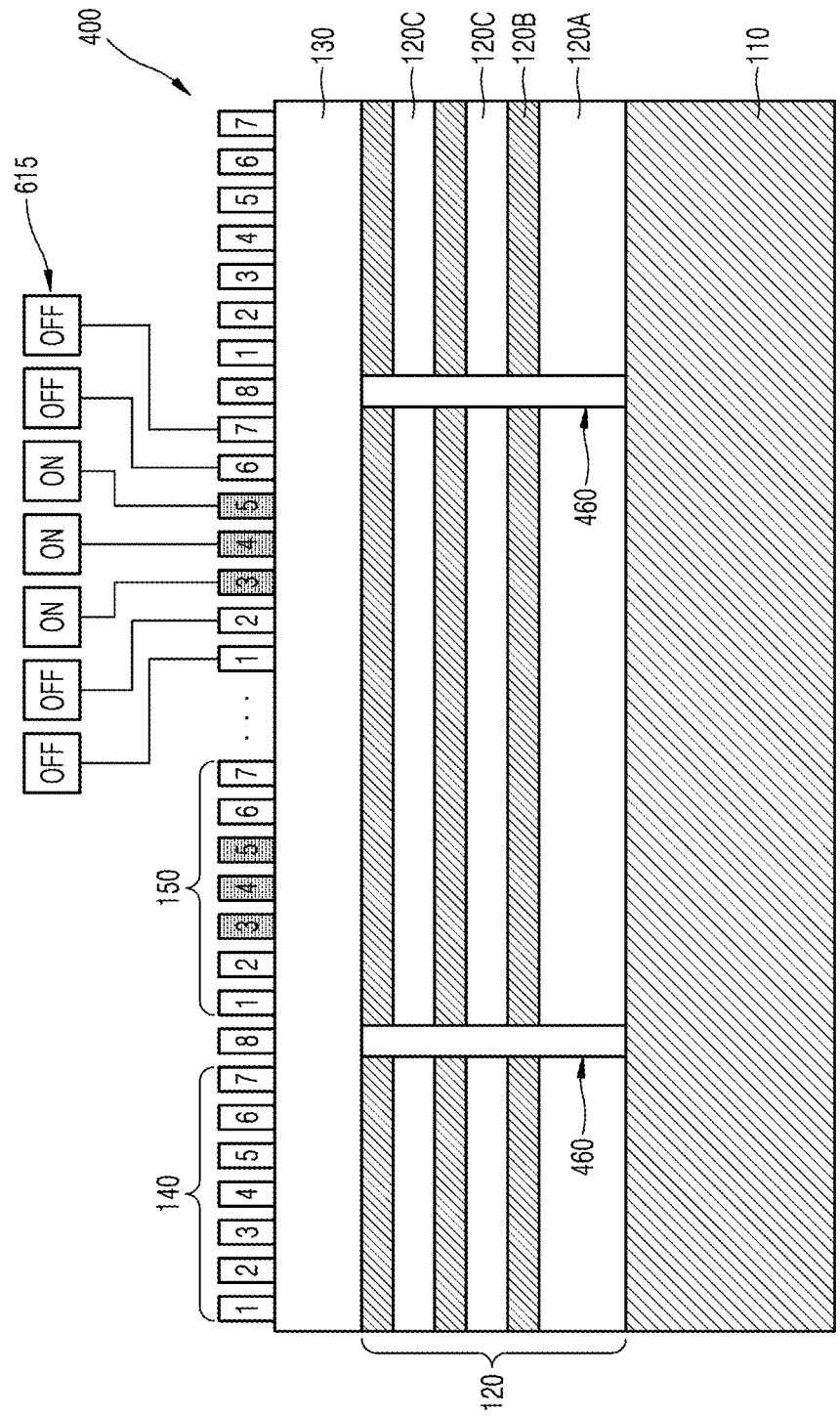
FIG. 35 is a cross-sectional view showing a case in which a first driving method is applied to a fourth spatial light modulator according to an example embodiment.

FIG. 35 shows a case in which the first driving method is applied to the fourth spatial light modulator 400.

In the case of the fourth spatial light modulator 400, the trench 460 formed between the driving pixel 150 and the non-driving pixel 140 does not penetrate through the cavity layer 130, but completely penetrates through the DBR layer 120. Accordingly, the second layer 120B having relatively high thermal conductivity is disconnected between the driving pixel 150 and the non-driving pixel 140. At the same time, because no current is applied to the HCGs 1, 2, 6, and 7 of the driving pixel 150 adjacent to the non-driving pixel 140, heat transfer from the driving pixel 150 to the non-driving pixel 140 may be minimized or blocked.

Figure 36:
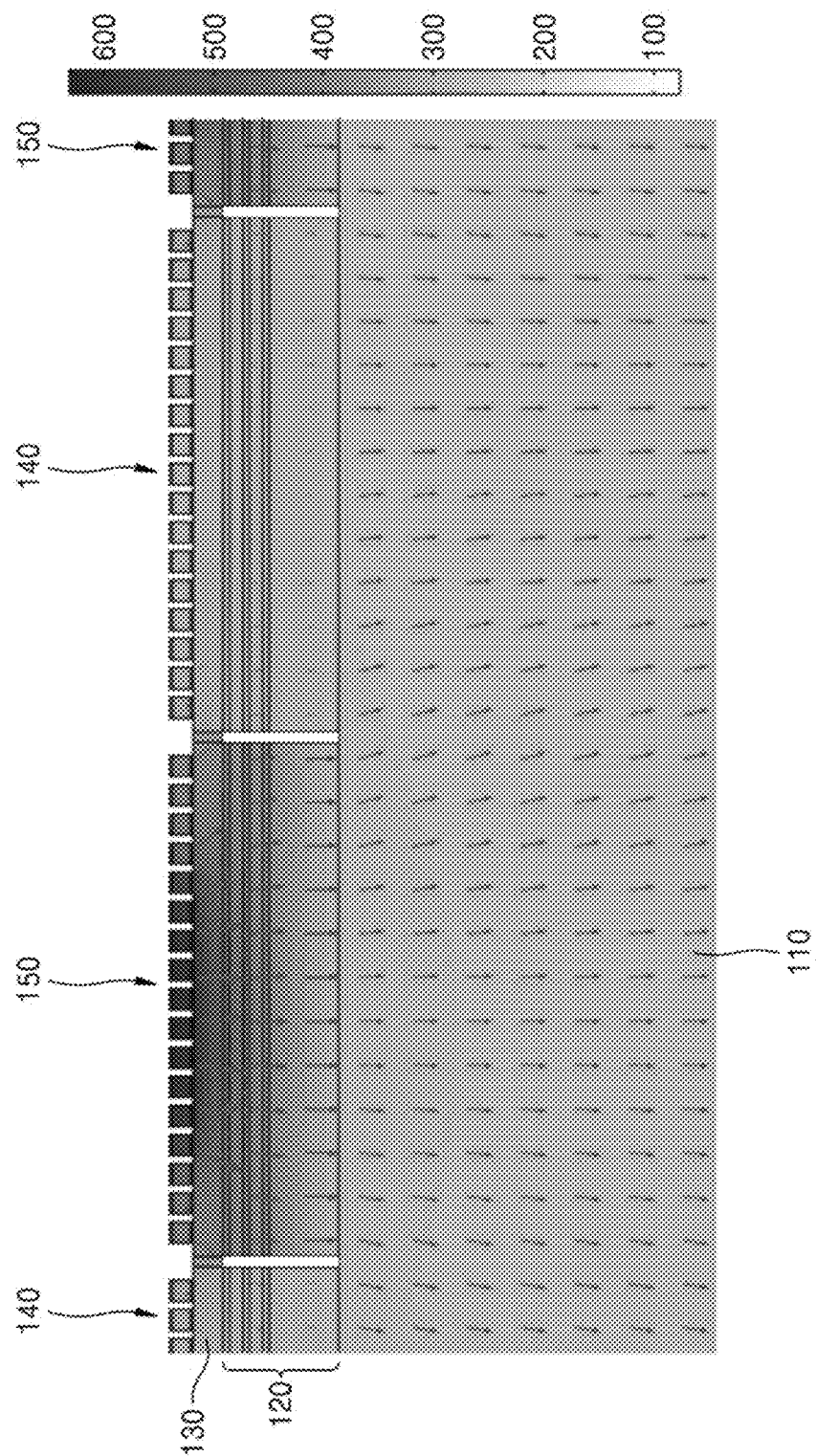
FIG. 36 is a cross-sectional view showing simulation results for the transmission of heat generated in the driving pixel of the spatial light modulator in the case of FIG. 35.

This may be confirmed from simulation results of heat generation and transfer according to the driving of the fourth spatial light modulator 400 driven by the first driving method shown in FIG. 36.

The settings for the fourth spatial light modulator 400 used to obtain the simulation results of FIG. 36 may be the same as the settings described with reference to FIG. 14 except that the trench 460 penetrates through only the DBR layer 120 and the HCG 8 is provided directly above the trench 460.

Referring to FIG. 36, it may be seen that the temperature is the highest in the central region of the driving pixel 150, the temperature decreases toward the edges, and the non-driving pixel 140 maintains a relatively low temperature. It may be seen that, as indicated by arrows, most of Joule heat generated in the driving pixel 150 moves to a lower end of the corresponding driving pixel 150 and is transferred to the lower end of the substrate 110 through the substrate 110. Although some of the Joule heat is transmitted to the non-drive pixel 140 via the cavity layer 130, the degree of heat transfer may be very low compared to a driving of the spatial light modulator (FIG. 42) of the related art.

As a result, FIG. 36 suggests that, when the fourth spatial light modulator 400 is driven by the first driving method, heat leakage from the driving pixel 150 is much less compared to the driving of the spatial light modulator of the related art.

Figure 37:
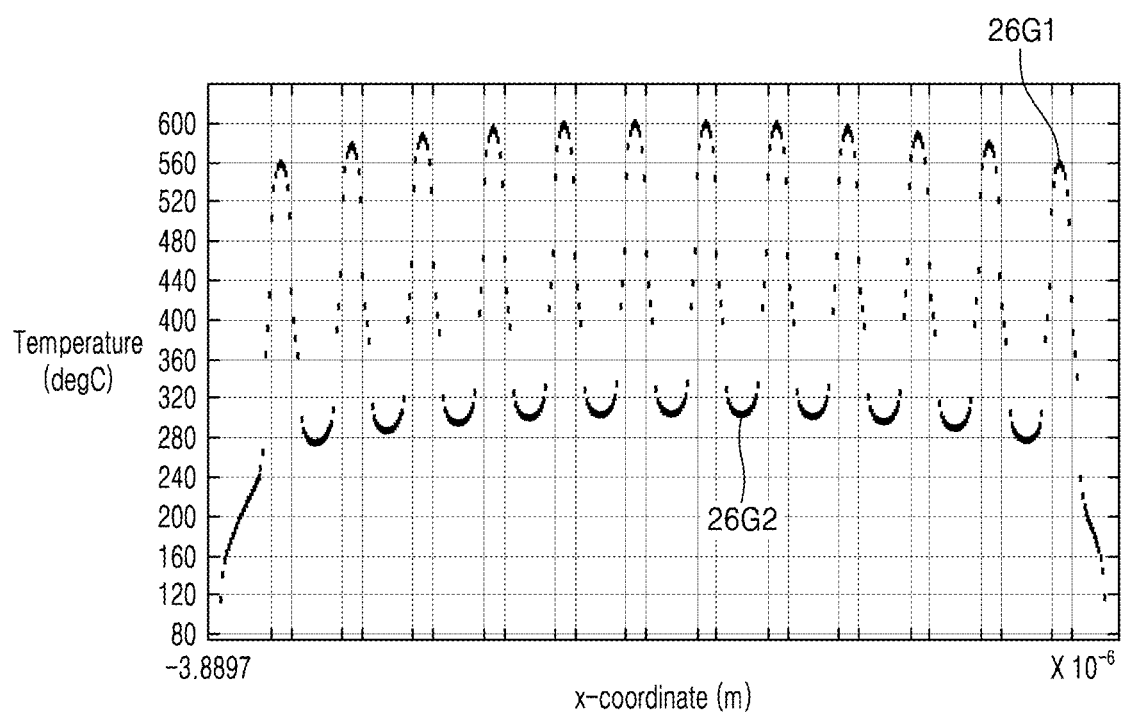
FIG. 37 is a graph showing a temperature distribution of a driving pixel and a non-driving pixel of the spatial light modulator in the case of FIG. 35.

FIG. 37 shows a temperature distribution of a driving pixel and a non-driving pixel when the fourth spatial light modulator 400 is driven by the first driving method.

In FIG. 37, the horizontal axis indicates position, and the vertical axis indicates temperature.

In FIG. 37, first graphs 26G1 show temperature distributions for driving pixels, and a second graph 26G2 shows a temperature distribution for a non-driving pixel, respectively.

Each of the plurality of first graphs 26G1 represents one driving pixel, and points constituting the one graph 26G1 each indicate an HCG included in one driving pixel. In addition, each concave node constituting the second graph 26G2 represents one non-driving pixel. Although the concave node of the second graph 26G2 is not large even between HCGs included in one non-driving pixel, it suggests that there is a temperature difference.

When comparing the first and second graphs 26G1 and 26G2 of FIG. 37, the maximum temperature difference between the adjacent driving pixel and the non-driving pixel is about 295° C.

When the fourth spatial light modulator 400 is driven by the first driving method, some of heat generated in the driving pixel 150 is transferred to the non-driving pixel 140 through the cavity layer 130, but the degree of transfer is insignificant, and most of the heat is moved downward of the driving pixel 150. That is, the amount of heat flow in a downward direction is greatly dominant rather than that in a lateral direction of the driving pixel 150.

In the fourth spatial light modulator 400, an HCG may be formed on the cavity layer 130 directly above the trench 460. That is, unlike the first to third spatial light modulators 100, 200, and 300, the fourth spatial light modulator 400 may include the HCG uniformly provided on an entire surface of the cavity layer 130 on which the HCG is formed. Accordingly, when the fourth spatial light modulator 400 is driven by the first driving method, light loss may be relatively reduced. Like in the case when the illustrated first to third spatial light modulators 100, 200, and 300 and their modifications are driven by the first or second driving method, when the fourth spatial light modulator 400 is driven by the first driving method, the process may be easy.

Figure 38:
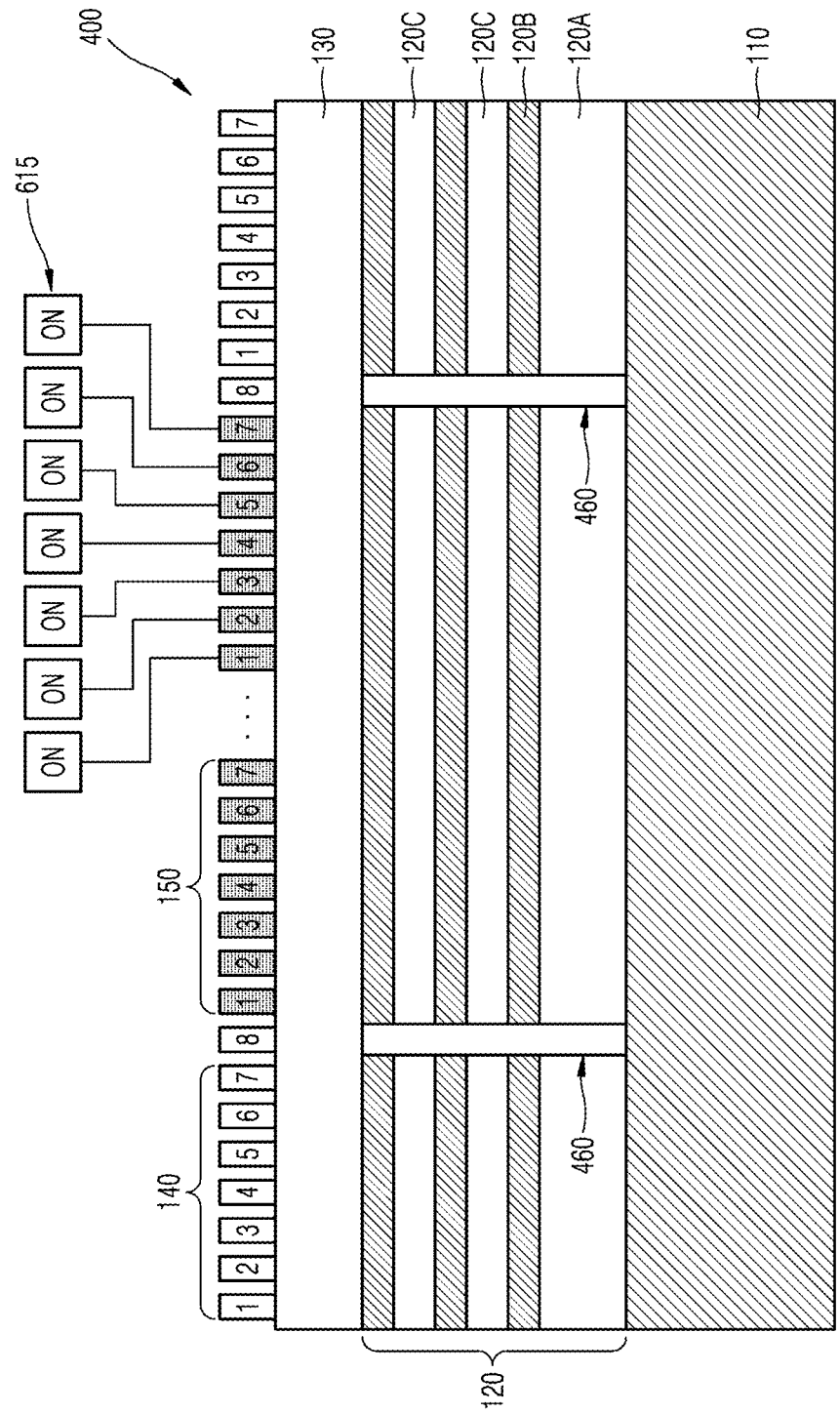
FIG. 38 is a cross-sectional view showing a case in which a second driving method is applied to a fourth spatial light modulator according to an example embodiment.

FIG. 38 shows a case in which the second driving method is applied to the fourth spatial light modulator 400.

Figure 39:
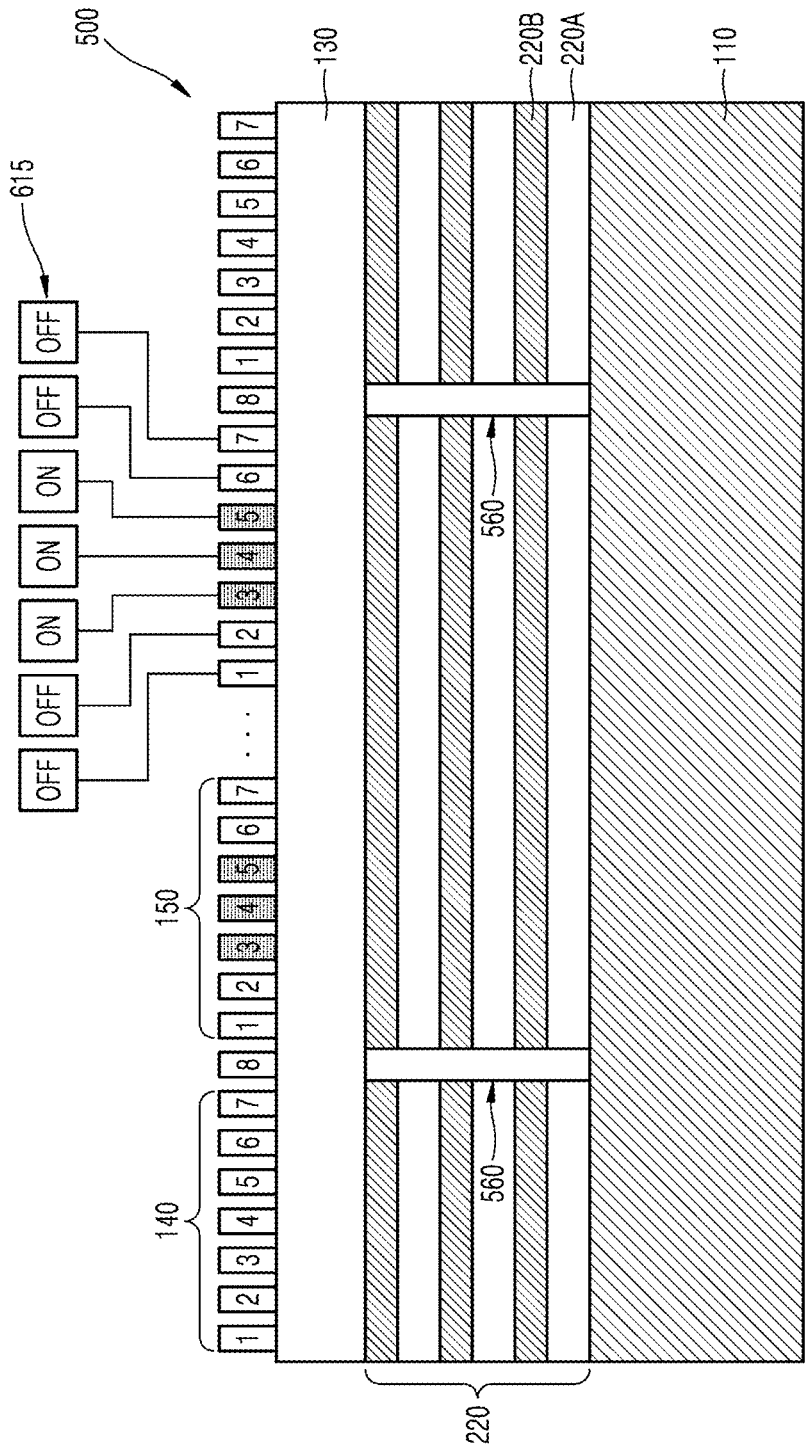
FIG. 39 is a cross-sectional view showing a case in which a first driving method is applied to a fifth spatial light modulator according to an example embodiment.

FIG. 39 shows a case in which the first driving method is applied to the fifth spatial light modulator 500.

Figure 40:
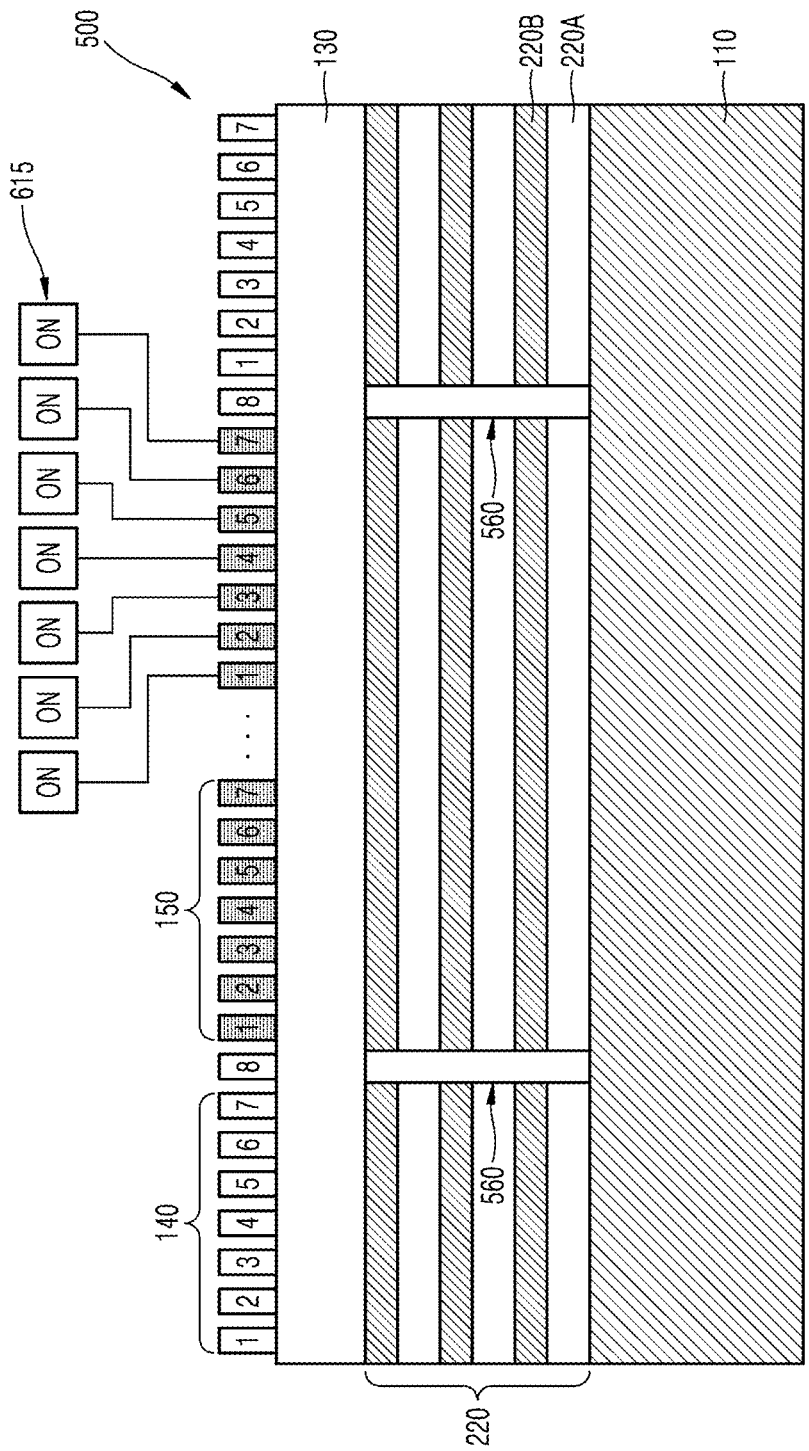
FIG. 40 is a cross-sectional view showing a case in which a second driving method is applied to a fifth spatial light modulator according to an example embodiment.

FIG. 40 shows a case in which the second driving method is applied to the fifth spatial light modulator 500.

Similarly to the second to fifth spatial light modulators 200, 300, 400, and 500, modifications of the second to fifth spatial light modulators 200, 300, 400, and 500 may also be driven by the first driving method or the second driving method.

Next, a spatial light modulator of the related art for comparison with the spatial light modulators according to the above-described example embodiments will be described.

Figure 41:
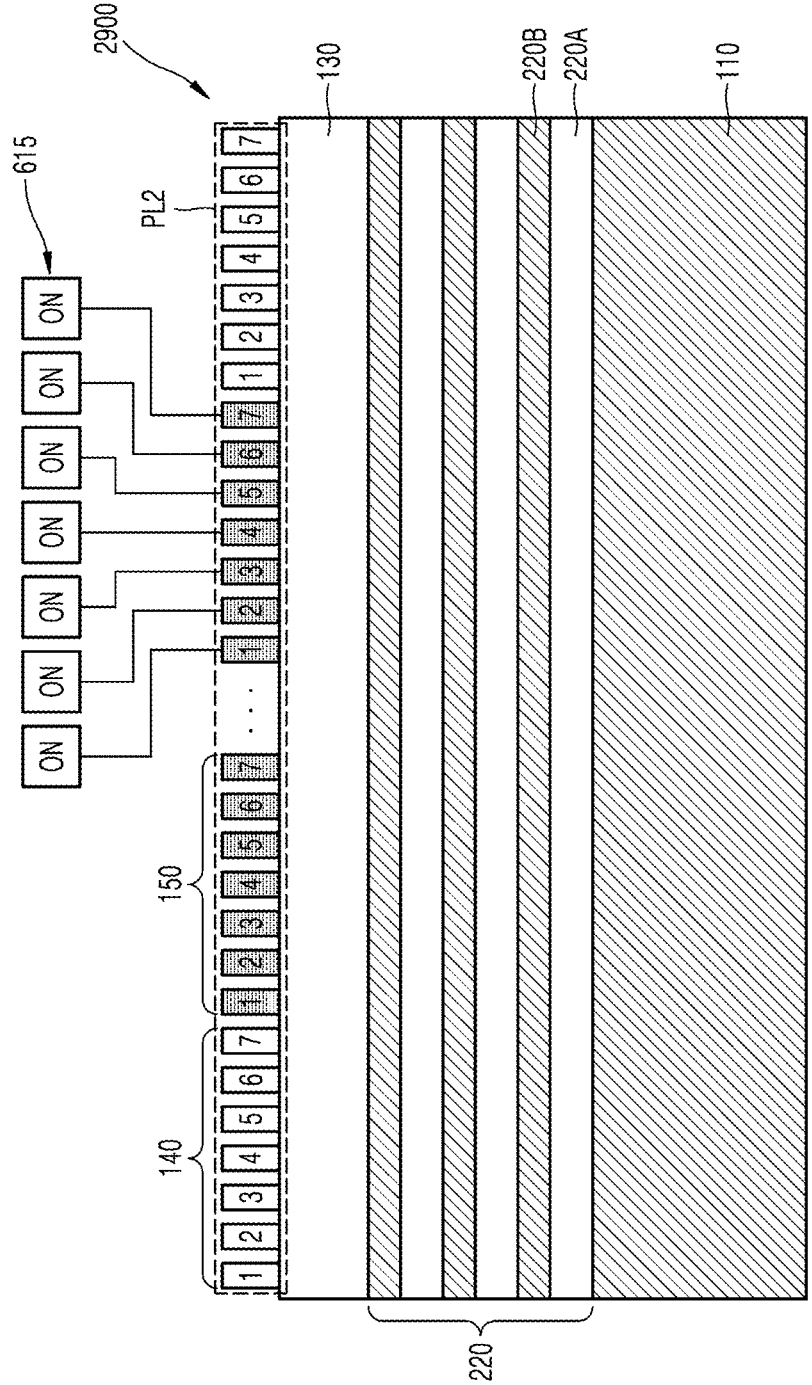
FIG. 41 is a cross-sectional view showing a spatial light modulator of the related art and a driving method thereof.

FIG. 41 shows a spatial light modulator 2900 of the related art.

Referring to FIG. 41, the spatial light modulator 2900 of the related art includes a substrate 110 and a DBR layer 220, a cavity layer 130, and a pixel layer PL2 sequentially stacked on the substrate 110. The pixel layer PL2 includes a plurality of first pixels 140 and a plurality of second pixels 150, but the first and second pixels 140 and 150 are not spaced apart from each other. That is, a plurality of HCGs 1 to 7 are uniformly distributed on an entire upper surface of the cavity layer 130. The spatial light modulator 2900 of the related art does not include a trench or a structure (pattern) corresponding to the trench.

The spatial light modulator 2900 of the related art may be driven by using the first pixel 140 as a non-driving pixel and applying a current to all of the HCGs 1 to 7 included in the second pixel 150, which is a driving pixel.

For comparison, the spatial light modulator 2900 of the related art may be driven by using binary driving so that the same amount of Joule heat as the Joule heat generated by driving the spatial light modulator according to the example embodiment is generated.

Figure 42:
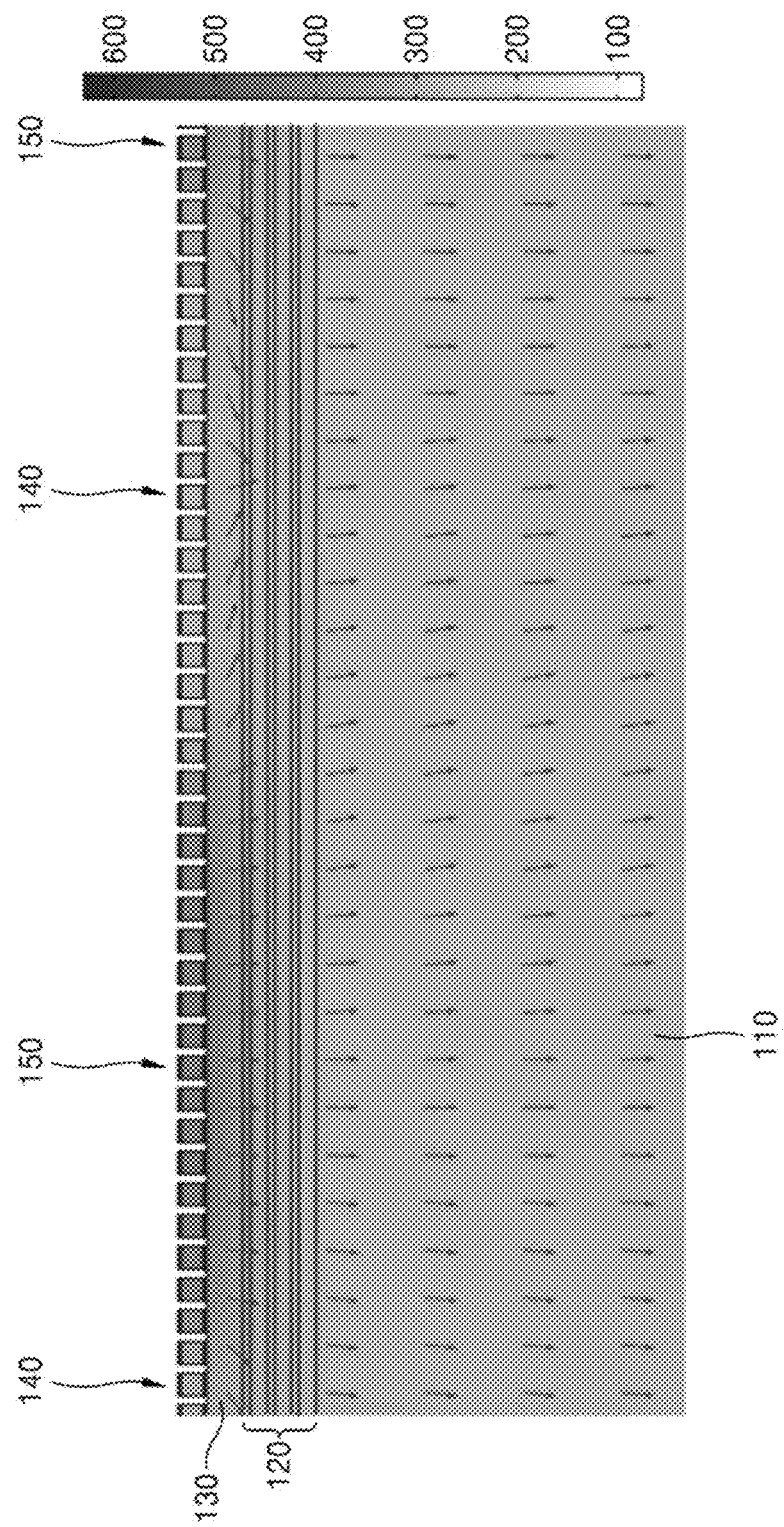
FIG. 42 is a cross-sectional view illustrating simulation results for the transmission of heat generated in a driving pixel according to the driving method of the spatial light modulator of the related art of FIG. 41.

FIG. 42 shows simulation results of heat generation and heat transfer in the driving pixel 150 in binary driving of the spatial light modulator 2900 of the related art shown in FIG. 41.

The settings for each layer of the spatial light modulator 2900 of the related art used to obtain the simulation results of FIG. 42 may be the same as the settings described with reference to FIG. 24.

Referring to FIG. 42, heat (arrow) generated in the driving pixel 150 is transferred to the non-driving pixel 140 through the cavity layer 130 and the DBR layer 220 directly under the HCG. The amount of heat (length of the arrow) transferred to the non-driving pixel 140 is similar to the amount transferred from the driving pixel 150 to the substrate 110. This result suggests severe heat leakage.

Figure 43:
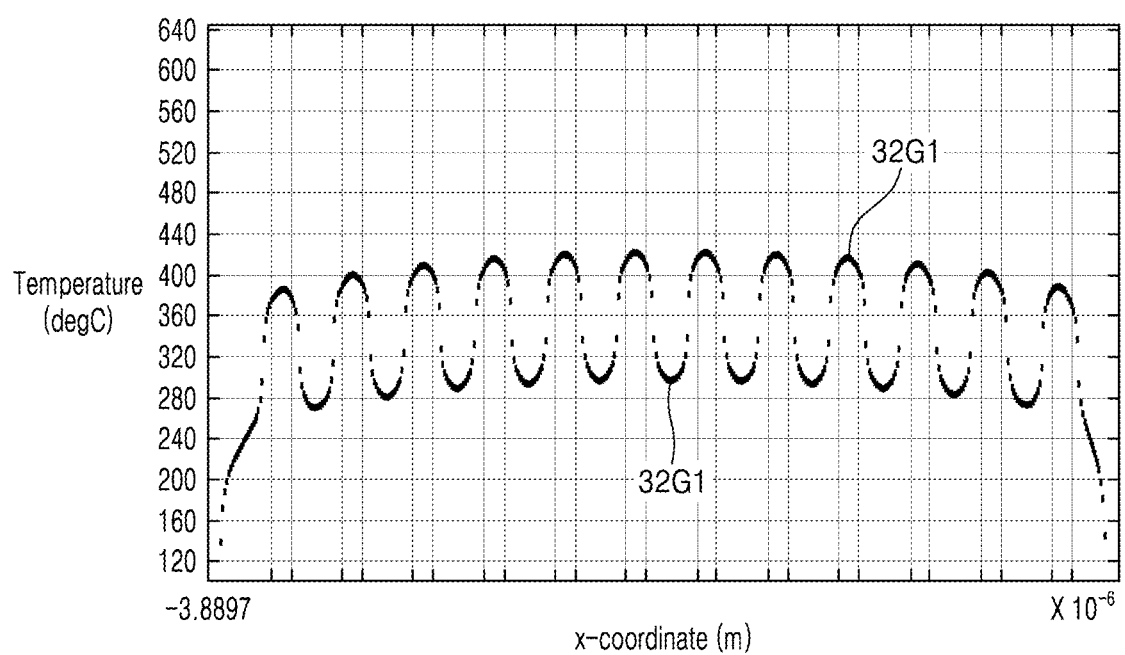
FIG. 43 is a graph showing a temperature distribution of a driving pixel and a non-driving pixel of the spatial light modulator according to the driving method of the spatial light modulator of FIG. 41.

FIG. 43 shows a temperature distribution of a driving pixel and a non-driving pixel in the driving of the spatial light modulator 2900 of the related art.

In FIG. 43, the horizontal axis indicates position, and the vertical axis indicates temperature.

In FIG. 43, a first graph 32G1 indicates a temperature distribution for the driving pixel, and a second graph 32G2 indicates a temperature distribution for a non-driving pixel, respectively.

Referring to FIG. 43, a temperature difference between the adjacent driving pixel and the non-driving pixel is about 140° C., and this value corresponds to about 40% of the maximum temperature difference (350° C.) between the adjacent driving pixel and the non-driving pixel shown in the first driving method of the spatial light modulator according to the example embodiment.

In order to focus light emitted from the spatial light modulator to a desired position, it is advantageous that the temperature difference between the driving pixel and the non-driving pixel is large. Considering this point, the result of the spatial light modulator of the related art suggests that a beam focusing performance for a point to be scanned may be deteriorated, and a device efficiency is also low.

Figure 44:
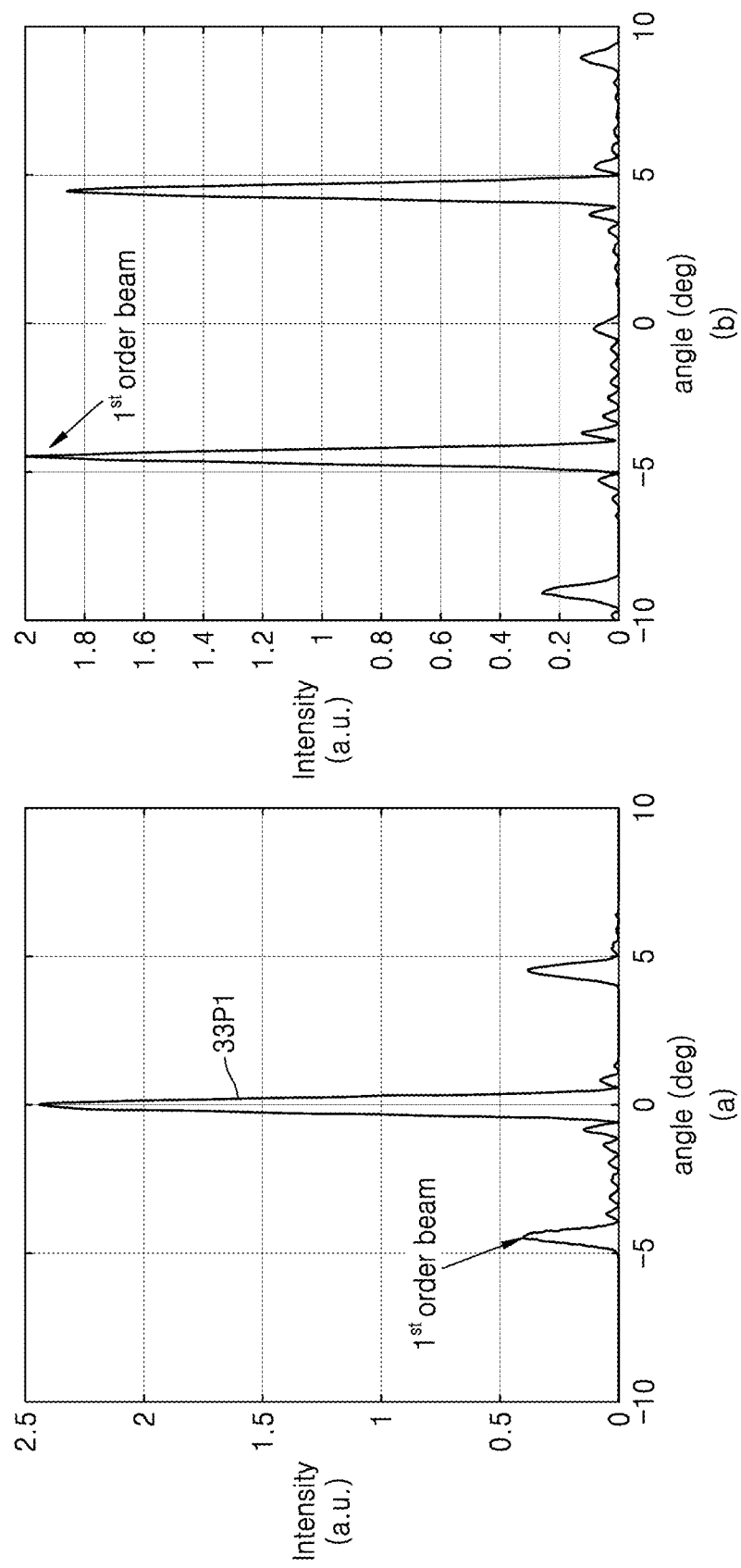
FIG. 44 is a graph showing a distribution of emitted light according to the driving method of the spatial light modulator of the related art of FIG. 41 and the driving method according to an example embodiment.

FIG. 44 is a graph showing a distribution of emitted light according to a driving method of the spatial light modulator 2900 of the related art shown in FIG. 41 and a driving method according to an example embodiment described above.

In FIG. 44, (a) is a graph showing a distribution of emitted light according to a driving method of the spatial light modulator 2900 of the related art, and (b) is a graph showing a distribution of emitted light according to a driving method of a spatial light modulator according to an example embodiment.

In (a) and (b) of FIG. 44, the horizontal axis represents a beam irradiation angle (diffraction angle), and the vertical axis represents light intensity.

In (a) of FIG. 44, a peak 33P1 indicates $0^{th}$ order beam or $0^{th}$ order diffraction beam, and the "$1^{st}$ order beam" of (a) and (b) indicates $1^{st}$ order beam or $1^{st}$ order diffraction beam.

According to (a) of FIG. 44, in the distribution of emitted light according to the driving method of the spatial light modulator of the related art, the $0^{th}$ order beam is greatly dominant, and the $1^{st}$ order beam measured in the vicinity of 5° is weak by less than 0.5.

On the other hand, as shown in (b) of FIG. 44, in the distribution of emitted light according to the driving method of the spatial light modulator according to an example embodiment, the $1^{st}$ order beam measured in the vicinity of 5° is greatly dominant, and the intensity of the $0^{th}$ order beam is weaker than that of the $1^{st}$ order beam in (a) of FIG. 44.

In the emitted light distribution of the spatial light modulator, the $1^{st}$ order beam in the vicinity of 5° is a desired signal, and considering that a small signal (e.g., a high order beam that is a $2^{nd}$ order beam or more) at a different location from the $0^{th}$ order beam located at 0° is a result of light leakage that is not properly controlled, it may be determined that the performance of the spatial light modulator is excellent as the intensity of the $1^{st}$ order beam is relatively great.

From this point of view, it may be seen that the performance of the spatial light modulator having the light distribution of (b) is superior to that of the spatial light modulator having the light distribution of (a).

As an index for quantifying the performance of the spatial light modulator, a Side Mode Suppression Ratio (SMSR) is used, which expresses a ratio of the magnitude of a desired signal to the largest signal among the remaining signals in decibels.

In the case of (a), the SMSR is about −8.1 dB, while in the case of (b), the SMSR is about 13.5 dB.

The result suggests that the performance of the spatial light modulator may be improved by using the spatial light modulator and the driving method thereof according to an example embodiment.

The spatial light modulator according to the example embodiment described above may be an apparatus by itself, or may be used as a component or element constituting another apparatus.

Accordingly, the spatial light modulator according to an example embodiment may be applied to apparatuses in various fields, for example, it can be applied to a scanner constituting a time-of-flight (TOF) sensor for LiDAR, or a motion recognition sensor, a depth sensor, and an authentication sensor including a beam scanner, and the like. In addition, the spatial light modulator according to an example embodiment may be mounted on mobile and wearable devices that require peripheral recognition by additionally achieving reduction of power consumption and form factor as a LiDAR system is applied to a mobile device.

Figure 45:
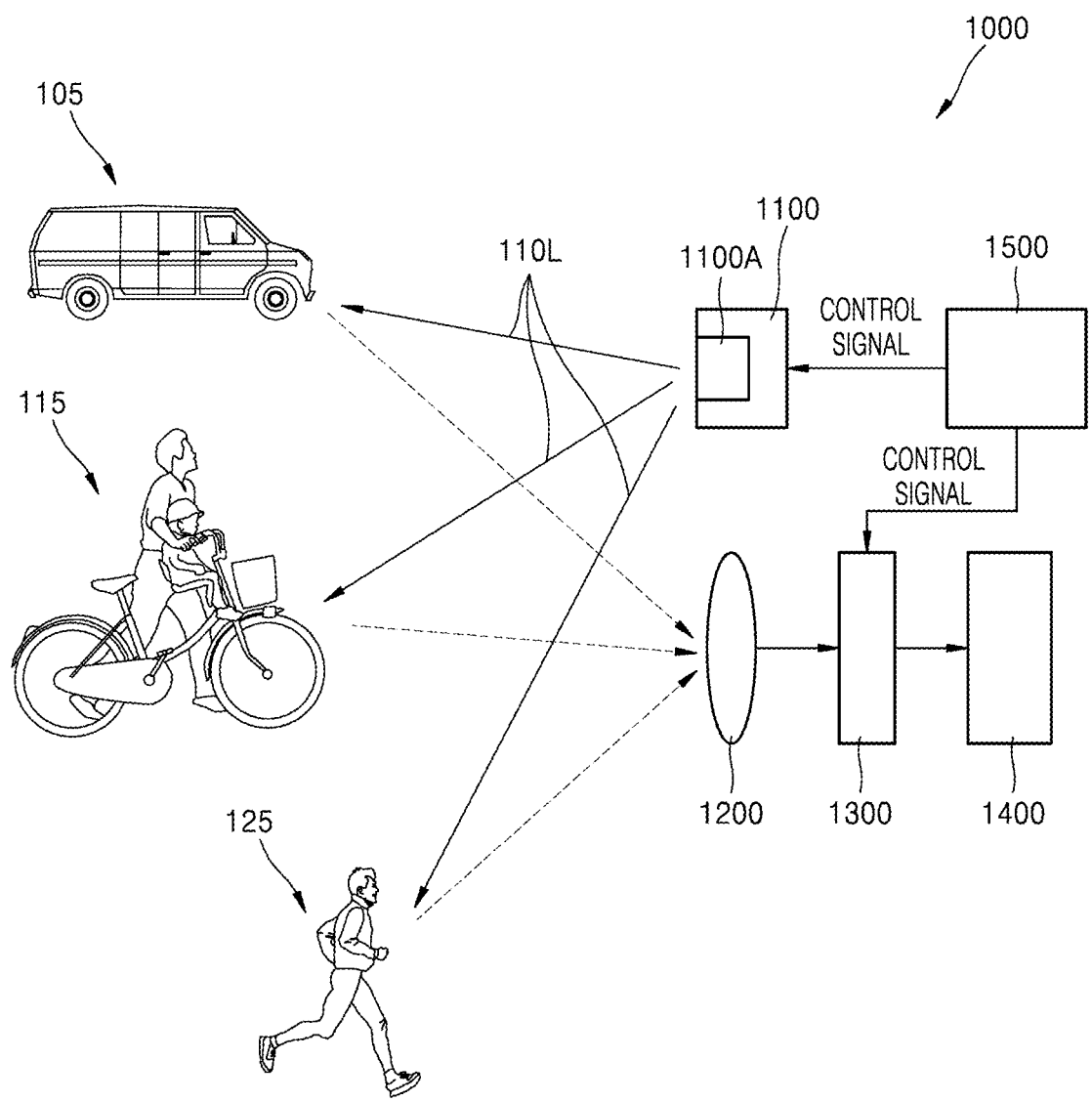
FIG. 45 is a schematic block diagram of an apparatus (e.g., a depth camera) including a spatial light modulator according to an example embodiment.

FIG. 45 schematically shows a LiDAR system 1000 as an example of a device to which a spatial light modulator according to an example embodiment is applied.

Referring to FIG. 45, the LiDAR system 1000 includes a light emitter 1100, a lens unit 1200, an optical filter unit 1300, a detector 1400, and a controller 1500. When necessary for obtaining and processing information on first to third subjects 105, 115, and 125, the LiDAR system 1000 may further include other components in addition to the above components. In order to detect and recognize the subjects 105, 115, and 125, light is emitted from the light emitter 1100 to the objects 105, 115, and 125.

The number and shape of the subjects 105, 115, and 125 are symbolic and are not limited thereto. The subjects may be various objects, for example, a fixed or moving object may also be a subject, and as long as it reflects light, any object may be a subject.

Light 110L emitted from the light emitter 1100 toward the subjects 105, 115, and 125 may be light included in the infrared region, but is not limited thereto, and any light that is generally recognized as not harmful to the human body may be used.

The light emitter 1100 may include a light source module 1100A. The light source module 1100A may include a light source configured to generate light and an optical scanner configured to receive light emitted from the light source and to irradiate the light to the subjects 105, 115, and 125. The optical scanner may include one of the spatial light modulators according to the above-described example embodiments. The light source may be a light source capable of emitting light of various wavelengths, for example, laser light according to a given light emission signal. The light source may include, for example, a Si photonics Optical Phased Array (OPA) including a plurality of unit light sources (or cell light sources). A wavelength of the light 110L emitted from the light source module 1100A may be controlled by a control signal given from the controller 1500. The control signal may include a light emission signal. The light 110L emitted from the light source module 1100A is reflected from the subjects 105, 115, and 125 and is incident on the lens unit 1200.

Although the lens unit 1200 is illustrated as a single lens, it may be a lens optical system including a plurality of lenses to converge incident light to the optical filter unit 1300. Light incident on the lens unit 1200 is converged by the lens unit 1200 and is incident on the optical filter unit 1300.

The optical filter unit 1300 may perform an operation of passing only light of a specific wavelength or light of a wavelength that belongs to a specific band, and blocking or substantially blocking the remaining light. The optical filter unit 1300 may be configured to actively perform such an operation. To this end, the optical filter unit 1300 may include an active device that transmits only light, a central wavelength of which is a specific wavelength, and blocks or substantially blocks light of other wavelengths in response to a control signal given from the controller 1500. The control signal given to the optical filter unit 1300 may include information about the central wavelength of the light to be passed through the active device, where the central wavelength may correspond to the central wavelength of the light emitted from the light emitting unit 1100.

As a result, the control signal given to the optical filter unit 1300 may include a control signal that matches a center wavelength of the light emitted from the light emitter 1100 and a center wavelength of the light to pass through the active device of the optical filter unit 1300. This control signal given to the optical filter unit 1300 from the controller 1500 may be given in real time together with the control signal given to the light emitter 1100 from the controller 1500. Therefore, the control of the wavelength of the light 110L emitted from the light emitter 1100 and the control of the central wavelength of the light passing through the active device of the optical filter unit 130 may be performed in real time through the controller 1500. This may denote that a scan of a scan area including the subjects 105, 115, and 125 of the LiDAR system 1000 according to an example embodiment may be performed in real time.

Due to the active device included in the optical filter unit 1300, the optical filter unit 1300 may selectively pass only desired light and block other noise light including natural light. Accordingly, a signal-to-noise ratio (S/N) of the LiDAR system 1000 may be increased. As an example of the active device, the optical filter unit 1300 may include a tunable band-pass filter. The operation method of the tunable band-pass filter may be a liquid crystal method or an acousto-optic method.

Light passing through the optical filter unit 1300 is incident on the detector 1400. The detector 1400 senses the light received from the light filter unit 1300 and acquires various information about the subjects 105, 115, and 125 based on the information included in the light. For example, the detector 1400 detects time delay or phase difference information from the incident light, and based on the information, distance information to the subjects 105, 115, and 125, location information of the subjects 105, 115, and 125, a depth image of the subjects 105, 115, and 125 may be obtained. To this end, the detector 1400 may include a time to digital converter (TDC), an image sensor, and the like.

The controller 1500 may be disposed between the light emitter 1100 and the light filter unit 1300. The controller 1500 controls the operations of the light emitter 1100 and the light filter unit 1300. The controller 1500 sends a light emission start signal to the light emitter 1100 so that light of a specific wavelength is emitted. That is, the control unit 1500 determines a wavelength of light to be emitted, and sends a control signal including information on an electrical signal required to emit light of the determined wavelength to the light emitter 1100 so that the light having the determined wavelength is emitted from the light source module 1100A. The control unit 1500 controls the optical filter unit 1300 so that a wavelength of light passing through a transmission center of the optical filter unit 1300 becomes a wavelength of light emitted from the light emitter 1100 by sending a light emission start signal to the light emitter 1100 and, at the same time, sending a control signal to the optical filter unit 1300.

Next, a method of manufacturing a spatial light modulator according to an example embodiment will be described with reference to FIGS. 46 to 48. Like reference numbers as those mentioned in the spatial light modulator according to the above-described example embodiment refer to like members, and the descriptions thereof will be omitted.

Figure 46:
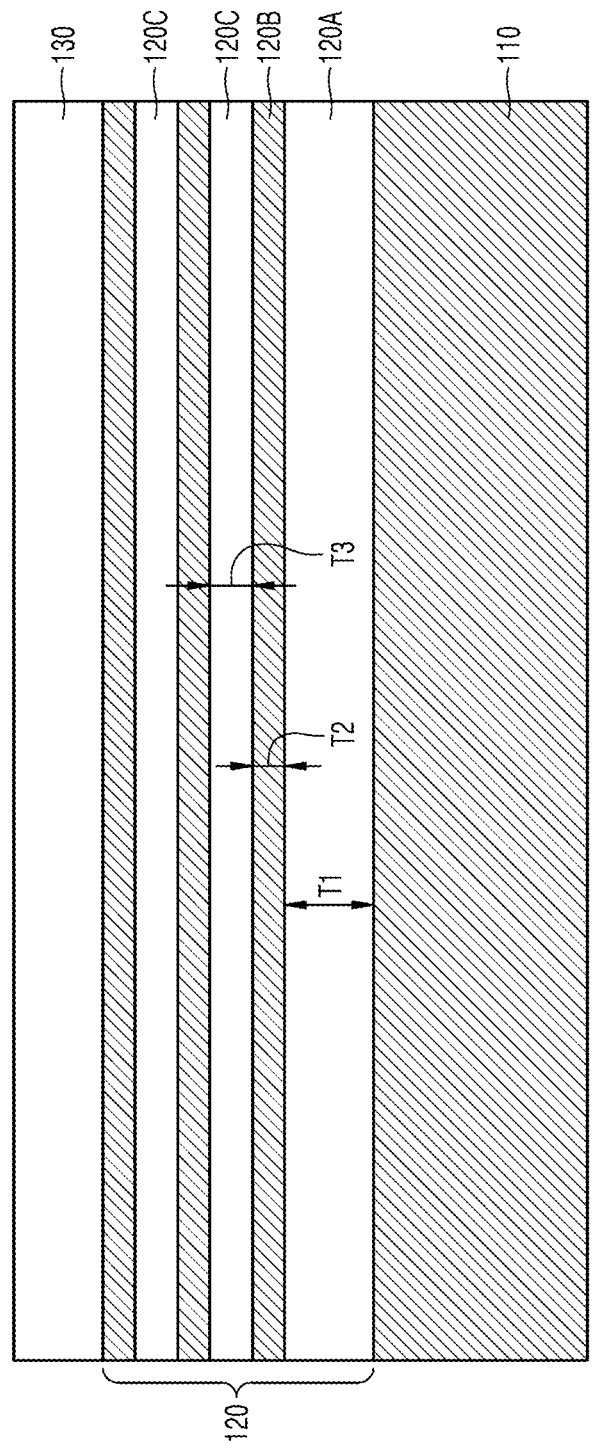
FIGS. 46 to 48 are cross-sectional views illustrating by step a method of manufacturing a spatial light modulator according to an example embodiment.

First, as shown in FIG. 46, a DBR layer 120 and a cavity layer 130 are sequentially formed on a substrate 110. The DBR layer 120 may be formed to cover an entire one surface (e.g., an upper surface) of the substrate 110. The cavity layer 130 may be formed to cover an entire upper surface of the DBR layer 120. The upper surface of the DBR layer 120 may be parallel to or substantially parallel to the one surface of the substrate 110.

The DBR layer 120 may be formed by repeatedly alternately stacking a first layer 120A and a second layer 120B, for example, may be formed by repeatedly alternating stacking three times the first layer 120A and the second layer 120B. The number of repetitions and alternations may be three times or more than three or less than three. In the DBR layer 120, the first layer 120A initially formed on the substrate 110 may have a thickness T1 different from a thickness T3 of the remaining first layers 120A included in the DBR layer 120. In one example, the thickness T1 of the first layer 120A that is initially formed may be greater than the thickness T3 of the remaining first layers 120A.

Figure 47:
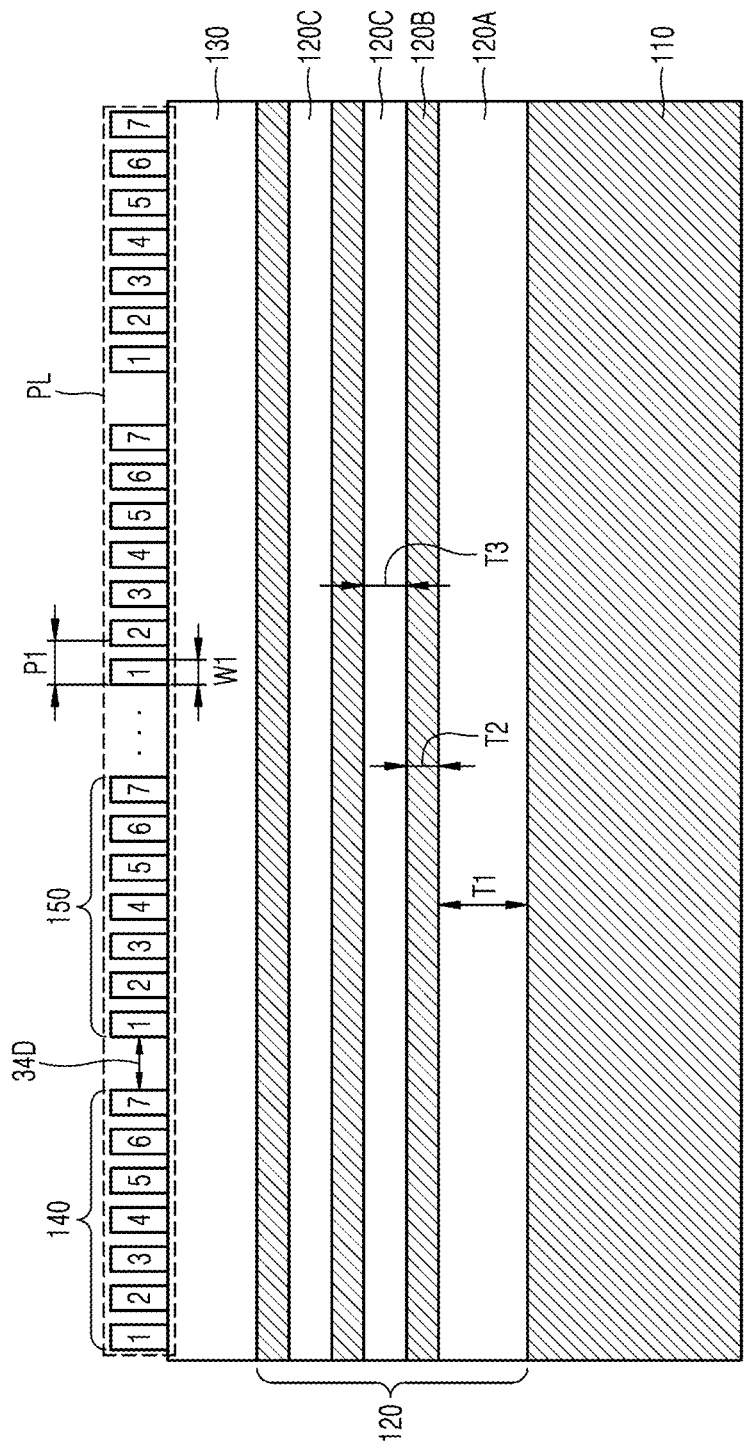

Next, as shown in FIG. 47, a pixel layer PL is formed on an upper surface of the cavity layer 130. In the pixel layer PL, a plurality of first pixels 140 and a plurality of second pixels 150 are horizontally, repeatedly, and alternately arranged. The first and second pixels 140 and 150 may be formed to be spaced apart from each other. The first and second pixels 140 and 150 each include a plurality of active HCGs 1 to 7. However, the number of active HCGs included in each of the pixels 140 and 150 is not limited to seven, and each pixel 140 and 150 may include seven or less active HCGs or seven or more active HCGs. The plurality of active HCGs 1 to 7 may be identical to or substantially identical to each other in all aspects such as shape, configuration, function, material, and the like. The plurality of active HCGs 1 to 7 included in each of the pixels 140 and 150 are spaced apart from each other, and a separation distance P1-W1 is less than a width W1 of each of the active HCGs 1 to 7. Each of the plurality of active HCGs 1 to 7 included in the first and second pixels 140 and 150 may be electrically driven and may be an active meta-pattern. Accordingly, the pixel layer PL may be a meta-surface or a meta-surface layer including a plurality of active meta-patterns.

Such a meta-surface may be formed by depositing a meta-material layer on the upper surface of the cavity layer 130 and then patterning the deposited meta-material layer. In one example, the patterning of the deposited meta-material layer may be performed by using a photolithography process of a semiconductor manufacturing process, but is not limited thereto.

In an operation of forming the pixel layer PL, the first and second pixels 140 and 150 are formed to be spaced apart from each other, but a mutually spaced distance 36D of the first and second pixels 140 and 150 may be less than an alignment period P1 of the active HCGs 1 to 7 included in each of the pixels 140 and 150 and greater than a width W1 of each of the active HCGs 1 to 7.

Figure 48:
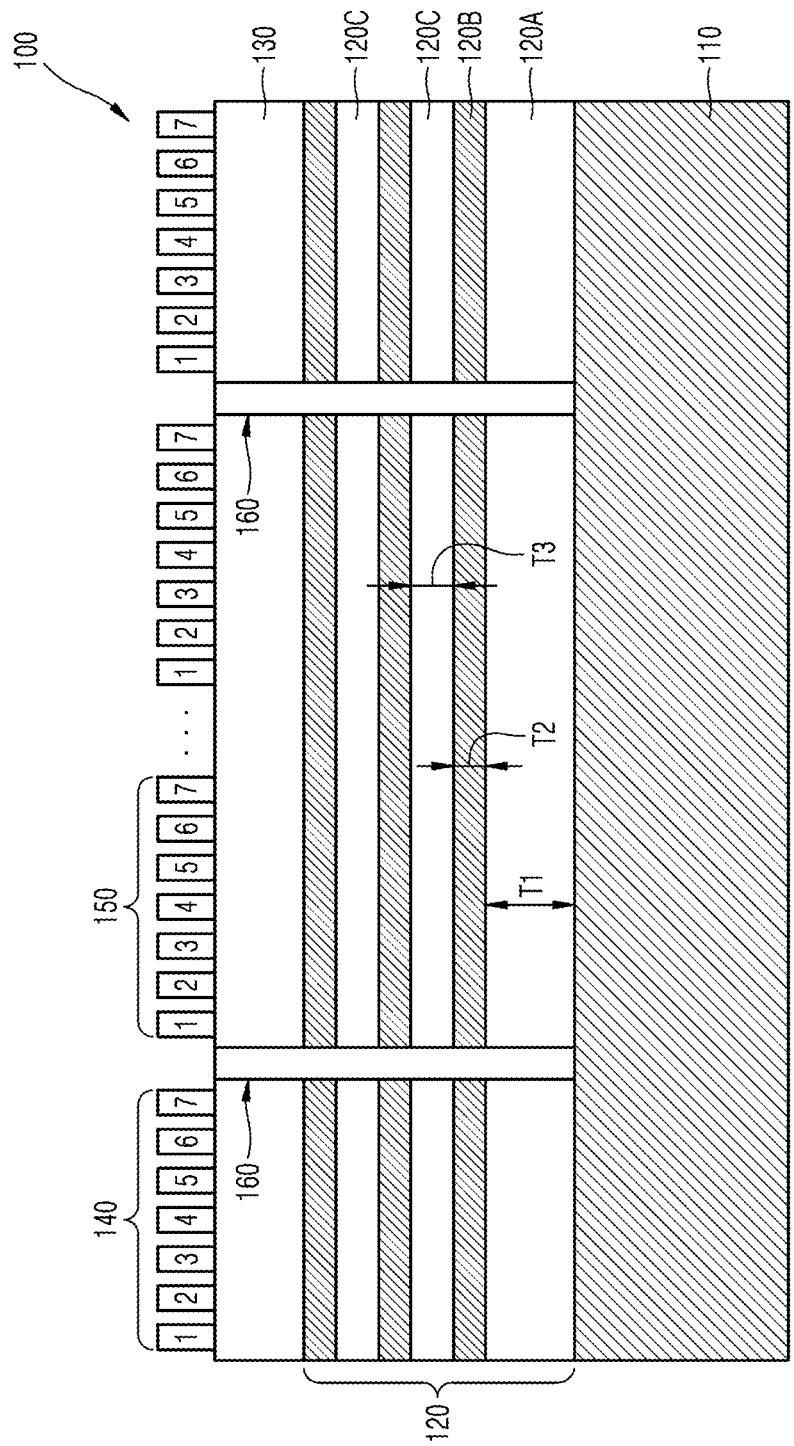

Next, as shown in FIG. 48, a trench 160 through which the one surface of the substrate 110 is exposed is formed between the first and second pixels 140 and 150. The trench 160 is formed at a position spaced apart from the first and second pixels 140 and 150. The trench 160 is spaced apart from the active HCGs 1 to 7 included in the first and second pixels 140 and 150. The trench 160 may be formed by sequentially etching the cavity layer 130 and the DBR layer 120 in a state that the first and second pixels 140 and 150 are masked, and the etching is performed until the substrate 110 is exposed. A suitable etching method may be selected in consideration of a width and depth of the trench 160.

In this way, the first spatial light modulator 100 is formed.

In one example, in the process of manufacturing the first spatial light modulator 100 described above, the first layer 120A of the DBR layer 120 initially formed on the substrate 110, that is, the lowermost first layer 120A of the DBR layer 120 may be formed to have the same thickness as the thickness T3 of the other first layer 120A included in the DBR layer 120.

In one example, in the process of forming the trench 160, the depth of the trench 160 may be adjusted. For example, the trench 160 may be formed only until the lowermost first layer 120A of the DBR layer 120 is exposed.

In one example, the trench 160 may be filled with air or maintained in a vacuum state, but may be filled with a material capable of substantially reducing or blocking heat transfer from the driving pixel to the non-driving pixel due to low thermal conductivity. This case may also be applied to other manufacturing methods to be described later.

Figure 49:
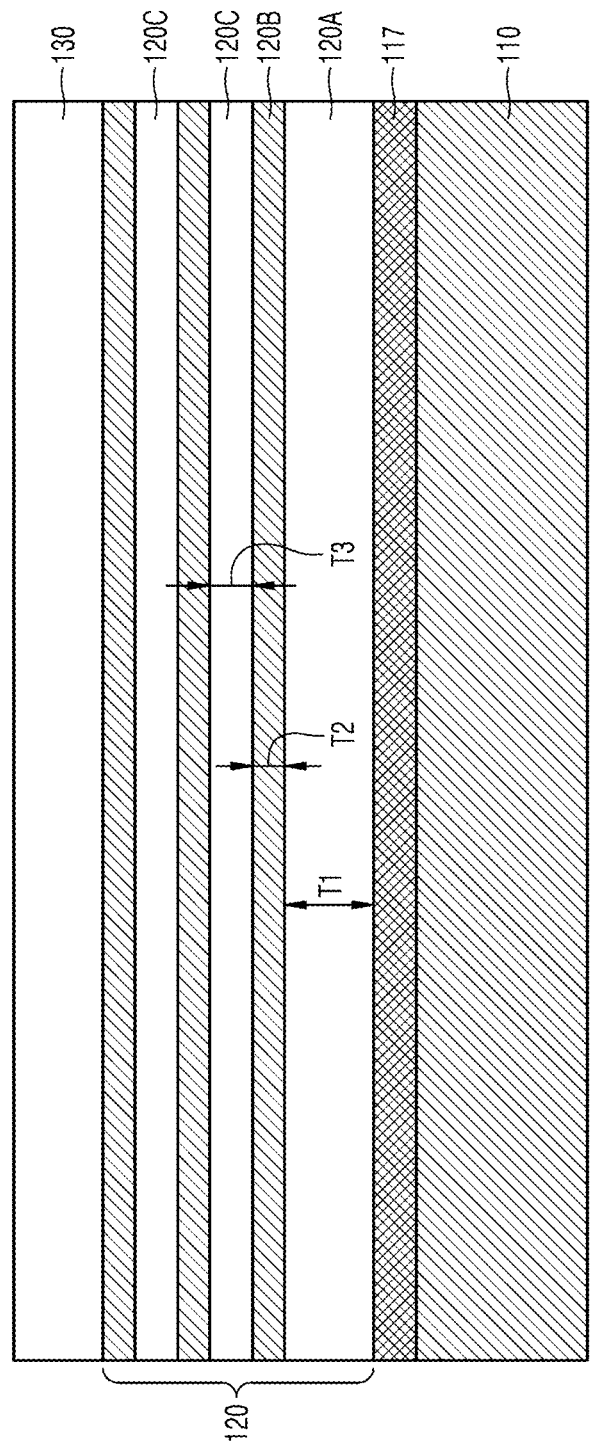
FIG. 49 is a cross-sectional view illustrating a case in which a low thermal conductivity layer is further formed between the substrate and the DBR layer in the manufacturing method illustrated in FIGS. 46 to 48.

In one example, in an operation of sequentially forming the DBR layer 120 and the cavity layer 130 on the substrate 110 (refer to FIG. 46), as shown in FIG. 49, the low thermal conductivity layer 117 may further be formed between the substrate 110 and the DBR layer 120. Subsequent processes may be performed in the same manner, and the trench 160 may be formed to penetrate the low thermal conductivity layer 117.

Also, in the case of FIG. 49, the lowermost first layer 120A of the DBR layer 120 may be formed to have the same thickness as the thickness T3 of the other first layers 120A included in the DBR layer 120. An example of adjusting a depth of the trench 160 and an example of filling the trench 160 may be applied.

Next, a method of manufacturing a spatial light modulator according to an example embodiment will be described with reference to FIGS. 50 to 53.

Figure 50:
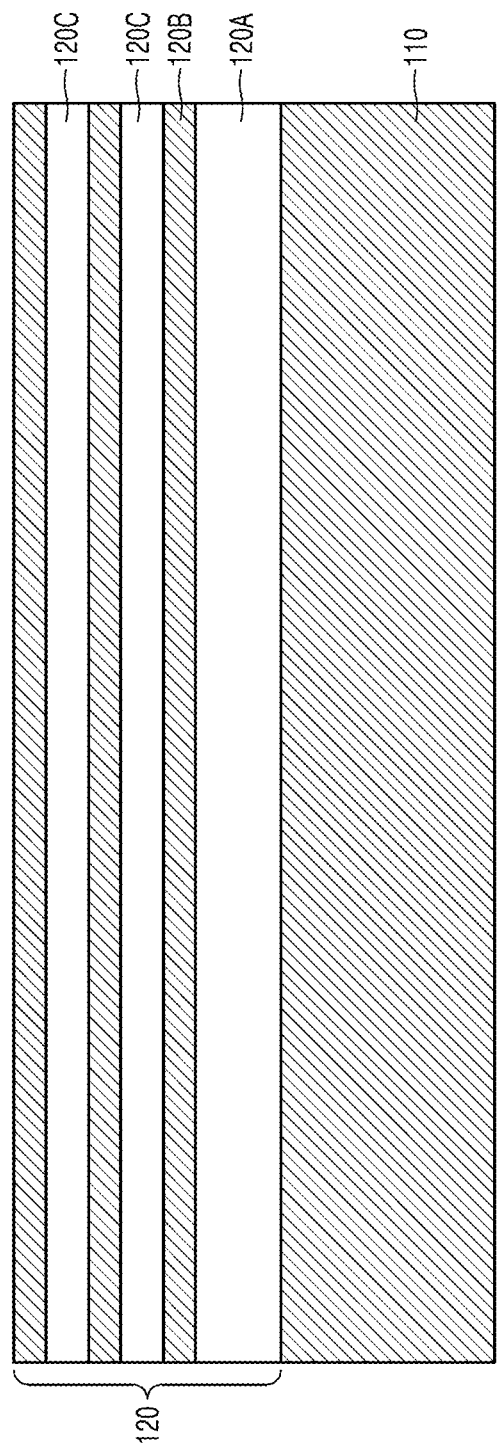
FIGS. 50 to 53 are cross-sectional views illustrating by step a method of manufacturing a spatial light modulator according to an example embodiment.

First, as shown in FIG. 50, a DBR layer 120 is formed on one surface of a substrate 110.

Figure 51:
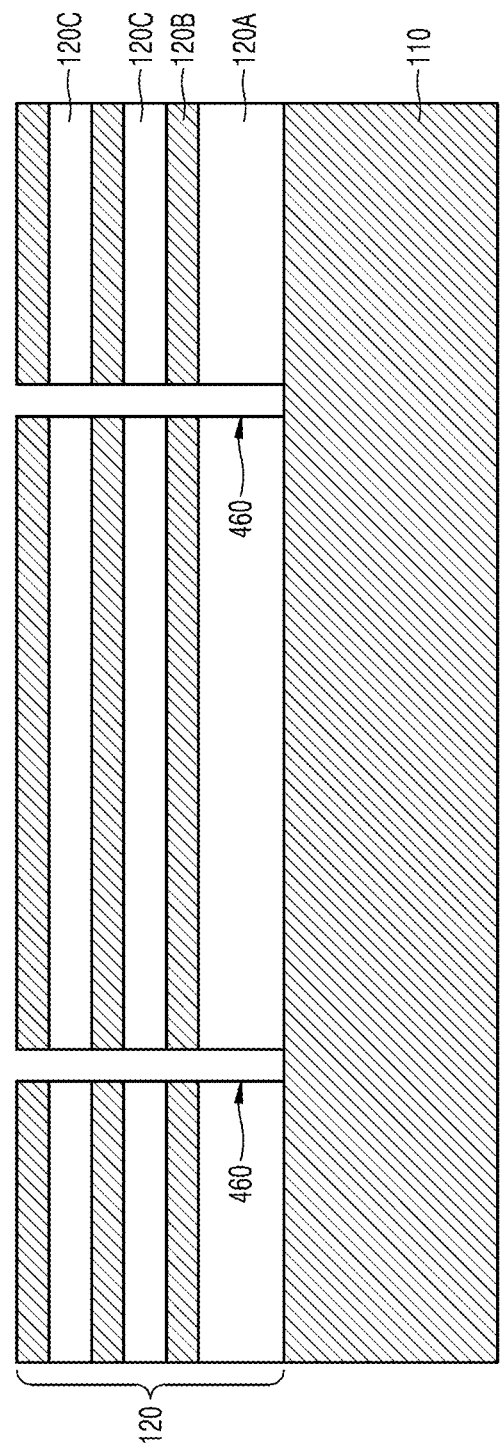

Next, as shown in FIG. 51, a trench 460 penetrating through the DBR layer 120 and exposing the one surface of the substrate 110 is formed in the DBR layer 120. As the trench 460 is formed, the DBR layer 120 may be divided into a number equal to the number of pixels to be formed on a cavity layer 130 in a subsequent process. The position and width at which the trench 460 is formed may be the same as or substantially the same as the trench 160 of FIG. 48.

Figure 52:
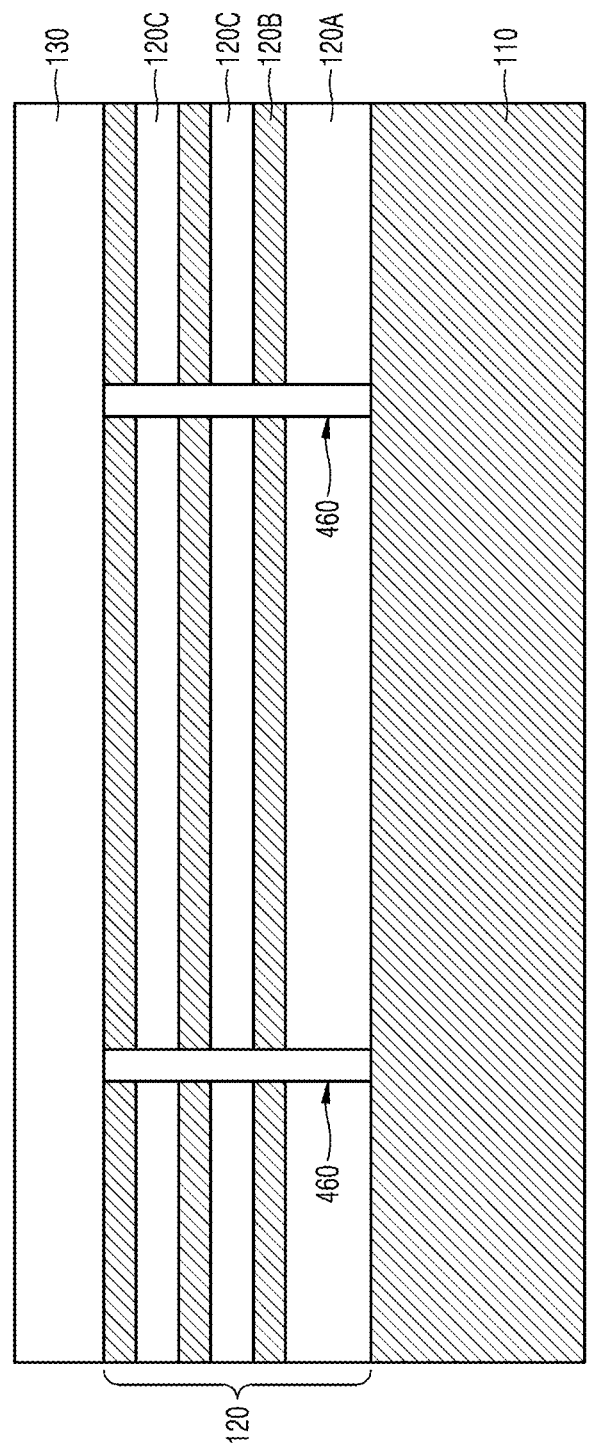

Next, as shown in FIG. 52, the cavity layer 130 covering the trench 460 is formed on the DBR layer 120. As the cavity layer 130 is formed, the trench 460 may be considered, at least in a cross-section, as a buried void in a stack including sequentially stacked substrate 110, the DBR layer 120, and cavity layer 130.

Figure 53:
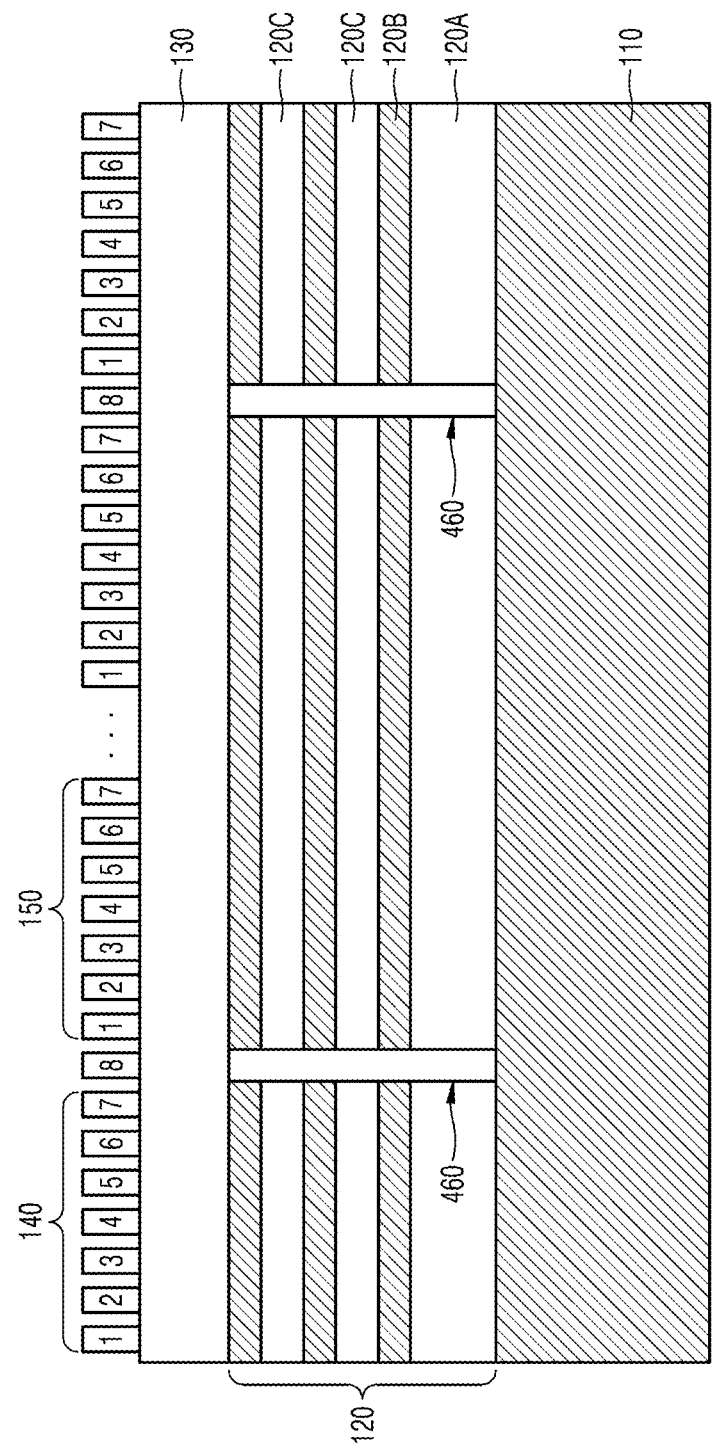

Next, as shown in FIG. 53, a pixel layer (PL1 in FIG. 5) is formed on the cavity layer 130. In the case of the pixel layer PL1, an HCG 8 is also formed in a region corresponding to an area between the first and second pixels 140 and 150 of the pixel layer PL of FIG. 47. Accordingly, the pixel layer PL1 does not include an empty region corresponding to the separation distance 34D of the first and second pixels 140 and 150 of the pixel layer PL of FIG. 36. That is, the pixel layer PL1 includes the active HCGs 1 to 8 uniformly distributed on an entire upper surface of the cavity layer 130.

In this way, the fourth spatial light modulator is formed.

In one example, in the operation of forming the trench 460, a depth of the trench 460 may be adjusted. For example, the trench 460 may be formed only until the lowermost first layer 120A of the DBR layer 120 is exposed.

Figure 54:
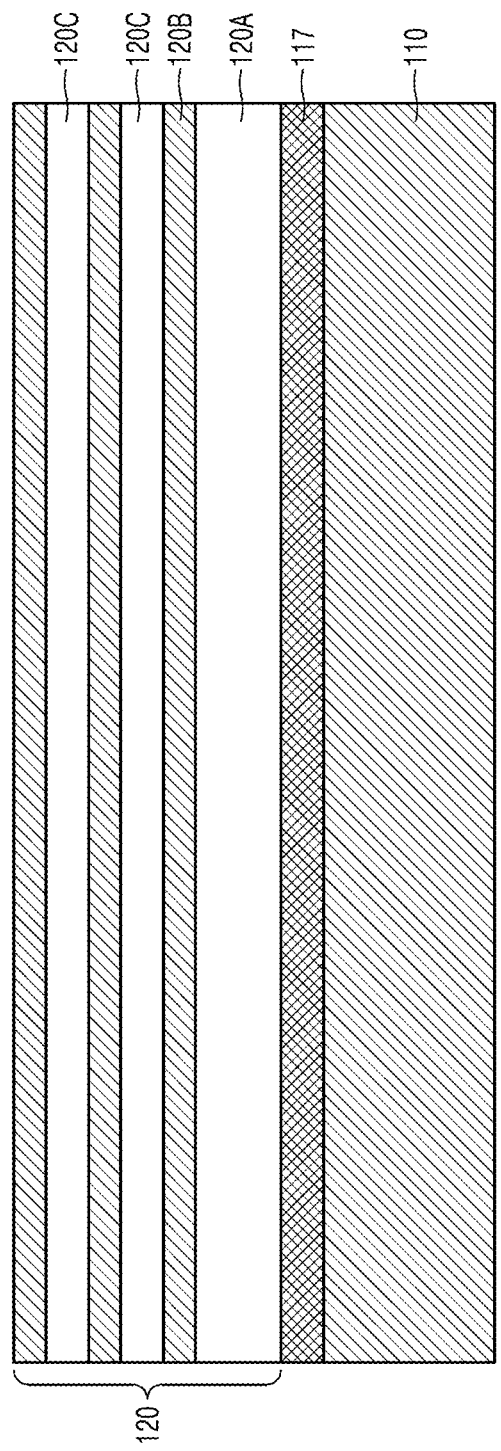
FIG. 54 is a cross-sectional view illustrating a case in which a low thermal conductivity layer is further formed between the substrate and the DBR layer in the manufacturing method illustrated in FIGS. 50 to 53.

Also, in the operation of forming the fourth spatial light modulator 400, the thickness of the lowermost first layer 120A of the DBR layer 120 may be formed to be the same as the thickness of the remaining first layer 120A. In one example, as shown in FIG. 54, the low thermal conductivity layer 117 may be formed between the substrate 110 and the first layer 120A of the DBR layer 120 in the manufacturing method illustrated in FIGS. 50 to 53, and in the operation of forming the trench 460 of FIG. 53, the trench 460 may or may not be formed to penetrate the low thermal conductivity layer 117. When the low thermal conductivity layer 117 is formed, the thickness of the lowermost first layer 120A of the DBR layer 120 may be the same as the thickness of the remaining first layer 120A.

In this way, by modifying each operation of the manufacturing process, various spatial light modulators may be formed.

While many details are set forth in the foregoing description, they should be construed as illustrative of preferred embodiments, rather than to limit the scope of the invention. Therefore, the scope of the present invention should not be defined by the described embodiments, but should be determined by the technical spirit described in the claims.

The disclosed spatial light modulator has a trench between a driving pixel and a non-driving pixel. The trench may be maintained in a vacuum state or filled with air, or it may be filled with a material having a lower thermal conductivity than the substrate, the DBR layer, and cavity layer included in the spatial light modulator.

The trench may be an example of a heat blocking member, and by providing such a trench, it is possible to minimize or block the transfer of heat generated from the driving pixel to the non-driving pixel. In addition, a low thermal conductivity layer having lower thermal conductivity than the lowermost layer of the DBR layer is further provided between the DBR layer and the substrate, and thus, may serve as a second heat blocking member between the driving pixel and the non-driving pixel.

Accordingly, the independence of the driving pixel and the non-driving pixel may be increased and the temperature difference between the driving pixel and the non-driving pixel becomes greater than that in a conventional spatial light modulator, thus, it is possible to accurately focus emitted light at a desired location.

In addition, when the distribution of emitted light of the disclosed spatial light modulator is viewed, the intensity of an $0^{th}$ order beam and a high order beam is very low, but the intensity of the $1^{st}$ order beam is greatly dominant compared to the spatial light modulator of the related art. Accordingly, when the disclosed spatial light modulator is used, the output and efficiency of the spatial light modulator may be increased. It should be understood that embodiments described herein should be considered in a descriptive sense only and not for purposes of limitation.

Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A spatial light modulator comprising:
    a substrate;
    a distributed Bragg reflector (DBR) layer stacked on one surface of the substrate;
    a cavity layer on the DBR layer;
    a pixel layer on the cavity layer, the pixel layer including a plurality of pixels; and
    a heat blocking member between the plurality of pixels to block heat transfer between the plurality of pixels,
    wherein a material layer having a lower thermal conductivity than a lowermost layer of the DBR layer is provided between the substrate and the DBR layer,
    wherein each of the plurality of pixels includes a plurality of active meta-patterns, and
    wherein a material of the material layer is different from a material of the DBR layer.

2. The spatial light modulator of claim 1, wherein the DBR layer, the material layer, and the cavity layer are each divided corresponding to the plurality of pixels, and the heat blocking member is provided between the divided DBR layers, between the divided material layers, and between the divided cavity layers.

3. The spatial light modulator of claim 2, wherein the DBR layer includes:
    a plurality of first layers each having a certain thermal conductivity; and a plurality of second layers each having a thermal conductivity greater than the certain thermal conductivity of the first layer; wherein the first layers and the second layers are repeatedly alternately stacked, and a lowermost first layer from among the plurality of first layers has a thickness greater than a thickness of each of remaining first layers.

4. The spatial light modulator of claim 1, wherein the cavity layer is divided in correspondence with the plurality of pixels, and some of layers constituting the DBR layer are also divided in correspondence with the plurality of pixels, and the heat blocking member is provided between the divided cavity layers and between all the divided layers of the DBR layer in a horizontal direction parallel to an upper surface of the substrate.

5. The spatial light modulator of claim 4, wherein the DBR layer includes a plurality of first and second layers having thermal conductivities different from each other and being repeatedly and alternately stacked in a vertical direction, among the plurality of first and second layers, layers having a high thermal conductivity are all divided, and layers having a low thermal conductivity are all divided except for the lowermost layer.

6. The spatial light modulator of claim 5, wherein the heat blocking member and the substrate are spaced apart, and the material layer and an undivided layer having a low thermal conductivity of the DBR layer is sequentially stacked between the substrate and the heat blocking member.

7. The spatial light modulator of claim 5, wherein, among the layers having a low thermal conductivity, the lowermost layer has a thickness greater than a thickness of each of remaining layers.

8. The spatial light modulator of claim 1, wherein only the DBR layer is divided in correspondence to the plurality of pixels, and the heat blocking member is provided only between the divided DBR layers.

9. The spatial light modulator of claim 8, wherein the DBR layer includes:
    a plurality of first layers having a certain thermal conductivity; and
    a plurality of second layers having a thermal conductivity greater than the certain thermal conductivity of each of the plurality of first layers, wherein the first layers and the second layers are repeatedly alternately stacked, and among the plurality of first layers, the lowermost layer has a thickness greater than a thickness of each of remaining layers.

10. The spatial light modulator of claim 8, further comprising one meta-pattern on the cavity layer between the plurality of pixels.

11. The spatial light modulator of claim 1, wherein the heat blocking member includes a trench.

12. The spatial light modulator of claim 1, wherein the heat blocking member includes a material having a thermal conductivity less than a thermal conductivity of each of the substrate, the DBR layer, and the cavity layer.

13. The spatial light modulator of claim 1, wherein the heat blocking member is spaced apart from the plurality of pixels.

14. The spatial light modulator of claim 1, wherein the plurality of pixels includes: a plurality of driving pixels; and a plurality of non-driving pixels, wherein the driving pixels and the non-driving pixels are aligned to be driven by binary driving during driving.

15. The spatial light modulator of claim 1, wherein the plurality of active meta-patterns each include an active high contrast grating (HCG).

16. The spatial light modulator of claim 1, wherein the plurality of pixels are spaced apart from each other, and a distance between the plurality of pixels is greater than a width of one meta-pattern.

17. A method of driving the spatial light modulator of claim 1 including a plurality of pixels, wherein the plurality of pixels include:
a plurality of driving pixels; and
a plurality of non-driving pixels, wherein each driving pixel of the plurality of driving pixels and each non-driving pixel of the plurality of non-driving pixels are driven by binary driving.

18. The method of claim 17, wherein each driving pixel of the plurality of driving pixels and each non-driving pixel of the plurality of non-driving pixels are spaced apart from each other, each driving pixel of the plurality of driving pixels includes a plurality of active meta-patterns, and a current is applied to all of the plurality of active meta-patterns included in the driving pixel.

19. The method of claim 17, wherein each driving pixel of the plurality of driving pixels and each non-driving pixel of the plurality of non-driving pixels are spaced apart from each other, and a current is applied only to some of the plurality of active meta-patterns included in the driving pixel.

20. The method of claim 17, wherein one active meta-pattern is further provided between each driving pixel of the plurality of driving pixels and each non-driving pixel of the plurality of non-driving pixels, and a current is applied to all of the plurality of active meta-patterns included in the driving pixel.

21. The method of claim 17, wherein one active meta-pattern is further provided between each driving pixel of the plurality of driving pixels and each non-driving pixel of the plurality of non-driving pixels, and a current is applied only to some of the plurality of active meta-patterns included in the driving pixel.

22. A method of manufacturing a spatial light modulator, the method comprising:
forming a low thermal conductivity layer having a certain thermal conductivity on a substrate;
forming a distributed Bragg reflector (DBR) layer on the low thermal conductivity layer;
forming a cavity layer on the DBR layer;
forming a pixel layer including a plurality of pixels on the cavity layer; and
forming a trench in a stack including the low thermal conductivity layer, the DBR layer and the cavity layer between the plurality of pixels,
wherein the thermal conductivity of the low thermal conductivity layer is less than that of a lowermost layer of the DBR layer, and
wherein a material of the low thermal conductivity layer is different from a material of the DBR layer.

23. The method of claim 22, wherein the forming of the trench in the stack includes sequentially etching the cavity layer, the DBR layer, and the low thermal conductivity layer until the substrate is exposed.

24. The method of claim 22, wherein the forming of the trench in the stack includes sequentially etching the cavity layer and the DBR layer, wherein only a portion of the DBR layer is etched.

25. The method of claim 24, wherein the DBR layer has a layer structure in which first and second layers having different thermal conductivities are repeatedly alternately stacked, wherein the etching of a portion of the DBR layer includes etching a remaining layer structure except for a lowermost first layer.

26. The method of claim 22, wherein the forming of the trench in the stack includes, after forming the DBR layer, etching a region of the DBR layer corresponding to an area between the plurality of pixels until the low thermal conductivity layer is exposed, wherein the cavity layer is formed on the DBR layer to cover a space formed by the etching.

27. The method of claim 26, wherein each of the plurality of pixels includes a plurality of active HCGs, and in the forming of the pixel layer, one active HCG is also formed on the cavity layer between the plurality of pixels.

28. The method of claim 22, wherein the forming of the DBR layer includes:
forming a first layer directly on the low thermal conductivity layer;
forming a second layer on the first layer; and
repeatedly alternately stacking the first and second layers on the second layer, wherein among the first layers, the first layer directly formed on the low thermal conductivity layer is formed to have a thickness greater than a thickness of each of remaining first layers.

29. The method of claim 22, further comprising after forming the trench, filling the trench with a material having a thermal conductivity less than a thermal conductivity of each of the substrate, the DBR layer, and the cavity layer.

30. The method of claim 22, wherein the forming of the trench in the stack includes sequentially etching the cavity layer and the DBR layer until the low thermal conductivity layer is exposed.

31. An apparatus comprising a spatial light modulator configured to irradiate incident light in a given direction, wherein the spatial light modulator includes the spatial light modulator of claim 1.

* * * * *